United States Patent
Petrassi

(10) Patent No.: US 12,516,307 B2
(45) Date of Patent: Jan. 6, 2026

(54) MODIFIED PORCINE PANCREATIC ELASTASE PROTEINS

(71) Applicant: Onchilles Pharma, Inc., San Diego, CA (US)

(72) Inventor: Hank Michael James Petrassi, Fallbrook, CA (US)

(73) Assignee: Onchilles Pharma, Inc., San Diego, CA (US)

( * ) Notice: Subject to any disclaimer, the term of this patent is extended or adjusted under 35 U.S.C. 154(b) by 428 days.

(21) Appl. No.: 18/021,983

(22) PCT Filed: Aug. 18, 2021

(86) PCT No.: PCT/US2021/046453
§ 371 (c)(1),
(2) Date: Feb. 17, 2023

(87) PCT Pub. No.: WO2022/040281
PCT Pub. Date: Feb. 24, 2022

(65) Prior Publication Data
US 2023/0365958 A1  Nov. 16, 2023

Related U.S. Application Data

(60) Provisional application No. 63/067,058, filed on Aug. 18, 2020.

(51) Int. Cl.
*C12N 9/64* (2006.01)
*A61P 35/00* (2006.01)

(52) U.S. Cl.
CPC .......... *C12N 9/6448* (2013.01); *A61P 35/00* (2018.01); *C12Y 304/21036* (2013.01)

(58) Field of Classification Search
CPC .......... C12N 9/6448; A61P 35/00; C12Y 304/21036; A61K 38/00; A61K 38/486
See application file for complete search history.

(56) References Cited

U.S. PATENT DOCUMENTS

| | | |
|---|---|---|
| 5,464,758 A | 11/1995 | Gossen et al. |
| 5,698,518 A | 12/1997 | Carson et al. |
| 5,814,618 A | 9/1998 | Bujard et al. |
| 6,210,922 B1 | 4/2001 | Côté et al. |
| 7,029,872 B2 | 4/2006 | Gerngross |
| 7,112,715 B2 | 9/2006 | Chambon et al. |
| 7,326,681 B2 | 2/2008 | Gerngross |
| 7,629,163 B2 | 12/2009 | Gerngross |
| 8,008,449 B2 | 8/2011 | Korman et al. |
| 8,993,731 B2 | 3/2015 | Tyson |
| 9,073,994 B2 | 7/2015 | Honjo et al. |
| 9,084,776 B2 | 7/2015 | Korman et al. |
| 9,102,725 B2 | 8/2015 | Korman et al. |
| 9,102,727 B2 | 8/2015 | Freeman et al. |
| 9,102,728 B2 | 8/2015 | Tyson |
| 9,181,342 B2 | 11/2015 | Davis |
| 9,217,034 B2 | 12/2015 | Li et al. |
| 9,291,630 B1 | 3/2016 | Wezeman et al. |
| 9,352,021 B2 | 5/2016 | Hanna et al. |
| 9,387,247 B2 | 7/2016 | Korman et al. |
| 9,393,301 B2 | 7/2016 | Honjo et al. |
| 9,402,899 B2 | 8/2016 | Honjo et al. |
| 9,439,962 B2 | 9/2016 | Honjo et al. |
| 9,492,539 B2 | 11/2016 | Korman et al. |
| 9,492,540 B2 | 11/2016 | Korman et al. |
| 9,850,308 B2 | 12/2017 | Martin-Villalba et al. |
| 2005/0257285 A1 | 11/2005 | Gupta |
| 2006/0008891 A1 | 1/2006 | Wang et al. |
| 2006/0019256 A1 | 1/2006 | Clarke et al. |
| 2006/0177880 A1 | 8/2006 | Tacke et al. |
| 2007/0161125 A1 | 7/2007 | Rosenfeld et al. |
| 2009/0162343 A1 | 6/2009 | Franano et al. |
| 2011/0151490 A1 | 6/2011 | Hillman et al. |
| 2012/0039906 A1 | 2/2012 | Olive |
| 2012/0183552 A1 | 7/2012 | Joseloff et al. |
| 2012/0301488 A1 | 11/2012 | Zhang et al. |
| 2013/0245104 A1 | 9/2013 | De Fougerolles et al. |
| 2014/0120103 A1 | 5/2014 | Zhang et al. |
| 2014/0147454 A1 | 5/2014 | Chakraborty et al. |
| 2014/0243399 A1 | 8/2014 | Schrum et al. |
| 2015/0111248 A1 | 4/2015 | Bancel et al. |

(Continued)

FOREIGN PATENT DOCUMENTS

| | | |
|---|---|---|
| JP | S60207583 A | 10/1985 |
| JP | 2004123679 A | 4/2004 |

(Continued)

OTHER PUBLICATIONS

GenBank: CAA27670.1, elastase 1 [Sus scrofa]. Submitted Jun. 11, 2003. Accessed Jun. 24, 2025. https://www.ncbi.nlm.nih.gov/protein/1942?sat=2&satkey=22898499 (Year: 2003).*

GenBank: X04036.1, Sus scrofa pre-mRNA for pancreatic preproelastase 1 (ELS-1). Submitted Jun. 11, 2003. Accessed Jun. 24, 2025. https://www.ncbi.nlm.nih.gov/nuccore/X04036.1 (Year: 2003).*

Bode, et al. Human leukocyte and porcine pancreatic elastase: X-ray crystal structures, mechanism, substrate specificity, and mechanism-based inhibitors. Biochemistry. Mar. 7, 1989;28(5):1951-63. doi: 10.1021/bi00431a001. PMID: 2655701. (Year: 1989).*

(Continued)

*Primary Examiner* — Adam Weidner
*Assistant Examiner* — Dennis Ignatius Armato, Jr.
(74) *Attorney, Agent, or Firm* — COOLEY LLP

(57) ABSTRACT

Provided are modified porcine pancreatic elastase (PPE) proteins, including proproteins, comprising at least one amino acid alteration that reduces binding to serine protease inhibitors such as alpha-1 antitrypsin (A1AT), thereby increasing cancer-cell killing activity, and related pharmaceutical compositions and methods of use for treating diseases such as cancers.

12 Claims, 4 Drawing Sheets
Specification includes a Sequence Listing.

(56) References Cited

U.S. PATENT DOCUMENTS

| | | | |
|---|---|---|---|
| 2015/0166974 A1 | 6/2015 | Franano et al. |
| 2015/0203579 A1 | 7/2015 | Papadopoulos et al. |
| 2015/0306196 A1 | 10/2015 | Zeng |
| 2016/0121001 A1 | 5/2016 | Leubitz et al. |
| 2018/0134789 A1 | 5/2018 | Baeuerle et al. |
| 2018/0169189 A1 | 6/2018 | Pulé et al. |
| 2019/0064183 A1 | 2/2019 | Eccleston et al. |
| 2019/0105261 A1 | 4/2019 | Waugh et al. |
| 2020/0208132 A1 | 7/2020 | Franano et al. |
| 2021/0299234 A1 | 9/2021 | Becker et al. |
| 2022/0000977 A1 | 1/2022 | Becker et al. |
| 2023/0348881 A1 | 11/2023 | Becker et al. |

FOREIGN PATENT DOCUMENTS

| | | |
|---|---|---|
| JP | 2006500944 A | 1/2006 |
| JP | 2013508307 A | 3/2013 |
| JP | 2014513920 A | 6/2014 |
| JP | 2016534051 A | 11/2016 |
| WO | WO-9202617 A1 | 2/1992 |
| WO | WO-0069897 A2 | 11/2000 |
| WO | WO-03083084 A2 | 10/2003 |
| WO | WO-2008067305 A2 | 6/2008 |
| WO | WO-2012006633 A1 | 1/2012 |
| WO | WO-2013014485 A1 | 1/2013 |
| WO | WO-2014060848 A2 | 4/2014 |
| WO | WO-2014118643 A2 | 8/2014 |
| WO | WO-2016125330 A1 | 8/2016 |
| WO | WO-2016166521 A1 | 10/2016 |
| WO | WO-2018073394 A1 | 4/2018 |
| WO | WO-2018232273 A1 | 12/2018 |
| WO | WO-2018237287 A1 | 12/2018 |
| WO | WO-2019051001 A1 | 3/2019 |
| WO | WO-2019222762 A1 | 11/2019 |
| WO | WO-2020023418 A1 | 1/2020 |
| WO | WO-2020132465 A1 | 6/2020 |
| WO | WO-2022040281 A1 | 2/2022 |
| WO | WO-2022040288 A1 | 2/2022 |
| WO | WO-2024211493 A2 | 10/2024 |
| WO | WO-2025094148 A1 | 5/2025 |

OTHER PUBLICATIONS

Hedstrom, L. Serine protease mechanism and specificity. Chem Rev. Dec. 2002; 102(12):4501-24. doi: 10.1021/cr000033x. PMID: 12475199. (Year: 2002).*
Cui, et al., Neutrophil elastase selectively kills cancer cells and attenuates tumorigenesis, Cell, Jun. 2021, pp. 3163-3177.
Adachi, et al., Targeted mutation in the Fas gene causes hyperplasia in peripheral lymphoid organs and liver, Nature genetics, Nov. 1995, pp. 294-300.
Algeciras-Schimnich, et al., Two CD95 tumor classes with different sensitivities to antitumor drugs, Proceedings of the National Academy of Sciences, Sep. 2003, pp. 11445-11450.
Allen, et al., Validation of peptide mapping for protein identity and genetic stability, Biologics and biotechnology section, pharmaceutical research and manufacturers of America, Biologicals, Sep. 1996, pp. 255-275.
Altschul, et al., Gapped BLAST and PSI-BLAST: a new generation of protein database search programs, Nucleic Acids Res., Sep. 1997, pp. 3389-3402.
Anicetti, et al., Purity analysis of protein pharmaceuticals produced by recombinant DNA technology, Trends in Biotechnology, Dec. 1989, pp. 342-349.
Bidere, et al., Genetic disorders of programmed cell death in the immune system, Annu. Rev. Immunol., Apr. 2006, pp. 321-352.
Bitter, et al., Expression and secretion vectors for yeast, Methods Enzymol., 1987, pp. 516-544.
Bottino, et al., Identification of PVR (CD155) and Nectin-2 (CD112) as cell surface ligands for the human DNAM-1 (CD226) activating molecule, J Exp Med., Aug. 2003, pp. 557-567.

Broglie, et al., Light-regulated expression of a pea ribulose-1,5-bisphosphate carboxylase small subunit gene in transformed plant cells, Science, May 1984, pp. 838-843.
Bruner, et al., Size exclusion HPLC method for the determination of acidic fibroblast growth factor in viscous formulations, J Pharm Biomed Anal., Aug. 1997, pp. 1929-1935.
Chen, et al., CD95 promotes tumour growth, Nature, May 2010, pp. 492-496.
Colbere-Garapin, et al., A new dominant hybrid selective marker for higher eukaryotic cells, Journal of molecular biology, Jul. 1981, pp. 1-4.
Cooley, et al., Adoptive therapy with T cells/NK cells, Biology of Blood and Marrow Transplantation, Jan. 2007, pp. 33-42.
Coruzzi, et al., Tissue-specific and light-regulated expression of a pea nuclear gene encoding the small subunit of ribulose-1, 5-bisphosphate carboxylase., The EMBO journal, Aug. 1984, 1671-9.
Croft, et al., The significance of OX40 and OX40L to T-cell biology and immune disease, Immunological reviews, May 2009, pp. 173-191.
Derré, et al., BTLA mediates inhibition of human tumor-specific CD8+ T cells that can be partially reversed by vaccination, The Journal of clinical investigation, Jan. 2010, pp. 157-167.
Engelhard, et al., The insect tracheal system: a conduit for the systemic spread of Autographa californica M nuclear polyhedrosis virus, Proceedings of the National Academy of Sciences, Apr. 1994, pp. 3224-3227.
Fuhrmann-Benzakein, et al., Inducible and irreversible control of gene expression using a single transgene, Nucleic acids research, Dec. 2000, 5 pages.
GenBank accession No. XP005655631.2, Chymotrypsin-like elastase family member 1 isoform X1 [Susscrofa], May 2017, 2 pages.
Gerngross, Advances in the production of human therapeutic proteins in yeasts and filamentous fungi, Nat Biotechnol., Nov. 2004, pp. 1409-1414.
Grahm, et al., Characteristics of a human cell line transformed by DNA from human adenovirus type 5, Journal of general virology, Jul. 1977, pp. 59-72.
Graslund, et al., Structural Genomics Consortium, Protein production and purification, Nat Methods, Feb. 2008, pp. 135-146.
Hadji, et al., Death induced by CD95 or CD95 ligand elimination, Cell reports, Apr. 2014, pp. 208-222.
Hamilton, et al., Humanization of yeast to produce complex terminally sialylated glycoproteins, Science, Sep. 2006, pp. 1441-1443.
Hao, et al., T cell-specific ablation of fas leads to fas ligand-mediated lymphocyte depletion and inflammatory pulmonary fibrosis, The Journal of Experimental Medicine, May 2004, pp. 1355-1365.
Hartman, et al., Two Dominant-Acting Selectable Markers for Gene Transfer Studies in Mammalian Cells, Proceedings of the National Academy of Sciences of the United States of America, Nov. 1988, pp. 8047-8051.
He, et al., Agonist anti-human CD27 monoclonal antibody induces T cell activation and tumor immunity in human CD27-transgenic mice, J Immunol., Oct. 2013, pp. 4174-4183.
Houghton, et al., Neutrophil elastase-mediated degradation of IRS-1 accelerates lung tumor growth, Nature Medicine, Feb. 2010, pp. 219-223.
Huang, et al., Role of LAG-3 in regulatory T cells, Immunity., Oct. 2004, pp. 503-513.
Indra, et al., Temporally-controlled site-specific mutagenesis in the basal layer of the epidermis: comparison of the recombinase activity of the tamoxifen-inducible Cre-ERT and Cre-ERT2 recombinases, Nucleic acids research, Nov. 1999, pp. 4324-4327.
Ivanov, et al., FAP-1 association with Fas (Apo-1) inhibits Fas expression on the cell surface, Molecular and cellular biology, May 2003, pp. 3623-3635.
Ivanov, et al., Opposite roles of FAP-1 and dynamin in the regulation of Fas (CD95) translocation to the cell surface and susceptibility to Fas ligand-mediated apoptosis, Journal of Biological Chemistry, Jan. 2006, pp. 1840-1852.

(56) References Cited

OTHER PUBLICATIONS

Johnson, et al., Clinical and biological effects of an agonist anti-CD40 antibody: a Cancer Research UK phase I study, Clin Cancer Res., Mar. 2015, pp. 1321-1328.
Johnston, et al., The immunoreceptor TIGIT regulates antitumor and antiviral CD8(+) T cell effector function, Cancer Cell, Dec. 2014, pp. 923-937.
June, et al., Adoptive T cell therapy for cancer in the clinic, J Clin Invest., Jun. 2007, pp. 1466-1476.
Karray, et al., Complete Loss of Fas Ligand Gene Causes Massive Lymphoproliferation and Early Death, Indicating a Residual Activity of gld Allele, J Immunology, Feb. 2004, pp. 2118-2125.
Kelly, et al., How to study proteins by circular dichroism, Biochim Biophys Acta, Aug. 2005, pp. 119-139.
Kormann, et al., Expression of therapeutic proteins after delivery of chemically modified mRNA in mice, Nat Biotechnol, 2011, pp. 154-157.
Kramer, CD95's deadly mission in the immune system, Nature, Oct. 2000, pp. 789-795.
Kramer, et al., Transgene control engineering in mammalian cells, Methods Mol. Biol., 2005, pp. 123-143.
Kurtulus, et al., TIGIT predominantly regulates the immune response via regulatory T cells, J Clin Invest., Nov. 2015, pp. 4053-4062.
Kwon, et al., High quality protein microarray using in situ protein purification. BMC Biotechnol., Aug. 2009, 10 pages.
Li, et al., Emerging immune checkpoints for cancer therapy, Acta Oncol., Nov. 2015, pp. 1706-1713.
Li, et al., Optimization of humanized IgGs in glycoengineered Pichia pastoris, Nature Biotechnology, Feb. 2006, pp. 210-215.
Li, et al., Tumor immunotherapy: New aspects of natural killer cells, Chin J Cancer Res., Apr. 2018, pp. 173-196.
Lin, et al., Automated 96-well purification of hexahistidine-tagged recombinant proteins on MagneHis Ni(2)+-particles, Methods Mol Biol., 2009, pp. 129-141.
Logan, et al., Adenovirus tripartite leader sequence enhances translation of mRNAs late after infection, Proc. Natl. Acad. Sci. U.S.A., 1984, pp. 3655-3659.
Lowy, et al., Isolation of Transforming DNA: Cloning the Hamster aprt Gene, Cell, 1990, pp. 817-823.
Maddox, et al., Elevated serum levels in human pregnancy of a molecule immunochemically similar to eosinophil granule major basic protein, J Exp Med., Oct. 1983, pp. 1211-1226.
Martin-Villalba, et al., CD95 in cancer: tool or target?, Trends in Molecular Medicine, Jun. 2013, pp. 329-335.
Pardoll, The blockade of immune checkpoints in cancer immunotherapy, Nature Reviews Cancer, Apr. 2012, pp. 252-264.
Peter, et al., The CD95 (APO-1/Fas) DISC and beyond, Cell Death & Differentiation, Jan. 2003, pp. 26-35.
Peter, et al., The role of CD95 and CD95 ligand in cancer, Cell Death & Differentiation, Apr. 2015, pp. 549-559.
Phillips, et al., Therapeutic uses of anti-PD-1 and anti-PD-L1 antibodies, Int Immunol., Jan. 2015, pp. 39-46.
Pilotte, et al., Reversal of tumoral immune resistance by inhibition of tryptophan 2,3-dioxygenase, Proc Natl Acad Sci U S A., Sep. 2012, pp. 2497-2502.
Platten, et al., Cancer Immunotherapy by Targeting IDO1/TDO and Their Downstream Effectors, Front Immunol., Jan. 2015, 7 pages.
Qing, et al., Cold-shock induced high-yield protein production in *Escherichia coli*, Nat Biotechnol., Jul. 2004, pp. 877-882.
Rhodes, et al., Transformation of maize by electroporation of embryos, Methods Mol Biol., 1995, pp. 121-131.
Rosenberg, et al., Adoptive cell transfer as personalized immunotherapy for human cancer, Science, Apr. 2015, pp. 62-68.
Rosser, et al., Transient transfection of CHO-K1-S using serum-free medium in suspension: a rapid mammalian protein expression system, Protein Expr Purif., Apr. 2005, pp. 237-243.
Mather, Establishment and characterization of two distinct mouse testicular epithelial cell lines, Biology of reproduction, Aug. 1980, pp. 243-252.

Mather, et al., Culture of testicular cells in hormone-supplemented serum-free medium, Annals of the New York Academy of Sciences, Jun. 1982, pp. 44-68.
Maude, et al., CD19-targeted chimeric antigen receptor T-cell therapy for acute lymphoblastic leukemia, Blood, Sep. 2015, pp. 4017-4023.
Maxwell, et al., A simple in vivo assay for increased protein solubility, Protein Sci., Sep. 1999, pp. 1908-1911.
Meagher, et al., Deconvolution of the fluorescence emission spectrum of human antithrombin and identification of the tryptophan residues that are responsive to heparin binding, J Biol Chem., Sep. 1998, pp. 23283-23289.
Murmann, et al., Induction of DISE in ovarian cancer cells in vivo, Oncotarget, Oct. 2017, 16 pages.
Nagamine, et al., Electrochemical screening of recombinant protein solubility in *Escherichia coli* using scanning electrochemical microscopy (SECM), Biotechnol Bioeng., Apr. 2007, pp. 1008-1013.
Ngwa, et al., Using immunotherapy to boost the abscopal effect, Nature Reviews Cancer, May 2018, pp. 313-322.
No, et al., Ecdysone-inducible gene expression in mammalian cells and transgenic mice, Proceedings of the National Academy of Sciences, Apr. 1996, pp. 3346-3351.
O'connell, et al., The Fas counterattack: Fas-mediated T cell killing by colon cancer cells expressing Fas ligand, The Journal of experimental medicine, Sep. 1996, pp. 1075-1082.
Roszkowiak, et al., The Direct Anti-Virulence but Not Bactericidal Activity of Human Neutrophil Elastase against Moraxella catarrhalis, protein accession No. NP 001963, Int J Mol Sci, 2023, 3 pages.
Schaer, et al., GITR pathway activation abrogates tumor immune suppression through loss of regulatory T cell lineage stability, Cancer Immunol Res., Nov. 2013, pp. 320-331.
Scharf, et al., 6 Heat stress promoters and transcription factors, Results Probl Cell Differ., 1994, pp. 125-162.
Shao, et al., CD137 ligand, a member of the tumor necrosis factor family, regulates immune responses via reverse signal transduction, J Leukoc Biol., Jan. 2011, pp. 21-29.
Sharma, et al., The future of immune checkpoint therapy, Science, Apr. 2015, pp. 56-61.
Sheridan, et al., IDO inhibitors move center stage in immuno-oncology, Nat Biotechnol., Apr. 2015, pp. 321-322.
Shimp, et al., Production and characterization of clinical grade *Escherichia coli* derived Plasmodium falciparum 42 kDa merozoite surface protein 1 (MSP1(42)) in the absence of an affinity tag, Protein Expr Purif., Nov. 2006, pp. 58-67.
Sitaraman, et al., High-throughput protein expression using cell-free system, Methods Mol Biol. 2009, pp. 229-244.
Stenvall, et al., High-throughput solubility assay for purified recombinant protein immunogens, Biochim Biophys Acta., Aug. 2005, pp. 6-10.
Strand, et al., Cleavage of CD95 by matrix metalloproteinase-7 induces apoptosis resistance in tumour cells, Oncogene, Apr. 2004, pp. 3732-3736.
Tahara-Hanaoka, et al., Functional characterization of DNAM-1 (CD226) interaction with its ligands PVR (CD155) and nectin-2 (PRR-2/CD112), Int Immunol., Apr. 2004, pp. 533-538.
Takamatsu, et al., Expression of bacterial chloramphenicol acetyltransferase gene in tobacco plants mediated by TMV-RNA, EMBO J., Feb. 1987, pp. 307-311.
The International Bureau of WIPO, International Preliminary Report on Patentability for International Application No. PCT/US2021/046453, mailed Mar. 2, 2023, 7 pages.
The International Bureau of WIPO, International Preliminary Report on Patentability for International Application No. PCT/US2021/046467, mailed Mar. 2, 2023, 8 pages.
Thomas, et al., Targeting human CD27 with an agonist antibody stimulates T-cell activation and antitumor immunity. Oncoimmunology, Jan. 2014, 3 pages.
Topalian, et al., Immune checkpoint blockade: a common denominator approach to cancer therapy, Cancer cell, Apr. 2015, pp. 450-461.
UniProtKB, P01009 A1AT Human, Oct. 1996, 10 pages.

(56) References Cited

OTHER PUBLICATIONS

United States Patent and Trademark Office, International Search Report and Written Opinion for PCT/US2021/046453, Dec. 13, 2021, 10 pages.

United States Patent and Trademark Office, International Search Report and Written Opinion for PCTUS2021046467, Dec. 13, 2021, 10 pages.

Urlaub, et al., Isolation of Chinese hamster cell mutants deficient in dihydrofolate reductase activity, Proceedings of the National Academy of Sciences, Jul. 1980, pp. 4216-4220.

Van Heeke, et al., Expression of human asparagine synthetase in *Escherichia coli*, Journal of Biological Chemistry, Apr. 1989, pp. 5503-5509.

Vonderheide, et al., Agonistic CD40 antibodies and cancer therapy, Clin Cancer Res., Mar. 2013, pp. 1035-1043.

Wigler, et al., Transfer of purified herpes virus thymidine kinase gene to cultured mouse cells, Cell, May 1977, pp. 223-232.

Wigler, et al., Transformation of mammalian cells with an amplifiable dominant-acting gene, Proceedings of the National Academy of Sciences, Jun. 1980, pp. 3567-3570.

Wigley, et al., Protein solubility and folding monitored in vivo by structural complementation of a genetic marker protein, Nat Biotechnol., Feb. 2001, pp. 131-136.

Wildt, et al., The humanization of N-glycosylation pathways in yeast, Nat Rev Microbiol, Feb. 2005, pp. 119-128.

Winter, et al., 6 The expression of heat shock protein and cognate genes during plant development, Results Probl Cell Differ., 1991, pp. 85-105.

Workman, et al., Lymphocyte activation gene-3 (CD223) regulates the size of the expanding T cell population following antigen activation in vivo, J Immunol., May 2004, pp. 5450-5455.

Workman, et al., The CD4-related molecule, LAG-3 (CD223), regulates the expansion of activated T cells, Eur J Immunol., Apr. 2003, pp. 970-979.

Almonte and Sweatt, "Serine proteases, serine protease inhibitors, and protease-activated receptors: roles in synaptic function and behavior." Brain Res. Aug. 17, 2011:1407:107-22. doi: 10.1016/j.brainres.2011.06.042. Epub Jun. 24, 2011.

Di Cera, E., "Serine proteases." UBMB Life. May 2009; 61(5): 510-5. doi: 10.1002/iub.186.

Loeb et al. "Granzyme B proteolyzes receptors important to proliferation and survival, tipping the balance toward apoptosis." J Biol Chem. Sep. 22, 2006;281(38):28326-35. doi: 10.1074/jbc.M604544200. Epub Jun. 23, 2006. PMID: 16798735.

Murray et al. "Type II transmembrane serine proteases as potential targets for cancer therapy." Biol Chem. Sep. 1, 2016;397(9):815-26. doi: 10.1515/hsz-2016-0131. PMID: 27078673; PMCID: PMC4981541.

Non-Final Office Action for U.S. Appl. No. 18/022,004 mailed Aug. 21, 2025, 29 pages.

Reddel et al. "Thrombin Generation and Cancer: Contributors and Consequences." Cancers (Basel). Jan. 16, 2019; 11 (1): 100. doi: 10.3390/cancers11010100. PMID: 30654498; PMCID: PMC6356447, 20 pages.

Tripathi and Sowdhamini, "Genome-wide survey of prokaryotic serine proteases: analysis of distribution and domain architectures of five serine protease families in prokaryotes." BMC Genomics. Nov. 19, 2008:9:549. doi: 10.1186/1471-2164-9-549, 28 pages.

Chang et al., "TNF-a Mediates Eosinophil Cationic Protein induced Apoptosis in BEAS-2B Cells," BMC Cell Biology, Jan. 20, 2010 (Jan. 20, 2010), vol. 11, No. 6, pp. 1-14.

Choi, Y., et al., "Predicting the functional effect of amino acid substitutions and indels," PLoS One. 2012; 7(10):e46688, 13 pages. Epub Oct. 8, 2012.

Database Geneseq [Online] May 30, 2019 (May 30, 2019), "Human elastase I, SEQ ID 6.", retrieved from EBI accession No. GSP:BGE74800. 1 page.

Dehouck, Y. et al., "Fast and accurate predictions of protein stability changes upon mutations using statistical potentials and neural networks:PoPMuSiC-2.0," Bioinformatics, 25(19):2537-2543 (2009).

Extended European Search Report for EP Application No. 18817894.1 dated Feb. 5, 2021. 7 pages.

Extended European Search Report for EP Application No. 19899959.1 dated Jul. 21, 2022. 27 pages.

Extended European Search Report for EP Application No. 21859037.0 dated Sep. 16, 2024. 9 pages.

Extended European Search Report for EP Application No. 23191473.0 dated Jan. 23, 2024. 8 pages.

Extended European Search Report for European Application No. 21859034.7 dated Sep. 17, 2024, 9 pages.

Guo, H.H., et al., "Protein tolerance to random amino acid change," Proc Natl Acad Sci USA. Jun. 22, 2004; 101(25):9205-10. Epub Jun. 14, 2004.

Ho et al., "Neutrophil elastase as a diagnostic marker and therapeutic target in co lo rectal cancers." Oncotarget, Jan. 30, 2014 (Jan. 30, 2014), pp. 473-480.

International Search Report and Written Opinion for International Application No. PCT/US2018/037800, mailed Sep. 14, 2018. 6 pages.

International Search Report and Written Opinion for International Application No. PCT/US2019/067890, mailed Mar. 24, 2020. 7 pages.

International Search Report and Written Opinion for PCT Application No. PCT/IB2024/060843 mailed Mar. 20, 2025, 13 pages.

International Search Report and Written Opinion for PCT Application No. PCT/US2024/022956 mailed Dec. 9, 2024, 14 pages.

Invitation to Pay Additional Fees for International Application No. PCT/IB2024/060843 mailed Jan. 21, 2025, 3 pages.

Invitation to pay additional fees for International Application No. PCT/US2024/022956, mailed Sep. 11, 2024, 3 pages.

Loison et al. "Proteinase 3-dependent caspase-3 cleavage modulates neutrophil death and inflammation," J Clin Invest, Sep. 2, 2014 (Sep. 2, 2014), vol. 124, No. 10, pp. 4445-4458.

Matthews, B.W., "Structural and genetic analysis of protein stability," Annu Rev Biochem. 1993; 62:139-60.

Ng, P.C., et al., "Predicting the effects of amino acid substitutions on protein function," Annu Rev Genomics Hum Genet. 2006; 7:61-80.

Oliveira De Lima et al., "Effect of eosinophil cationic protein on human oral squamous carcinoma cell viability." Mol Clin Oncol. Mar. 2015; 3(2): 353-356. doi: 10.3892/mco.2014.477. Epub Dec. 16, 2014.

Peter, M.E., "Dice: A Novel Tumor Surveillance Mechanism—a New Therapy for Cancer?" Cell Cycle. 2014; 13(9): 1373-8. doi: 10.4161/cc.28673. Epub Apr. 1, 2014.

Raghava GPS, and Barton, G, "Quantification of the variation in percentage identity for protein sequence alignments", BMC Bioinformatics. Sep. 19, 2006: 7: 415. doi: 10.1186/1471-2105-7-415. 4 pages.

Search report by Registered Search Organization for Japanese Patent Application No. 2019-569454, submitted Mar. 25, 2022, with machine translation, 43 pages.

Shotton, et al., "Amino-acid Sequence of Porcine Pancreatic Elastase and Its Homologies With Other Serine Proteinases," Nature, 1970, vol. 225, pp. 802-806.

Teng, S. et al., "Sequence feature-based prediction of protein stability changes upon amino acid substitutions," BMC Genomics, 11(Suppl 2):S5 (2010), 8 pages.

Teng, S. et al., "Structural Assessment of the Effects of Amino Acid Substitutions on Protein Stability and Protein-Protein Interaction," Int J Comput Biol Drug Des., Jan. 1, 2010, vol. 3, No. 4, pp. 334-349.

Vandooren and Itoh, "Alpha-2-Macroglobulin in Inflammation, Immunity and Infections." Front Immunol. Dec. 14, 2021: 12: 803244. doi: 10.3389/fimmu.2021.803244. eCollection 2021. 20 pages.

Virca et al. "Kinetics of association of human proteinases with human alpha 2-macroglobulin." J Biol Chem. Jul. 25, 1984;259(14):8870-4.

Yong, Agnes, et al., "Molecular profiling of CD34 + cells identifies low expression of CD7, along with high expression of proteinase 3 or elastase, as predictors of longer survival in patients with CML." Blood. Jan. 1, 2006; 107(1): 205-12.

(56) References Cited

OTHER PUBLICATIONS

Zalewsky et al. "Apoptosis-Regulatory Factors as Potential Drug Targets in the Epithelium of Normal and Inflamed Airways," Current Molecular Pharmacology, Jan. 1, 2008, vol. 1, No. 1, pp. 38-49.

\* cited by examiner

US 12,516,307 B2

MODIFIED PORCINE PANCREATIC ELASTASE PROTEINS

CROSS-REFERENCE TO RELATED APPLICATIONS

This application is a U.S. National Stage Application under 35 U.S.C. § 371 of International Application No. PCT/US2021/046453 filed on Aug. 18, 2021, which claims the benefit under 35 U.S.C. § 119 (e) to U.S. Application No. 63/067,058, filed Aug. 18, 2020, each of which is incorporated by reference in its entirety.

STATEMENT REGARDING THE SEQUENCE LISTING

The Sequence Listing associated with this application is provided in text format in lieu of a paper copy, and is hereby incorporated by reference into the specification. The name of the text file containing the Sequence Listing is OPNI_001_01WO_ST25.txt. The text file is about 29 KB, created on Aug. 16, 2021, and is being submitted electronically via EFS-Web.

BACKGROUND

Technical Field

The present disclosure relates to modified porcine pancreatic elastase (PPE) proteins, including proproteins, comprising at least one amino acid alteration that reduces binding to serine protease inhibitors such as alpha-1 antitrypsin (A1AT), thereby increasing its cancer-cell killing activity, and related pharmaceutical compositions and methods of use for treating diseases such as cancers.

Description of the Related Art

Precision medicine, which is designed to optimize efficiency or therapeutic benefit for particular groups of patients by using genetic or molecular profiling, has gained tremendous traction for treating cancer. Identifying the specific genomic abnormalities that (i) confer risk of developing cancer, (ii) influence tumor growth, and (iii) regulate metastasis have defined how cancer is diagnosed, determined how targeted therapies are developed and implemented, and shaped cancer prevention strategies.

The need for precision medicine in cancer is largely based on the failure to identify targetable properties in tumor cells that distinguish them from healthy, non-cancer cells. Indeed, although radiation and/or chemotherapies have the capacity to effectively kill many if not most cancer cells, their efficacy is severely limited by cytotoxic effects on non-cancer cells. These findings demonstrate that rapid cell division, a property targeted by radiation therapy and chemotherapy, is not unique enough to cancer cells to achieve the specificity required to limit extensive side effects.

It has been shown that certain elastase enzymes are selectively toxic to cancer cells but relatively non-toxic to normal or otherwise healthy cells (see, for example WO 2018/232273). However, there is a need in the art to identify optimal enzymes that are capable of such selective cancer cell-toxicity, and refine the clinical utility of such enzymes.

BRIEF SUMMARY

Embodiments of the present disclosure include a modified porcine pancreatic elastase (PPE) protein, comprising at least one amino acid alteration relative to a wild-type PPE protein (SEQ ID NO: 4), wherein the at least one alteration is at a residue selected from one or more of Q211, T55, D74, R75, S214, R237, and N241, the residue numbering being defined by SEQ ID NO: 1 (wild-type PPE proprotein). In some embodiments, the at least one amino acid alteration is selected from one or more of Q211F, T55A, D74A, R75A, R75E, Q211A, S214A, R237A, N241A, and N241Y, the residue numbering being defined by SEQ ID NO: 1.

In some embodiments, the modified PPE protein comprises, consists, or consists essentially of an amino acid sequence that is at least 80, 85, 90, 95, 98, or 100% identical to a sequence selected from Table S2, and which retains the at least one amino acid alteration. In some embodiments, the modified PPE protein is selected from:

a modified PPE protein that comprises, consists, or consists essentially of SEQ ID NO: 5, or an amino acid sequence that is at least 80, 85, 90, 95, 98, or 99% identical to SEQ ID NO: 5, and which retains the Q211F amino acid substitution;

a modified PPE protein that comprises, consists, or consists essentially of SEQ ID NO: 6, or an amino acid sequence that is at least 80, 85, 90, 95, 98, or 99% identical to SEQ ID NO: 6, and which retains the T55A amino acid substitution;

a modified PPE protein that comprises, consists, or consists essentially of SEQ ID NO: 7, or an amino acid sequence that is at least 80, 85, 90, 95, 98, or 99% identical to SEQ ID NO: 7, and which retains the N241A amino acid substitution;

a modified PPE protein that comprises, consists, or consists essentially of SEQ ID NO: 8, or an amino acid sequence that is at least 80, 85, 90, 95, 98, or 99% identical to SEQ ID NO: 8, and which retains the N241Y amino acid substitution;

a modified PPE protein that comprises, consists, or consists essentially of SEQ ID NO: 9, or an amino acid sequence that is at least 80, 85, 90, 95, 98, or 99% identical to SEQ ID NO: 9, and which retains the R75A amino acid substitution;

a modified PPE protein that comprises, consists, or consists essentially of SEQ ID NO: 10, or an amino acid sequence that is at least 80, 85, 90, 95, 98, or 99% identical to SEQ ID NO: 10, and which retains the R75E amino acid substitution;

modified PPE protein that comprises, consists, or consists essentially of SEQ ID NO: 11, or an amino acid sequence that is at least 80, 85, 90, 95, 98, or 99% identical to SEQ ID NO: 11, and which retains the Q211A amino acid substitution;

a modified PPE protein that comprises, consists, or consists essentially of SEQ ID NO: 12, or an amino acid sequence that is at least 80, 85, 90, 95, 98, or 99% identical to SEQ ID NO: 12, and which retains the R237A amino acid substitution;

a modified PPE protein that comprises, consists, or consists essentially of SEQ ID NO: 13, or an amino acid sequence that is at least 80, 85, 90, 95, 98, or 99% identical to SEQ ID NO: 13, and which retains the S214A amino acid substitution; and a modified PPE protein that comprises, consists, or consists essentially of SEQ ID NO: 14, or an amino acid sequence that is at least 80, 85, 90, 95, 98, or 99% identical to SEQ ID NO: 14, and which retains the D74A amino acid substitution In some embodiments, the modified PPE protein has increased cancer cell-killing activity relative to that of the wild-type PPE protein (SEQ ID NO: 4). In some embodiments, the modified PPE protein has increased cancer cell-killing activity of about or at least about 2-fold, 5-fold, 10-fold, 50-fold, 100-fold, 500-fold, or 1000-fold or more, relative to the cancer cell-killing activity of the wild-type PPE protein (SEQ ID NO: 4). In some embodiments, the increased cancer cell-killing activity is in the absence of a human A1AT protein, in vitro or in vivo. In some embodiments, the increased cancer cell-killing activity is in the presence of a human A1AT protein, in vitro or in vivo.

In some embodiments, the modified PPE protein has reduced binding to or interaction with a human alpha-1 antitrypsin (A1AT) protein relative to that of the wild-type PPE protein (SEQ ID NO: 4). In some embodiments, the modified PPE protein of has reduced binding to the human A1AT of about or at least about 2-fold, 5-fold, 10-fold, 50-fold, 100-fold, 500-fold, or 1000-fold or more, relative to the binding of the wild-type PPE protein to the human A1AT protein. In some embodiments, the modified PPE protein has about or at least about 50, 60, 70, 80, 90, 100, 200, 300, 400, 500, 600, 700, 800, 900, or 1000% or more of the serine protease activity of the wild-type PPE.

In some embodiments, the modified PPE protein has increased serine protease activity relative to the wild-type PPE. In some embodiments, the serine protease activity is about or at least about 2-fold, 5-fold, 10-fold, 50-fold, 100-fold, 500-fold, or 1000-fold or more higher than the serine protease activity of wild-type PPE, as measured in the absence of a human A1AT protein. In some embodiments, the serine protease activity is about or at least about 2-fold, 5-fold, 10-fold, 50-fold, 100-fold, 500-fold, or 1000-fold or more higher than the serine protease activity of wild-type PPE, as measured in the presence of a human A1AT protein.

Certain embodiments include a modified PPE proprotein, comprising in an N-terminal to C-terminal orientation, a signal peptide (optionally SEQ ID NO: 2), an activation peptide (optionally SEQ ID NO: 3), and a modified PPE protein as described herein, wherein the modified PPE proprotein is activatable via protease cleavage of the activation peptide to generate an enzymatically-active, modified PPE protein.

Also included are recombinant nucleic acid molecules encoding a modified PPE protein or proprotein described herein, a vector comprising the recombinant nucleic acid molecule, or a host cell comprising the recombinant nucleic acid molecule or the vector. Certain embodiments include methods of producing a modified PPE protein or proprotein described herein, comprising culturing the host cell under culture conditions suitable for the expression of the modified PPE protein or proprotein, and isolating the modified PPE protein or proprotein from the culture.

Certain embodiments include pharmaceutical compositions, comprising a modified PPE protein or proprotein described herein, or an expressible polynucleotide encoding the modified PPE protein or proprotein, and a pharmaceutically acceptable carrier. Also included are methods of treating, ameliorating the symptoms of, and/or reducing the progression of, a cancer in a subject in need thereof, comprising administering the pharmaceutical composition to the subject. In some embodiments, the cancer is a primary cancer or a metastatic cancer, and is selected from one or more of melanoma (optionally metastatic melanoma), breast cancer (optionally triple-negative breast cancer, TNBC), kidney cancer (optionally renal cell carcinoma), pancreatic cancer, bone cancer, prostate cancer, small cell lung cancer, non-small cell lung cancer (NSCLC), mesothelioma, leukemia (optionally lymphocytic leukemia, chronic myelogenous leukemia, acute myeloid leukemia, or relapsed acute myeloid leukemia), multiple myeloma, lymphoma, hepatoma (hepatocellular carcinoma), sarcoma, B-cell malignancy, ovarian cancer, colorectal cancer, glioma, glioblastoma multiforme, meningioma, pituitary adenoma, vestibular schwannoma, primary CNS lymphoma, primitive neuroectodermal tumor (medulloblastoma), bladder cancer, uterine cancer, esophageal cancer, brain cancer, head and neck cancers, cervical cancer, testicular cancer, thyroid cancer, and stomach cancer.

In some embodiments, the pharmaceutical compositions comprises the modified PPE proprotein, which is activated by protease cleavage of the activation peptide in a cancer tissue or tumor site of the subject in need thereof, to generate an enzymatically-active, modified PPE protein. In some embodiments, administering the pharmaceutical composition increases cancer cell-killing in the subject by about or at least about 2-fold, 5-fold, 10-fold, 50-fold, 100-fold, 500-fold, or 1000-fold or more relative to a control or reference. In some embodiments, administering the pharmaceutical composition results in tumor regression in the subject, optionally as indicated by a statistically significant decrease in the amount of viable tumor or tumor mass, optionally at least about a 10%, 20%, 30%, 40%, 50% or more decrease in tumor mass.

Certain embodiments comprise administering the pharmaceutical composition to the subject by parenteral administration or by intra-tumoral administration. In some embodiments, the parenteral administration is intravenous administration.

BRIEF DESCRIPTION OF THE FIGURES

As shown in FIG. 1A, incubation of native PPE (active PPE peptidase domain) with trypsin did not result in the appearance of lower molecular weight bands, suggesting that trypsin does not further cleave the PPE protein forms following initial conversion to active PPE.

FIG. 3A shows activity of increasing doses of test proteins, and FIG. 3B shows the activity of test proteins in the absence or presence of increasing amounts of the A1AT serine protease inhibitor (cancer cell-killing efficacy in the absence of A1AT was set to 100%. *, p<0.05, Student+s t-test; relative to wild-type PPE).

DETAILED DESCRIPTION

Figure 1A:
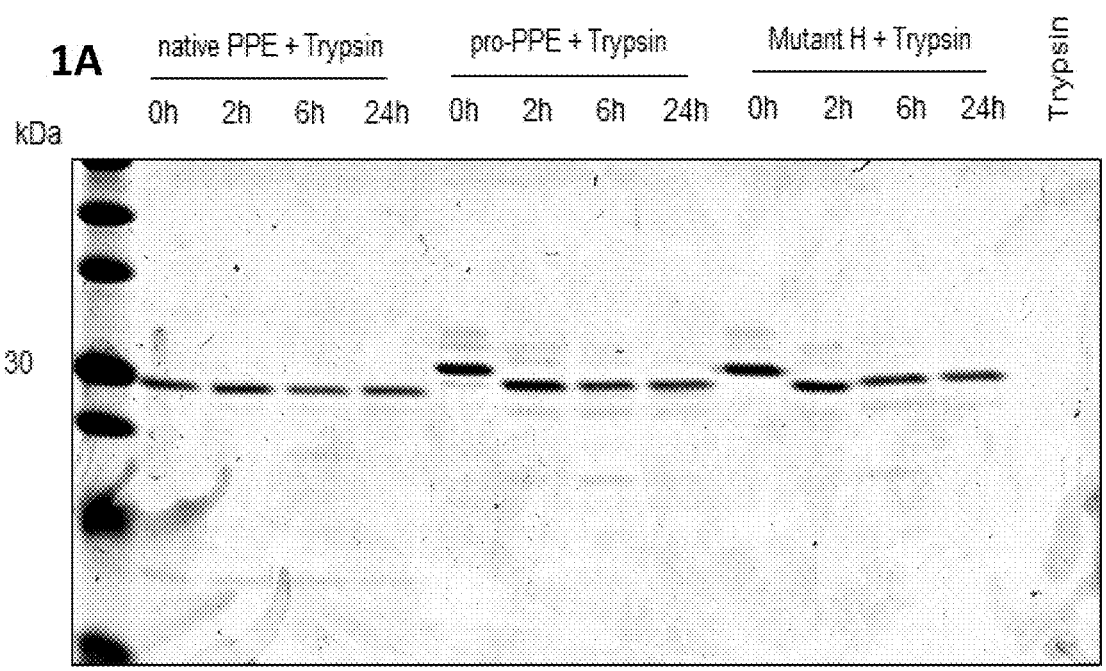
FIGS. 1A-1D show effective trypsin cleavage of wild-type and modified PPE proproteins monitored by SDS-PAGE and Coomassie blue staining.
Figure 1B:
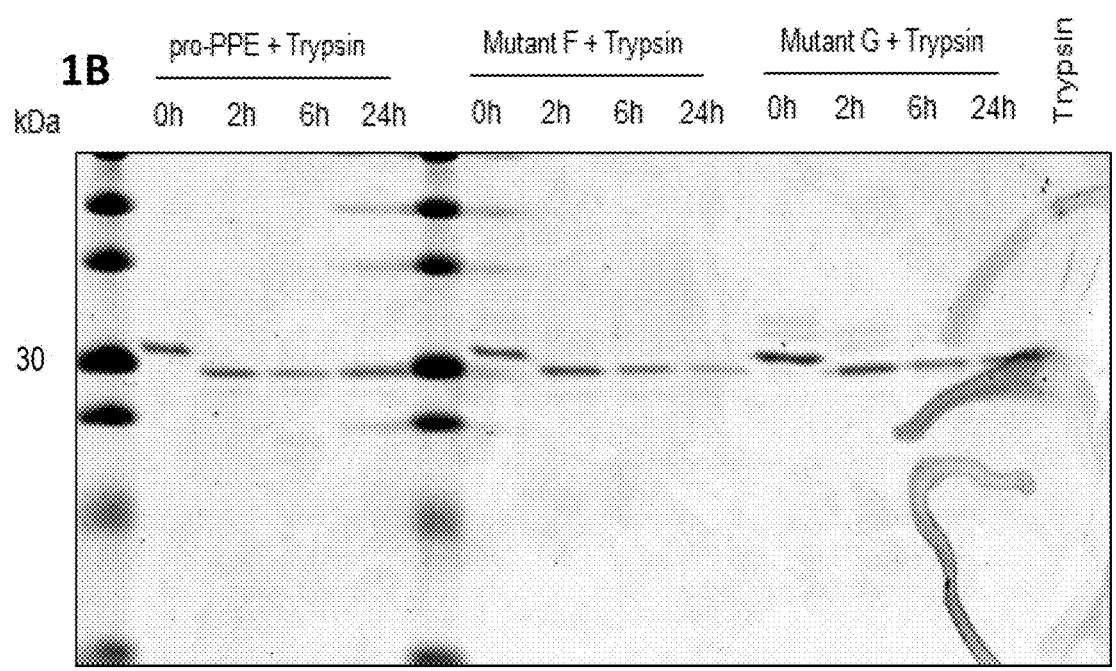
Figure 1C:
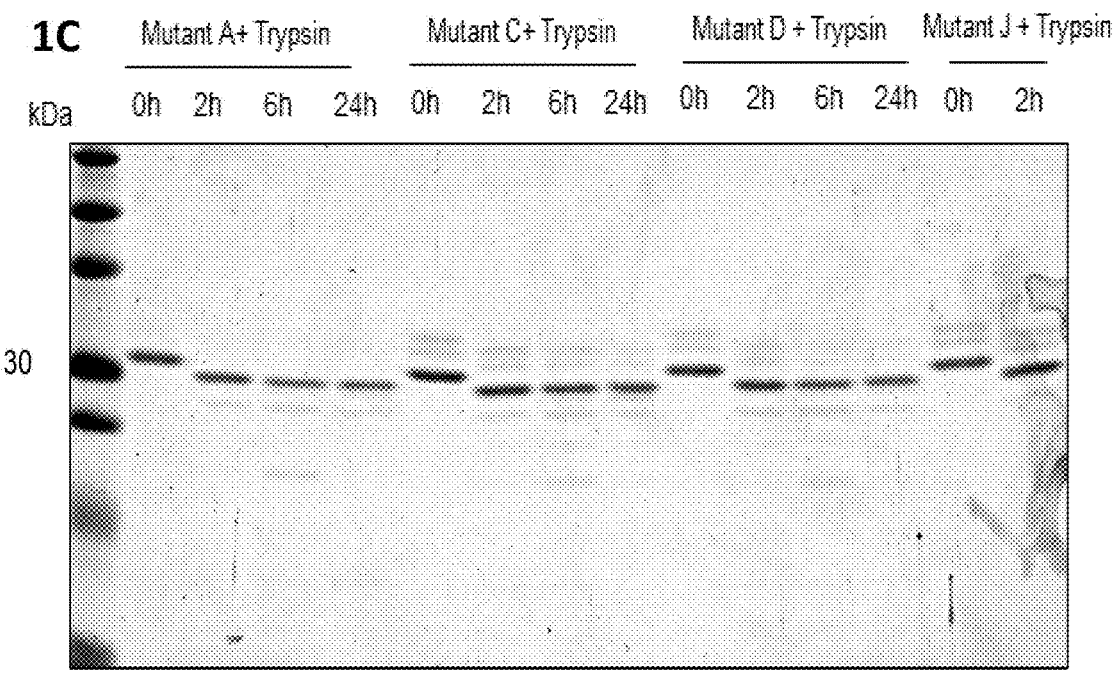
Figure 1D:
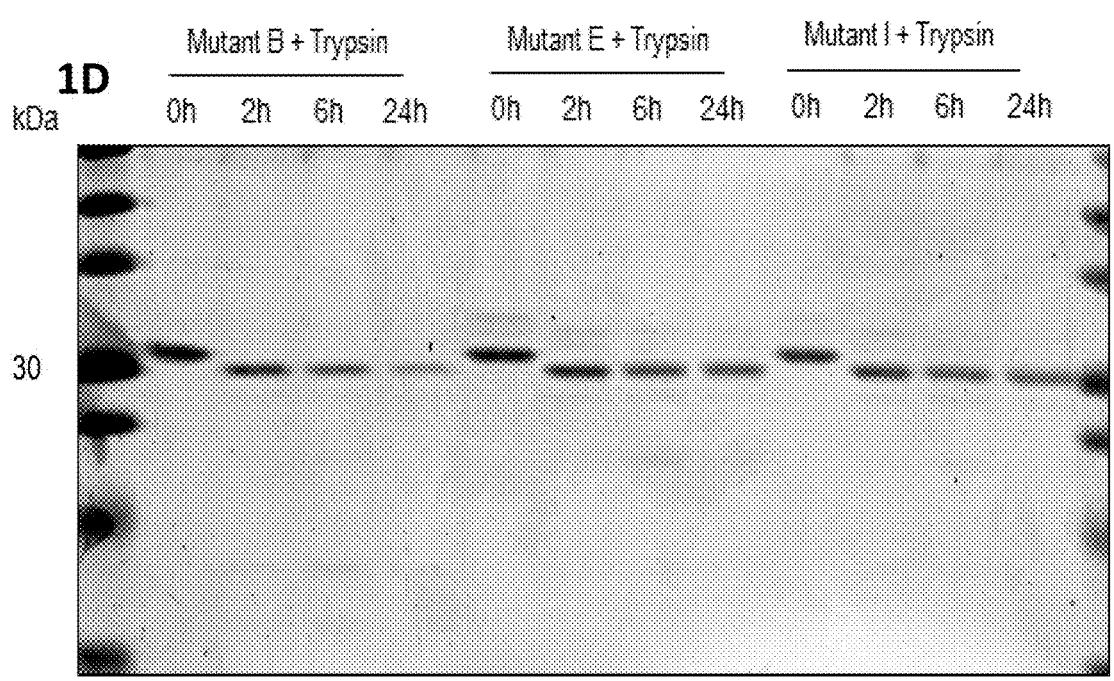

Unless defined otherwise, all technical and scientific terms used herein have the same meaning as commonly understood by those of ordinary skill in the art to which the disclosure belongs. Although any methods, materials, compositions, reagents, cells, similar or equivalent similar or equivalent to those described herein can be used in the practice or testing of the subject matter of the present disclosure, preferred methods and materials are described. All publications and references, including but not limited to patents and patent applications, cited in this specification are herein incorporated by reference in their entirety as if each individual publication or reference were specifically and individually indicated to be incorporated by reference herein as being fully set forth. Any patent application to which this application claims priority is also incorporated by reference herein in its entirety in the manner described above for publications and references.

Standard techniques may be used for recombinant DNA, oligonucleotide synthesis, and tissue culture and transformation (e.g., electroporation, lipofection). Enzymatic reactions and purification techniques may be performed according to manufacturer's specifications or as commonly accomplished in the art or as described herein. These and related techniques and procedures may be generally performed according to conventional methods well known in the art and as described in various general and more specific references that are cited and discussed throughout the present specification. Unless specific definitions are provided, the nomenclature utilized in connection with, and the laboratory procedures and techniques of, molecular biology, analytical chemistry, synthetic organic chemistry, and medicinal and pharmaceutical chemistry described herein are those well-known and commonly used in the art. Standard techniques may be used for recombinant technology, molecular biological, microbiological, chemical syntheses, chemical analyses, pharmaceutical preparation, formulation, and delivery, and treatment of patients.

For the purposes of the present disclosure, the following terms are defined below.

The articles "a" and "an" are used herein to refer to one or to more than one (i.e., to at least one) of the grammatical object of the article. By way of example, "an element" includes "one element", "one or more elements" and/or "at least one element".

By "about" is meant a quantity, level, value, number, frequency, percentage, dimension, size, amount, weight or length that varies by as much as 20, 15, 10, 9, 8, 7, 6, 5, 4, 3, 2 or 1% to a reference quantity, level, value, number, frequency, percentage, dimension, size, amount, weight or length.

An "antagonist" refers to biological structure or chemical agent that interferes with or otherwise reduces the physiological action of another agent or molecule. In some instances, the antagonist specifically binds to the other agent or molecule. Included are full and partial antagonists.

An "agonist" refers to biological structure or chemical agent that increases or enhances the physiological action of another agent or molecule. In some instances, the agonist specifically binds to the other agent or molecule. Included are full and partial agonists.

As used herein, the term "amino acid" is intended to mean both naturally occurring and non-naturally occurring amino acids as well as amino acid analogs and mimetics. Naturally-occurring amino acids include the 20 (L)-amino acids utilized during protein biosynthesis as well as others such as 4-hydroxyproline, hydroxylysine, desmosine, isodesmosine, homocysteine, citrulline and ornithine, for example. Non-naturally occurring amino acids include, for example, (D)-amino acids, norleucine, norvaline, p-fluorophenylalanine, ethionine and the like, which are known to a person skilled in the art. Amino acid analogs include modified forms of naturally and non-naturally occurring amino acids. Such modifications can include, for example, substitution or replacement of chemical groups and moieties on the amino acid or by derivatization of the amino acid. Amino acid mimetics include, for example, organic structures which exhibit functionally similar properties such as charge and charge spacing characteristic of the reference amino acid. For example, an organic structure which mimics arginine (Arg or R) would have a positive charge moiety located in similar molecular space and having the same degree of mobility as the e-amino group of the side chain of the naturally occurring Arg amino acid. Mimetics also include constrained structures so as to maintain optimal spacing and charge interactions of the amino acid or of the amino acid functional groups. Those skilled in the art know or can determine what structures constitute functionally equivalent amino acid analogs and amino acid mimetics.

As used herein, a subject "at risk" of developing a disease, or adverse reaction may or may not have detectable disease, or symptoms of disease, and may or may not have displayed detectable disease or symptoms of disease prior to the treatment methods described herein. "At risk" denotes that a subject has one or more risk factors, which are measurable parameters that correlate with development of a disease, as described herein and known in the art. A subject having one or more of these risk factors has a higher probability of developing disease, or an adverse reaction than a subject without one or more of these risk factor(s).

"Biocompatible" refers to materials or compounds which are generally not injurious to biological functions of a cell or subject and which will not result in any degree of unacceptable toxicity, including allergenic and disease states.

The term "binding" refers to a direct association between two molecules, due to, for example, covalent, electrostatic, hydrophobic, and ionic and/or hydrogen-bond interactions, including interactions such as salt bridges and water bridges.

By "coding sequence" is meant any nucleic acid sequence that contributes to the code for the polypeptide product of a gene. By contrast, the term "non-coding sequence" refers to any nucleic acid sequence that does not directly contribute to the code for the polypeptide product of a gene.

Throughout this disclosure, unless the context requires otherwise, the words "comprise," "comprises," and "comprising" will be understood to imply the inclusion of a stated step or element or group of steps or elements but not the exclusion of any other step or element or group of steps or elements.

By "consisting of" is meant including, and limited to, whatever follows the phrase "consisting of." Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements.

The term "endotoxin free" or "substantially endotoxin free" relates generally to compositions, solvents, and/or vessels that contain at most trace amounts (e.g., amounts having no clinically adverse physiological effects to a subject) of endotoxin, and preferably undetectable amounts of endotoxin. Endotoxins are toxins associated with certain micro-organisms, such as bacteria, typically gram-negative bacteria, although endotoxins may be found in gram-positive bacteria, such as *Listeria monocytogenes*. The most prevalent endotoxins are lipopolysaccharides (LPS) or lipo-oligo-saccharides (LOS) found in the outer membrane of various Gram-negative bacteria, and which represent a central pathogenic feature in the ability of these bacteria to cause disease. Small amounts of endotoxin in humans may produce fever, a lowering of the blood pressure, and activation of inflammation and coagulation, among other adverse physiological effects.

Therefore, in pharmaceutical production, it is often desirable to remove most or all traces of endotoxin from drug products and/or drug containers, because even small amounts may cause adverse effects in humans. A depyrogenation oven may be used for this purpose, as temperatures in excess of 300° C. are typically required to break down most endotoxins. For instance, based on primary packaging material such as syringes or vials, the combination of a glass temperature of 250° C. and a holding time of 30 minutes is often sufficient to achieve a 3 log reduction in endotoxin levels. Other methods of removing endotoxins are contemplated, including, for example, chromatography and filtration methods, as described herein and known in the art.

Endotoxins can be detected using routine techniques known in the art. For example, the Limulus Amoebocyte Lysate assay, which utilizes blood from the horseshoe crab, is a very sensitive assay for detecting presence of endotoxin. In this test, very low levels of LPS can cause detectable coagulation of the limulus lysate due a powerful enzymatic cascade that amplifies this reaction. Endotoxins can also be quantitated by enzyme-linked immunosorbent assay (ELISA). To be substantially endotoxin free, endotoxin levels may be less than about 0.001, 0.005, 0.01, 0.02, 0.03, 0.04, 0.05, 0.06, 0.08, 0.09, 0.1, 0.5, 1.0, 1.5, 2, 2.5, 3, 4, 5, 6, 7, 8, 9, or 10 EU/mg of active compound. Typically, 1 ng lipopolysaccharide (LPS) corresponds to about 1-10 EU.

The term "half maximal effective concentration" or "$EC_{50}$" refers to the concentration of an agent (e.g., modified PPE) as described herein at which it induces a response halfway between the baseline and maximum after some specified exposure time; the $EC_{50}$ of a graded dose response curve therefore represents the concentration of a compound at which 50% of its maximal effect is observed. $EC_{50}$ also represents the plasma concentration required for obtaining 50% of a maximum effect in vivo. Similarly, the "$EC_{90}$" refers to the concentration of an agent or composition at which 90% of its maximal effect is observed. The "$EC_{90}$" can be calculated from the "$EC_{50}$" and the Hill slope, or it can be determined from the data directly, using routine knowledge in the art. In some embodiments, the $EC_{50}$ of an agent (e.g., modified PPE) is less than about 0.01, 0.05, 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 25, 30, 40, 50, 60, 70, 80, 90, 100, 200 or 500 nM. In some embodiments, an agent will have an $EC_{50}$ value of about 1 nM or less.

The "half-life" of an agent such as a modified PPE can refer to the time it takes for the agent to lose half of its pharmacologic, physiologic, or other activity, relative to such activity at the time of administration into the serum or tissue of an organism, or relative to any other defined time-point. "Half-life" can also refer to the time it takes for the amount or concentration of an agent to be reduced by half of a starting amount administered into the serum or tissue of an organism, relative to such amount or concentration at the time of administration into the serum or tissue of an organism, or relative to any other defined time-point. The half-life can be measured in serum and/or any one or more selected tissues.

The term "heterologous" refers to a feature or element (e.g., protease cleavage site) in a polypeptide or encoding polynucleotide that is derived from a different source than the wild-type polypeptide or encoding polynucleotide, for example, a feature from a different species than the wild-type, or a non-natural, engineered feature.

The terms "modulating" and "altering" include "increasing," "enhancing" or "stimulating," as well as "decreasing" or "reducing," typically in a statistically significant or a physiologically significant amount or degree relative to a control. An "increased," "stimulated" or "enhanced" amount is typically a "statistically significant" amount, and may include an increase that is about or at least about 1.1, 1.2, 1.5, 2, 3, 4, 5, 6, 7, 8, 9, 10, 15, 20, 30, 40, 50, 60, 70, 80, 90, 100, 200, 300, 400, 500, 1000-fold more than the amount produced by no composition (e.g., the absence of agent) or a control composition. A "decreased" or "reduced" amount is typically a "statistically significant" amount, and may include a decrease that about or at least about 1.1, 1.2, 1.5, 2, 3, 4, 5, 6, 7, 8, 9, 10, 15, 20, 30, 40, 50, 60, 70, 80, 90, 100, 200, 300, 400, 500, or 1000-fold less than the amount produced by no composition (e.g., the absence of an agent) or a control composition. Examples of comparisons and "statistically significant" amounts are described herein.

The terms "polypeptide," "protein", and "peptide" are used interchangeably and refer to a polymer of amino acids not limited to any particular length. The term "enzyme" includes polypeptide or protein catalysts. As used herein a "proprotein", "proenzyme", or "zymogen" refers to an inactive (or substantially inactive) protein or enzyme, which typically is activated by protease cleavage of an activation peptide to generate an active protein or enzyme. The terms include modifications such as myristoylation, sulfation, glycosylation, phosphorylation and addition or deletion of signal sequences. The terms "polypeptide" or "protein" means one or more chains of amino acids, wherein each chain comprises amino acids covalently linked by peptide bonds, and wherein said polypeptide or protein can comprise a plurality of chains non-covalently and/or covalently linked together by peptide bonds, having the sequence of native proteins, that is, proteins produced by naturally-occurring and specifically non-recombinant cells, or genetically-engineered or recombinant cells, and comprise molecules having the amino acid sequence of the native protein, or molecules having deletions from, additions to, and/or substitutions of one or more amino acids of the native sequence. In certain embodiments, the polypeptide is a "recombinant" polypeptide, produced by recombinant cell that comprises one or more recombinant DNA molecules, which are typically made of heterologous polynucleotide sequences or combinations of polynucleotide sequences that would not otherwise be found in the cell.

The term "polynucleotide" and "nucleic acid" includes mRNA, RNA, CRNA, cDNA, and DNA. The term typically refers to polymeric form of nucleotides of at least 10 bases in length, either ribonucleotides or deoxynucleotides or a modified form of either type of nucleotide. The term includes single and double stranded forms of DNA. The terms "isolated DNA" and "isolated polynucleotide" and "isolated nucleic acid" refer to a molecule that has been isolated free of total genomic DNA of a particular species. Therefore, an isolated DNA segment encoding a polypeptide refers to a DNA segment that contains one or more coding sequences yet is substantially isolated away from, or purified free from, total genomic DNA of the species from which the DNA segment is obtained. Also included are non-coding polynucleotides (e.g., primers, probes, oligonucleotides), which do not encode a polypeptide. Also included are recombinant vectors, including, for example, expression vectors, viral vectors, plasmids, cosmids, phagemids, phage, viruses, and the like.

Additional coding or non-coding sequences may, but need not, be present within a polynucleotide described herein, and a polynucleotide may, but need not, be linked to other molecules and/or support materials. Hence, a polynucleotide or expressible polynucleotides, regardless of the length of the coding sequence itself, may be combined with other sequences, for example, expression control sequences.

"Expression control sequences" include regulatory sequences of nucleic acids, or the corresponding amino acids, such as promoters, leaders, enhancers, introns, recognition motifs for RNA, or DNA binding proteins, polyadenylation signals, terminators, internal ribosome entry sites (IRES), secretion signals, subcellular localization signals, and the like, which have the ability to affect the transcription or translation, or subcellular, or cellular location of a coding sequence in a host cell. Exemplary expression control sequences are described in Goeddel; Gene Expression Technology: Methods in Enzymology 185, Academic Press, San Diego, Calif. (1990).

A "promoter" is a DNA regulatory region capable of binding RNA polymerase in a cell and initiating transcription of a downstream (3' direction) coding sequence. As used herein, the promoter sequence is bounded at its 3' terminus by the transcription initiation site and extends upstream (5' direction) to include the minimum number of bases or elements necessary to initiate transcription at levels detectable above background. A transcription initiation site (conveniently defined by mapping with nuclease S1) can be found within a promoter sequence, as well as protein binding domains (consensus sequences) responsible for the binding of RNA polymerase. Eukaryotic promoters can often, but not always, contain "TATA" boxes and "CAT" boxes. Prokaryotic promoters contain Shine-Dalgarno sequences in addition to the −10 and −35 consensus sequences.

A large number of promoters, including constitutive, inducible and repressible promoters, from a variety of different sources are well known in the art. Representative sources include for example, viral, mammalian, insect, plant, yeast, and bacterial cell types), and suitable promoters from these sources are readily available, or can be made synthetically, based on sequences publicly available on line or, for example, from depositories such as the ATCC as well as other commercial or individual sources. Promoters can be unidirectional (i.e., initiate transcription in one direction) or bi-directional (i.e., initiate transcription in either a 3' or 5' direction). Non-limiting examples of promoters include, for example, the T7 bacterial expression system, pBAD (araA) bacterial expression system, the cytomegalovirus (CMV) promoter, the SV40 promoter, the RSV promoter. Inducible promoters include the Tet system, (U.S. Pat. Nos. 5,464,758 and 5,814,618), the Ecdysone inducible system (No et al., Proc. Natl. Acad. Sci. (1996) 93 (8): 3346-3351; the T-REX™ system (Invitrogen Carlsbad, CA), LacSwitch® (Stratagene, (San Diego, CA) and the Cre-ERT tamoxifen inducible recombinase system (Indra et al. Nuc. Acid. Res. (1999) 27 (22): 4324-4327; Nuc. Acid. Res. (2000) 28 (23): e99; U.S. Pat. No. 7,112,715; and Kramer & Fussenegger, Methods Mol. Biol. (2005) 308:123-144) or any promoter known in the art suitable for expression in the desired cells.

An "expressible polynucleotide" includes a cDNA, RNA, mRNA or other polynucleotide that comprises at least one coding sequence and optionally at least one expression control sequence, for example, a transcriptional and/or translational regulatory element, and which can express an encoded polypeptide (for example, a modified PPE proprotein) upon introduction into a cell, for example, a cell in a subject.

In some embodiments, the expressible polynucleotide is a modified RNA or modified mRNA polynucleotide, for example, a non-naturally occurring RNA analog. In certain embodiments, the modified RNA or mRNA polypeptide comprises one or more modified or non-natural bases, for example, a nucleotide base other than adenine (A), guanine (G), cytosine (C), thymine (T), and/or uracil (U). In some embodiments, the modified mRNA comprises one or more modified or non-natural internucleotide linkages. Expressible RNA polynucleotides for delivering an encoded therapeutic polypeptide are described, for example, in Kormann et al., Nat Biotechnol. 29:154-7, 2011; and U.S. Application Nos. 2015/0111248; 2014/0243399; 2014/0147454; and 2013/0245104, which are incorporated by reference in their entireties.

In some embodiments, various viral vectors that can be utilized to deliver an expressible polynucleotide include adenoviral vectors, herpes virus vectors, vaccinia virus vectors, adeno-associated virus (AAV) vectors, and retroviral vectors. In some instances, the retroviral vector is a derivative of a murine or avian retrovirus, or is a lentiviral vector. Examples of retroviral vectors in which a single foreign gene can be inserted include, but are not limited to: Moloney murine leukemia virus (MoMuLV), Harvey murine sarcoma virus (HaMuSV), murine mammary tumor virus (MuMTV), SIV, BIV, HIV and Rous Sarcoma Virus (RSV). A number of additional retroviral vectors can incorporate multiple genes. All of these vectors can transfer or incorporate a gene for a selectable marker so that transduced cells can be identified and generated. By inserting a polypeptide sequence of interest into the viral vector, along with another gene that encodes the ligand for a receptor on a specific target cell, for example, the vector may be made target specific. Retroviral vectors can be made target specific by inserting, for example, a polynucleotide encoding a protein. Illustrative targeting may be accomplished by using an antibody to target the retroviral vector. Those of skill in the art will know of, or can readily ascertain without undue experimentation, specific polynucleotide sequences which can be inserted into the retroviral genome to allow target specific delivery of the retroviral vector.

In certain instances, the expressible polynucleotides described herein are engineered for localization within a cell, potentially within a specific compartment such as the nucleus, or are engineered for secretion from the cell or translocation to the plasma membrane of the cell. In exemplary embodiments, the expressible polynucleotides are engineered for nuclear localization.

The term "isolated" polypeptide or protein referred to herein means that a subject protein (1) is free of at least some other proteins with which it would typically be found in nature, (2) is essentially free of other proteins from the same source, e.g., from the same species, (3) is expressed by a cell from a different species, (4) has been separated from at least about 50 percent of polynucleotides, lipids, carbohydrates, or other materials with which it is associated in nature, (5) is not associated (by covalent or non-covalent interaction) with portions of a protein with which the "isolated protein" is associated in nature, (6) is operably associated (by covalent or non-covalent interaction) with a polypeptide with which it is not associated in nature, or (7) does not occur in nature. Such an isolated protein can be encoded by genomic DNA, cDNA, mRNA or other RNA, of may be of synthetic origin, or any combination thereof. In certain embodiments, the isolated protein is substantially free from proteins or polypeptides or other contaminants that are found in its natural environment that would interfere with its use (therapeutic, diagnostic, prophylactic, research or otherwise).

In certain embodiments, the "purity" of any given agent (e.g., modified PPE) in a composition may be defined. For instance, certain compositions may comprise an agent such as a polypeptide agent that is at least 80%, 85%, 90%, 91%, 92%, 93%, 94%, 95%, 96%, 97%, 98%, 99%, or 100% pure on a protein basis or a weight-weight basis, including all decimals and ranges in between, as measured, for example and by no means limiting, by high performance liquid chromatography (HPLC), a well-known form of column chromatography used frequently in biochemistry and analytical chemistry to separate, identify, and quantify compounds.

The term "reference sequence" refers generally to a nucleic acid coding sequence, or amino acid sequence, to which another sequence is being compared. All polypeptide and polynucleotide sequences described herein are included as references sequences, including those described by name and those described in the Tables and the Sequence Listing.

Certain embodiments include biologically active "variants" and "fragments" of the proteins/polypeptides described herein, and the polynucleotides that encode the same. "Variants" contain one or more substitutions, additions, deletions, and/or insertions relative to a reference polypeptide or polynucleotide (see, e.g., the Tables and the Sequence Listing). A variant polypeptide or polynucleotide comprises an amino acid or nucleotide sequence with at least about 50%, 55%, 60%, 65%, 70%, 75%, 80%, 85%, 90%, 91%, 92%, 93%, 94%, 95%, 96%, 97%, 98%, 99% or more sequence identity or similarity or homology to a reference sequence, as described herein, and substantially retains the activity of that reference sequence. Also included are sequences that consist of or differ from a reference sequences by the addition, deletion, insertion, or substitution of 1, 2, 3, 4, 5, 6, 7, 8, 9, 10, 11, 12, 13, 14, 15, 16, 17, 18, 19, 20, 30, 40, 50, 60, 70, 80, 90, 100, 110, 120, 130, 140, 150 or more amino acids or nucleotides and which substantially retain at least one activity of that reference sequence. In certain embodiments, the additions or deletions include C-terminal and/or N-terminal additions and/or deletions.

The terms "sequence identity" or, for example, comprising a "sequence 50% identical to," as used herein, refer to the extent that sequences are identical on a nucleotide-by-nucleotide basis or an amino acid-by-amino acid basis over a window of comparison. Thus, a "percentage of sequence identity" may be calculated by comparing two optimally aligned sequences over the window of comparison, determining the number of positions at which the identical nucleic acid base (e.g., A, T, C, G, I) or the identical amino acid residue (e.g., Ala, Pro, Ser, Thr, Gly, Val, Leu, Ile, Phe, Tyr, Trp, Lys, Arg, His, Asp, Glu, Asn, Gln, Cys and Met) occurs in both sequences to yield the number of matched positions, dividing the number of matched positions by the total number of positions in the window of comparison (i.e., the window size), and multiplying the result by 100 to yield the percentage of sequence identity. Optimal alignment of sequences for aligning a comparison window may be conducted by computerized implementations of algorithms (GAP, BESTFIT, FASTA, and TFASTA in the Wisconsin Genetics Software Package Release 7.0, Genetics Computer Group, 575 Science Drive Madison, Wis., USA) or by inspection and the best alignment (i.e., resulting in the highest percentage homology over the comparison window) generated by any of the various methods selected. Reference also may be made to the BLAST family of programs as for example disclosed by Altschul et al., Nucl. Acids Res. 25:3389, 1997.

The term "solubility" refers to the property of an agent (e.g., modified PPE) described herein herein to dissolve in a liquid solvent and form a homogeneous solution. Solubility is typically expressed as a concentration, either by mass of solute per unit volume of solvent (g of solute per kg of solvent, g per dL (100 mL), mg/ml, etc.), molarity, molality, mole fraction or other similar descriptions of concentration. The maximum equilibrium amount of solute that can dissolve per amount of solvent is the solubility of that solute in that solvent under the specified conditions, including temperature, pressure, pH, and the nature of the solvent. In certain embodiments, solubility is measured at physiological pH, or other pH, for example, at pH 5.0, pH 6.0, pH 7.0, pH 7.4, pH 7.6, pH 7.8, or pH 8.0 (e.g., about pH 5-8). In certain embodiments, solubility is measured in water or a physiological buffer such as PBS or NaCl (with or without $NaPO_4$). In specific embodiments, solubility is measured at relatively lower pH (e.g., pH 6.0) and relatively higher salt (e.g., 500 mM NaCl and 10 mM $NaPO_4$). In certain embodiments, solubility is measured in a biological fluid (solvent) such as blood or serum. In certain embodiments, the temperature can be about room temperature (e.g., about 20, 21, 22, 23, 24, 25° C.) or about body temperature (37° C.). In certain embodiments, an agent has a solubility of at least about 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 25, 30, 40, 50, 60, 70, 80, 90 or 100 mg/ml at room temperature or at 37° C.

A "subject" or a "subject in need thereof" or a "patient" or a "patient in need thereof" includes a mammalian subject such as a human subject.

"Substantially" or "essentially" means nearly totally or completely, for instance, 95%, 96%, 97%, 98%, 99% or greater of some given quantity.

By "statistically significant," it is meant that the result was unlikely to have occurred by chance. Statistical significance can be determined by any method known in the art. Commonly used measures of significance include the p-value, which is the frequency or probability with which the observed event would occur, if the null hypothesis were true. If the obtained p-value is smaller than the significance level, then the null hypothesis is rejected. In simple cases, the significance level is defined at a p-value of 0.05 or less.

"Therapeutic response" refers to improvement of symptoms (whether or not sustained) based on administration of one or more therapeutic agents.

As used herein, the terms "therapeutically effective amount", "therapeutic dose," "prophylactically effective amount," or "diagnostically effective amount" is the amount of an agent (e.g., modified PPE protein) needed to elicit the desired biological response following administration.

As used herein, "treatment" of a subject (e.g., a mammal, such as a human) or a cell is any type of intervention used in an attempt to alter the natural course of the individual or cell. Treatment includes, but is not limited to, administration of a pharmaceutical composition, and may be performed either prophylactically or subsequent to the initiation of a pathologic event or contact with an etiologic agent. Also included are "prophylactic" treatments, which can be directed to reducing the rate of progression of the disease or condition being treated, delaying the onset of that disease or condition, or reducing the severity of its onset. "Treatment" or "prophylaxis" does not necessarily indicate complete eradication, cure, or prevention of the disease or condition, or associated symptoms thereof.

The term "wild-type" refers to a gene or gene product (e.g., a polypeptide) that is most frequently observed in a population and is thus arbitrarily designed the "normal" or "wild-type" form of the gene.

Each embodiment in this specification is to be applied to every other embodiment unless expressly stated otherwise.

Modified PPE Proteins

Embodiments of the present disclosure include modified porcine pancreatic elastase (PPE) proteins, comprising at least one amino acid alteration relative to a wild-type PPE protein (for example, SEQ ID NO: 4), including alterations at one or more of residues Q211, T55, D74, R75, S214, R237, and/or N241, the numbering being defined by SEQ ID NO: 1 (wild-type PPE proprotein). Pancreatic elastases, such as PPE, are a class of serine proteases that are produced as an inactive zymogen (or proprotein, proenzyme) composed of a signal peptide, an activation peptide, and a peptidase domain. The wild-type PPE proprotein is activated by trypsin cleavage of the activation peptide to release the enzymatically-active PPE peptidase domain, or PPE protein. The amino acid sequences of wild-type PPE and its domains are provided in Table S1.

As described herein, PPE is able to kill cancer cells, irrespective of their genetic abnormalities, and is relatively harmless to non-cancerous or healthy cells. However, one barrier to anti-tumor efficacy of PPE is the presence serine protease inhibitors, such as alpha-1 antitrypsin (A1AT; UniProtKB-P01009), in the blood and tumor microenvironment. In some instances, A1AT binds to wild-type PPE and inhibits its catalytic activity, thereby impairing wild-type PPE's cancer cell-killing activity.

Embodiments of the present disclosure thus relate to modified PPEs that have increased cancer cell-killing activity, and/or reduced binding to and/or interactions with a human A1AT protein relative to that of the wild-type PPE protein. In particular embodiments, the at least one amino acid alteration is in the wild-type PPE peptidase domain (SEQ ID NO: 4), at one or more of residues Q211, T55, D74, R75, S214, R237, and/or N241, the numbering being defined by SEQ ID NO: 1. In some embodiments, the at least one amino acid alteration is an amino acid substitution, deletion, and/or addition. In some embodiments, the at least one amino acid alteration is selected from one or more of Q211F, T55A, D74A, R75A, R75E, Q211A, S214A, R237A, N241A, and N241Y, the numbering being defined by SEQ ID NO: 1. Exemplary amino acid sequences of modified PPE proteins (active PPE peptidase domains) are provided in Table S2.

TABLE S1

| Name | Sequence | SEQ ID NO: |
|---|---|---|
| WT PPE proprotein, signal peptide underlined | MLRLLVVASLVLYGHSTQDFPETNARVVGGTEAQRNSWPSQISLQY RSGSSWAHTCGGTLIRQNWVMTAAHCVDRELTFRVVVGEHNLNQND GTEQYVGVQKIVVHPYWNTDDVAAGYDIALLRLAQSVTLNSYVQLG VLPRAGTILANNSPCYITGWGLTRTNGQLAQTLQQAYLPTVDYAIC SSSSYWGSTVKNSMVCAGGDGVRSGCQGDSGGPLHCLVNGQYAVHG VTSFVSRLGCNVTRKPTVFTRVSAYISWINNVIASN | 1 |
| WT PPE signal peptide | MLRLLVVASLVLYGHS | 2 |
| WT PPE activation peptide; trypsin cleavage site underlined | TQDFPETNAR/VVGG | 3 |
| WT PPE protein; peptidase domain | VVGGTEAQRNSWPSQISLQYRSGSSWAHTCGGTLIRQNWVMTAAHC VDRELTFRVVVGEHNLNQNDGTEQYVGVQKIVVHPYWNTDDVAAGY DIALLRLAQSVTLNSYVQLGVLPRAGTILANNSPCYITGWGLTRTN GQLAQTLQQAYLPTVDYAICSSSSYWGSTVKNSMVCAGGDGVRSGC QGDSGGPLHCLVNGQYAVHGVTSFVSRLGCNVTRKPTVFTRVSAYI SWINNVIASN | 4 |

TABLE S2

Modified PPE Peptidase Domain Sequences

| Name | Sequence | SEQ ID NO: |
|---|---|---|
| Mutant F Q211F | VVGGTEAQRNSWPSQISLQYRSGSSWAHTCGGTLIRQNWVMTAAHCVDRELT FRVVVGEHNLNQNDGTEQYVGVQKIVVHPYWNTDDVAAGYDIALLRLAQSVT LNSYVQLGVLPRAGTILANNSPCYITGWGLTRTNGQLAQTLQQAYLPTVDYA ICSSSSYWGSTVKNSMVCAGGDGVRSGCFGDSGGPLHCLVNGQYAVHGVTSF VSRLGCNVTRKPTVFTRVSAYISWINNVIASN | 5 |
| Mutant H T55A | VVGGTEAQRNSWPSQISLQYRSGSSWAHACGGTLIRQNWVMTAAHCVDRELT FRVVVGEHNLNQNDGTEQYVGVQKIVVHPYWNTDDVAAGYDIALLRLAQSVT LNSYVQLGVLPRAGTILANNSPCYITGWGLTRTNGQLAQTLQQAYLPTVDYA ICSSSSYWGSTVKNSMVCAGGDGVRSGCQGDSGGPLHCLVNGQYAVHGVTSF VSRLGCNVTRKPTVFTRVSAYISWINNVIASN | 6 |
| Mutant A N241A | VVGGTEAQRNSWPSQISLQYRSGSSWAHTCGGTLIRQNWVMTAAHCVDRELT FRVVVGEHNLNQNDGTEQYVGVQKIVVHPYWNTDDVAAGYDIALLRLAQSVT LNSYVQLGVLPRAGTILANNSPCYITGWGLTRTNGQLAQTLQQAYLPTVDYA ICSSSSYWGSTVKNSMVCAGGDGVRSGCQGDSGGPLHCLVNGQYAVHGVTSF VSRLGCAVTRKPTVFTRVSAYISWINNVIASN | 7 |
| Mutant B N241Y | VVGGTEAQRNSWPSQISLQYRSGSSWAHTCGGTLIRQNWVMTAAHCVDRELT FRVVVGEHNLNQNDGTEQYVGVQKIVVHPYWNTDDVAAGYDIALLRLAQSVT LNSYVQLGVLPRAGTILANNSPCYITGWGLTRTNGQLAQTLQQAYLPTVDYA ICSSSSYWGSTVKNSMVCAGGDGVRSGCQGDSGGPLHCLVNGQYAVHGVTSF VSRLGCYVTRKPTVFTRVSAYISWINNVIASN | 8 |
| Mutant C R75A | VVGGTEAQRNSWPSQISLQYRSGSSWAHTCGGTLIRQNWVMTAAHCVDAELT FRVVVGEHNLNQNDGTEQYVGVQKIVVHPYWNTDDVAAGYDIALLRLAQSVT LNSYVQLGVLPRAGTILANNSPCYITGWGLTRTNGQLAQTLQQAYLPTVDYA ICSSSSYWGSTVKNSMVCAGGDGVRSGCQGDSGGPLHCLVNGQYAVHGVTSF VSRLGCNVTRKPTVFTRVSAYISWINNVIASN | 9 |
| Mutant D R75E | VVGGTEAQRNSWPSQISLQYRSGSSWAHTCGGTLIRQNWVMTAAHCVDEELT FRVVVGEHNLNQNDGTEQYVGVQKIVVHPYWNTDDVAAGYDIALLRLAQSVT LNSYVQLGVLPRAGTILANNSPCYITGWGLTRTNGQLAQTLQQAYLPTVDYA ICSSSSYWGSTVKNSMVCAGGDGVRSGCQGDSGGPLHCLVNGQYAVHGVTSF VSRLGCNVTRKPTVFTRVSAYISWINNVIASN | 10 |
| Mutant E Q211A | VVGGTEAQRNSWPSQISLQYRSGSSWAHTCGGTLIRQNWVMTAAHCVDRELT FRVVVGEHNLNQNDGTEQYVGVQKIVVHPYWNTDDVAAGYDIALLRLAQSVT LNSYVQLGVLPRAGTILANNSPCYITGWGLTRTNGQLAQTLQQAYLPTVDYA ICSSSSYWGSTVKNSMVCAGGDGVRSGCAGDSGGPLHCLVNGQYAVHGVTSF VSRLGCNVTRKPTVFTRVSAYISWINNVIASN | 11 |
| Mutant G R237A | VVGGTEAQRNSWPSQISLQYRSGSSWAHTCGGTLIRQNWVMTAAHCVDRELT FRVVVGEHNLNQNDGTEQYVGVQKIVVHPYWNTDDVAAGYDIALLRLAQSVT LNSYVQLGVLPRAGTILANNSPCYITGWGLTRTNGQLAQTLQQAYLPTVDYA ICSSSSYWGSTVKNSMVCAGGDGVRSGCQGDSGGPLHCLVNGQYAVHGVTSF VSALGCNVTRKPTVFTRVSAYISWINNVIASN | 12 |
| Mutant I S214A | VVGGTEAQRNSWPSQISLQYRSGSSWAHTCGGTLIRQNWVMTAAHCVDRELT FRVVVGEHNLNQNDGTEQYVGVQKIVVHPYWNTDDVAAGYDIALLRLAQSVT LNSYVQLGVLPRAGTILANNSPCYITGWGLTRTNGQLAQTLQQAYLPTVDYA ICSSSSYWGSTVKNSMVCAGGDGVRSGCGDAGGPLHCLVNGQYAVHGVTSF VSRLGCNVTRKPTVFTRVSAYISWINNVIASN | 13 |
| Mutant J D74A | VVGGTEAQRNSWPSQISLQYRSGSSWAHTCGGTLIRQNWVMTAAHCVARELT FRVVVGEHNLNQNDGTEQYVGVQKIVVHPYWNTDDVAAGYDIALLRLAQSVT LNSYVQLGVLPRAGTILANNSPCYITGWGLTRTNGQLAQTLQQAYLPTVDYA ICSSSSYWGSTVKNSMVCAGGDGVRSGCQGDSGGPLHCLVNGQYAVHGVTSF VSRLGCNVTRKPTVFTRVSAYISWINNVIASN | 14 |

Thus, in certain embodiments, a modified PPE protein comprises, consists, or consists essentially of an amino acid sequence selected from Table S2, or an amino acid sequence that is at least 80, 85, 90, 95, 98, or 99% identical to a sequence selected from Table S2, and which retains the at least one amino acid alteration relative to the wild-type PPE protein. In certain embodiments, a modified PPE protein from Table S2, or a variant thereof, comprises a signal peptide (for example, SEQ ID NO: 2), an activation peptide (for example, SEQ ID NO: 3), or both, at its N-terminus. Certain modified PPE proteins are in the enzymatically-inactive, proprotein form (i.e., a modified PPE proprotein), comprising the N-terminal signal peptide and the activation peptide, and an amino acid sequence selected from Table S2, or an amino acid sequence that is at least 80, 85, 90, 95, 98, or 99% identical to a sequence selected from Table S2, which retains the at least one amino acid alteration relative to the wild-type PPE protein. In some instances, a modified PPE protein in its inactive PPE proprotein form is activated by protease cleavage of the activation peptide (for example, by trypsin cleavage of SEQ ID NO: 3, or by cleavage of an alternate protease at a modified activation peptide), to generate the enzymatically-active, modified PPE protein. Activation can be in vitro or in vivo, for example, at a cancer tissue or tumor site.

For instance, in certain embodiments, a modified PPE protein comprises, consists, or consists essentially of SEQ ID NO: 5, or an amino acid sequence that is at least 80, 85, 90, 95, 98, or 99% identical to SEQ ID NO: 5 and that retains the Q211F amino acid substitution, and which in some instances is in the proprotein form (modified PPE proprotein) that comprises an N-terminal signal peptide (for example, SEQ ID NO: 2) and an activation peptide (for example, SEQ ID NO: 3). In some embodiments, a modified PPE protein comprises, consists, or consists essentially of SEQ ID NO: 6, or an amino acid sequence that is at least 80, 85, 90, 95, 98, or 99% identical to SEQ ID NO: 6 and that retains the T55A amino acid substitution, and which in some instances is in the proprotein form (modified PPE proprotein) that comprises an N-terminal signal peptide (for example, SEQ ID NO: 2) and an activation peptide (for example, SEQ ID NO: 3). In certain embodiments, a modified PPE protein comprises, consists, or consists essentially of SEQ ID NO: 7, or an amino acid sequence that is at least 80, 85, 90, 95, 98, or 99% identical to SEQ ID NO: 7 and that retains the N241A amino acid substitution, and which in some instances is in the proprotein form (modified PPE proprotein) that comprises an N-terminal signal peptide (for example, SEQ ID NO: 2) and an activation peptide (for example, SEQ ID NO: 3).

In certain embodiments, a modified PPE protein comprises, consists, or consists essentially of SEQ ID NO: 8, or an amino acid sequence that is at least 80, 85, 90, 95, 98, or 99% identical to SEQ ID NO: 8 and that retains the N241Y amino acid substitution, and which in some instances is in the proprotein form (modified PPE proprotein) that comprises an N-terminal signal peptide (for example, SEQ ID NO: 2) and an activation peptide (for example, SEQ ID NO: 3). In certain embodiments, a modified PPE protein comprises, consists, or consists essentially of SEQ ID NO: 9, or an amino acid sequence that is at least 80, 85, 90, 95, 98, or 99% identical to SEQ ID NO: 9 and that retains the R75A amino acid substitution, and which in some instances is in the proprotein form (modified PPE proprotein) that comprises an N-terminal signal peptide (for example, SEQ ID NO: 2) and an activation peptide (for example, SEQ ID NO: 3). In some embodiments, a modified PPE protein comprises, consists, or consists essentially of SEQ ID NO: 10, or an amino acid sequence that is at least 80, 85, 90, 95, 98, or 99% identical to SEQ ID NO: 10 and that retains the R75E amino acid substitution, and which in some instances is in the proprotein form (modified PPE proprotein) that comprises an N-terminal signal peptide (for example, SEQ ID NO: 2) and an activation peptide (for example, SEQ ID NO: 3). In some embodiments, a modified PPE protein comprises, consists, or consists essentially of SEQ ID NO: 11, or an amino acid sequence that is at least 80, 85, 90, 95, 98, or 99% identical to SEQ ID NO: 11 and that retains the Q211A amino acid substitution, and which in some instances is in the proprotein form (modified PPE proprotein) that comprises an N-terminal signal peptide (for example, SEQ ID NO: 2) and an activation peptide (for example, SEQ ID NO: 3).

In certain embodiments, a modified PPE protein comprises, consists, or consists essentially of SEQ ID NO: 12, or an amino acid sequence that is at least 80, 85, 90, 95, 98, or 99% identical to SEQ ID NO: 12 and that retains the R237A amino acid substitution, and which in some instances is in the proprotein form (modified PPE proprotein) that comprises an N-terminal signal peptide (for example, SEQ ID NO: 2) and an activation peptide (for example, SEQ ID NO: 3). In some embodiments, a modified PPE protein comprises, consists, or consists essentially of SEQ ID NO: 13, or an amino acid sequence that is at least 80, 85, 90, 95, 98, or 99% identical to SEQ ID NO: 13 and that retains the S214A amino acid substitution, and which in some instances is in the proprotein form (modified PPE proprotein) that comprises an N-terminal signal peptide (for example, SEQ ID NO: 2) and an activation peptide (for example, SEQ ID NO: 3). In some embodiments, a modified PPE protein comprises, consists, or consists essentially of SEQ ID NO: 14, or an amino acid sequence that is at least 80, 85, 90, 95, 98, or 99% identical to SEQ ID NO: 14 and that retains the D74A amino acid substitution, and which in some instances is in the proprotein form (modified PPE proprotein) that comprises an N-terminal signal peptide (for example, SEQ ID NO: 2) and an activation peptide (for example, SEQ ID NO: 3).

In some embodiments, a modified PPE protein or proprotein comprises a modified activation peptide relative to the wild-type activation peptide sequence of SEQ ID NO: 3. In these and related embodiments, the modified activation peptide comprises a heterologous protease cleavage site that is not cleavable by trypsin (as is the wild-type activation peptide), but is instead cleavable by a protease selected from a metalloprotease, an aspartyl protease, and a cysteine protease. The incorporation of such non-trypsin, heterologous protease cleavagle sites can be used, for example, to improve or otherwise facilitate selective cleavage and activation of the modified PPE proprotein in a cancer tissue or at a tumor site in vivo, relative to the otherwise systemic activation via the wild-type activation peptide by trypsin proteases. In some embodiments, the heterologous protease cleavage site is cleavable by protease selected from MMP12, cathepsin D (CTSD), cathepsin C (CTSC), and cathepsin L (CTSL). Specific examples of heterologous protease cleavage sites include MMP12 cleavage sites such as GAAG/LGGA (SEQ ID NO:15), GAAG/VVGG (SEQ ID NO:16), and GAAG/LVGG (SEQ ID NO:17); CTSD cleavage sites such as LLVL/VVLG (SEQ ID NO:18) and LLVL/VVGG (SEQ ID NO:19); CTSC cleavage sites such as ASEI/VGGR (SEQ ID NO:20); and CTSL cleavage sites such as ALLG/AAGG (SEQ ID NO:21), ALLG/VVGG (SEQ ID NO:22), and ALLG/AVGG (SEQ ID NO:23).

In some embodiments, a modified PPE protein has increased cancer cell-killing activity relative to the wild-type PPE protein (SEQ ID NO: 4). In some embodiments, the increased cancer cell-killing activity is in the absence of a human A1AT protein, in vitro or in vivo. For example, in some embodiments, a modified PPE protein has increased cancer cell-killing activity in the absence of a human A1AT protein of about or at least about 2-fold, 5-fold, 10-fold, 50-fold, 100-fold, 500-fold, 1000-fold or more, relative to the cancer cell-killing activity of the wild-type PPE protein. In certain embodiments, the increased cancer cell-killing activity is in the presence of a human A1AT protein, in vitro or in vivo. For instance, in some embodiments, a modified PPE protein has increased cancer cell-killing activity in the presence of a human A1AT protein of about or at least about 2-fold, 5-fold, 10-fold, 50-fold, 100-fold, 500-fold, or 1000-fold or more, relative to the cancer cell-killing activity of the wild-type PPE protein.

In certain embodiments, a modified PPE protein has reduced binding to and/or interaction with a human A1AT protein, relative to that of the wild-type PPE protein (SEQ ID NO: 4). In some embodiments, a modified PPE has reduced binding to human A1AT of about or at least about 2-fold, 5-fold, 10-fold, 50-fold, 100-fold, 500-fold, or 1000-fold or more, relative to the binding of the wild-type PPE protein to the human A1AT protein. Binding can be measured in vivo or in vitro.

In certain embodiments, a modified PPE has a serine protease activity, for example, wherein the modified PPE has the same or substantially the same serine protease activity as the wild-type PPE (SEQ ID NO: 4). In some embodiments, a modified PPE has about or at least about 50, 60, 70, 80, 90, 100, 200, 300, 400, 500, 600, 700, 800, 900, or 1000% or more of the serine protease activity of the wild-type PPE. In some embodiments, a modified PPE has increased serine protease activity relative to the wild-type PPE, for example, as measured in the presence or absence of a human A1AT protein. In some embodiments, the serine protease activity of a modified PPE in the presence of a human A1AT protein (for example, in vivo, in vitro) is about or at least about 2-fold, 5-fold, 10-fold, 50-fold, 100-fold, 500-fold, or 1000-fold or more higher than the serine protease activity of wild-type PPE under the same or comparable conditions. In some embodiments, the serine protease activity of a modified PPE in the absence of a human A1AT protein (for example, in vivo, in vitro) is about or at least about 2-fold, 5-fold, 10-fold, 50-fold, 100-fold, 500-fold, or 1000-fold or more higher than the serine protease activity of wild-type PPE under the same or comparable conditions.

Serine protease activity and cancer cell-killing activity can be measured according to routine techniques in the art. For example, serine protease activity can be monitored using a colorimetric substrate activity assay (N-Methoxysuccinyl-Ala-Ala-Pro-Val p-nitroanilide), and cancer cell-killing activity can be measured in vitro or in vivo.

Methods of Use and Pharmaceutical Compositions

Certain embodiments include methods of treating, ameliorating the symptoms of, and/or reducing the progression of, a disease or condition in a subject in need thereof, comprising administering to the subject a composition comprising at least one modified PPE protein or proprotein, as described herein. In particular embodiments, the disease is a cancer, that is, the subject in need thereof has, is suspected of having, or is at risk for having, a cancer. In some embodiments, the composition comprises a modified PPE proprotein (inactive form), which is activated by cleavage of the activation peptide in a cancer tissue or tumor site of the subject in need thereof, to generate an active modified PPE protein.

In particular embodiments, the cancer is a primary cancer or a metastatic cancer. In specific embodiments, the cancer is selected from one or more of melanoma (optionally metastatic melanoma), breast cancer (optionally triple-negative breast cancer, TNBC), kidney cancer (optionally renal cell carcinoma), pancreatic cancer, bone cancer, prostate cancer, small cell lung cancer, non-small cell lung cancer (NSCLC), mesothelioma, leukemia (optionally lymphocytic leukemia, chronic myelogenous leukemia, acute myeloid leukemia, or relapsed acute myeloid leukemia), multiple myeloma, lymphoma, hepatoma (hepatocellular carcinoma), sarcoma, B-cell malignancy, ovarian cancer, colorectal cancer, glioma, glioblastoma multiforme, meningioma, pituitary adenoma, vestibular schwannoma, primary CNS lymphoma, primitive neuroectodermal tumor (medulloblastoma), bladder cancer, uterine cancer, esophageal cancer, brain cancer, head and neck cancers, cervical cancer, testicular cancer, thyroid cancer, and stomach cancer.

In some embodiments, as noted above, the cancer is a metastatic cancer. Further to the above cancers, exemplary metastatic cancers include, without limitation, bladder cancers which have metastasized to the bone, liver, and/or lungs; breast cancers which have metastasized to the bone, brain, liver, and/or lungs; colorectal cancers which have metastasized to the liver, lungs, and/or peritoneum; kidney cancers which have metastasized to the adrenal glands, bone, brain, liver, and/or lungs; lung cancers which have metastasized to the adrenal glands, bone, brain, liver, and/or other lung sites; melanomas which have metastasized to the bone, brain, liver, lung, and/or skin/muscle; ovarian cancers which have metastasized to the liver, lung, and/or peritoneum; pancreatic cancers which have metastasized to the liver, lung, and/or peritoneum; prostate cancers which have metastasized to the adrenal glands, bone, liver, and/or lungs; stomach cancers which have metastasized to the liver, lung, and/or peritoneum; thyroid cancers which have metastasized to the bone, liver, and/or lungs; and uterine cancers which have metastasized to the bone, liver, lung, peritoneum, and/or vagina; among others.

The methods for treating cancers can be combined with other therapeutic modalities. For example, a combination therapy described herein can be administered to a subject before, during, or after other therapeutic interventions, including symptomatic care, radiotherapy, surgery, transplantation, hormone therapy, photodynamic therapy, antibiotic therapy, or any combination thereof. Symptomatic care includes administration of corticosteroids, to reduce cerebral edema, headaches, cognitive dysfunction, and emesis, and administration of anti-convulsants, to reduce seizures. Radiotherapy includes whole-brain irradiation, fractionated radiotherapy, and radiosurgery, such as stereotactic radiosurgery, which can be further combined with traditional surgery.

Certain embodiments thus include combination therapies for treating cancers, including methods of treating ameliorating the symptoms of, or inhibiting the progression of, a cancer in a subject in need thereof, comprising administering to the subject a modified PPP protein or proprotein described herein in combination with at least one additional agent, for example, an immunotherapy agent, a chemotherapeutic agent, a hormonal therapeutic agent, and/or a kinase inhibitor. In some embodiments, administering the modified PPE protein or proprotein enhances the susceptibility of the cancer to the additional agent (for example, immunotherapy agent, chemotherapeutic agent, hormonal therapeutic agent, and or kinase inhibitor) by about or at least about 5, 10, 15, 20, 25, 30, 35, 40, 45, 50, 60, 70, 80, 90, 100, 200, 300, 400, 500, 600, 700, 800, 900, 1000, 2000% or more relative to the additional agent alone.

Certain combination therapies employ one or more cancer immunotherapy agents, or "immunotherapy agents". In certain instances, an immunotherapy agent modulates the immune response of a subject, for example, to increase or maintain a cancer-related or cancer-specific immune response, and thereby results in increased immune cell inhibition or reduction of cancer cells. Exemplary immunotherapy agents include polypeptides, for example, antibodies and antigen-binding fragments thereof, ligands, and small peptides, and mixtures thereof. Also include as immunotherapy agents are small molecules, cells (e.g., immune cells such as T-cells), various cancer vaccines, gene therapy or other polynucleotide-based agents, including viral agents such as oncolytic viruses, and others known in the art. Thus, in certain embodiments, the cancer immunotherapy agent is selected from one or more of immune checkpoint modulatory agents, cancer vaccines, oncolytic viruses, cytokines, and cell-based immunotherapies.

In certain embodiments, the cancer immunotherapy agent is an immune checkpoint modulatory agent. Particular examples include "antagonists" of one or more inhibitory immune checkpoint molecules, and "agonists" of one or more stimulatory immune checkpoint molecules. Generally, immune checkpoint molecules are components of the immune system that either turn up a signal (co-stimulatory molecules) or turn down a signal, the targeting of which has therapeutic potential in cancer because cancer cells can perturb the natural function of immune checkpoint molecules (see, e.g., Sharma and Allison, Science. 348:56-61, 2015; Topalian et al., Cancer Cell. 27:450-461, 2015; Pardoll, Nature Reviews Cancer. 12:252-264, 2012). In some embodiments, the immune checkpoint modulatory agent (e.g., antagonist, agonist) "binds" or "specifically binds" to the one or more immune checkpoint molecules, as described herein.

In some embodiments, the immune checkpoint modulatory agent is an antagonist or inhibitor of one or more inhibitory immune checkpoint molecules. Exemplary inhibitory immune checkpoint molecules include Programmed Death-Ligand 1 (PD-L1), Programmed Death-Ligand 2 (PD-L2), Programmed Death 1 (PD-1), V-domain Ig suppressor of T cell activation (VISTA), Cytotoxic T-Lymphocyte-Associated protein 4 (CTLA-4), Indoleamine 2,3-dioxygenase (IDO), tryptophan 2,3-dioxygenase (TDO), T-cell Immunoglobulin domain and Mucin domain 3 (TIM-3), Lymphocyte Activation Gene-3 (LAG-3), B and T Lymphocyte Attenuator (BTLA), CD160, and T-cell immunoreceptor with Ig and ITIM domains (TIGIT).

In certain embodiments, the agent is a PD-1 (receptor) antagonist or inhibitor, the targeting of which has been shown to restore immune function in the tumor environment (see, e.g., Phillips et al., Int Immunol. 27:39-46, 2015). PD-1 is a cell surface receptor that belongs to the immunoglobulin superfamily and is expressed on T cells and pro-B cells. PD-1 interacts with two ligands, PD-L1 and PD-L2. PD-1 functions as an inhibitory immune checkpoint molecule, for example, by reducing or preventing the activation of T-cells, which in turn reduces autoimmunity and promotes self-tolerance. The inhibitory effect of PD-1 is accomplished at least in part through a dual mechanism of promoting apoptosis in antigen specific T-cells in lymph nodes while also reducing apoptosis in regulatory T cells (suppressor T cells). Some examples of PD-1 antagonists or inhibitors include an antibody or antigen-binding fragment or small molecule that specifically binds to PD-1 and reduces one or more of its immune-suppressive activities, for example, its downstream signaling or its interaction with PD-L1. Specific examples of PD-1 antagonists or inhibitors include the antibodies nivolumab, pembrolizumab, PDR001, MK-3475, AMP-224, AMP-514, and pidilizumab, and antigen-binding fragments thereof (see, e.g., U.S. Pat. Nos. 8,008,449; 8,993,731; 9,073,994; 9,084,776; 9,102,727; 9,102,728; 9,181,342; 9,217,034; 9,387,247; 9,492,539; 9,492,540; and U.S. Application Nos. 2012/0039906; 2015/0203579).

In some embodiments, the agent is a PD-L1 antagonist or inhibitor. As noted above, PD-L1 is one of the natural ligands for the PD-1 receptor. General examples of PD-L1 antagonists or inhibitors include an antibody or antigen-binding fragment or small molecule that specifically binds to PD-L1 and reduces one or more of its immune-suppressive activities, for example, its binding to the PD-1 receptor. Specific examples of PD-L1 antagonists include the antibodies atezolizumab (MPDL3280A), avelumab (MSB0010718C), and durvalumab (MEDI4736), and antigen-binding fragments thereof (see, e.g., U.S. Pat. Nos. 9,102,725; 9,393,301; 9,402,899; 9,439,962).

In some embodiments, the agent is a PD-L2 antagonist or inhibitor. As noted above, PD-L2 is one of the natural ligands for the PD-1 receptor. General examples of PD-L2 antagonists or inhibitors include an antibody or antigen-binding fragment or small molecule that specifically binds to PD-L2 and reduces one or more of its immune-suppressive activities, for example, its binding to the PD-1 receptor.

In certain embodiments, the agent is a VISTA antagonist or inhibitor. VISTA is approximately 50 kDa in size and belongs to the immunoglobulin superfamily (it has one IgV domain) and the B7 family. It is primarily expressed in white blood cells, and its transcription is partially controlled by p53. There is evidence that VISTA can act as both a ligand and a receptor on T cells to inhibit T cell effector function and maintain peripheral tolerance. VISTA is produced at high levels in tumor-infiltrating lymphocytes, such as myeloid-derived suppressor cells and regulatory T cells, and its blockade with an antibody results in delayed tumor growth in mouse models of melanoma and squamous cell carcinoma. Exemplary anti-VISTA antagonist antibodies include, for example, the antibodies described in WO 2018/237287, which is incorporated by reference in its entirety.

In some embodiments, the agent is a CTLA-4 antagonist or inhibitor. CTLA4 or CTLA-4 (cytotoxic T-lymphocyte-associated protein 4), also known as CD152 (cluster of differentiation 152), is a protein receptor that functions as an inhibitory immune checkpoint molecule, for example, by transmitting inhibitory signals to T-cells when it is bound to CD80 or CD86 on the surface of antigen-presenting cells. General examples CTLA-4 antagonists or inhibitors include an antibody or antigen-binding fragment or small molecule that specifically binds to CTLA-4. Particular examples include the antibodies ipilimumab and tremelimumab, and antigen-binding fragments thereof. At least some of the activity of ipilimumab is believed to be mediated by antibody-dependent cell-mediated cytotoxicity (ADCC) killing of suppressor Tregs that express CTLA-4.

In some embodiments, the agent is an IDO antagonist or inhibitor, or a TDO antagonist or inhibitor. IDO and TDO are tryptophan catabolic enzymes with immune-inhibitory properties. For example, IDO is known to suppress T-cells and NK cells, generate and activate Tregs and myeloid-derived suppressor cells, and promote tumor angiogenesis. General examples of IDO and TDO antagonists or inhibitors include an antibody or antigen-binding fragment or small molecule that specifically binds to IDO or TDO (see, e.g., Platten et al., Front Immunol. 5:673, 2014) and reduces or inhibits one or more immune-suppressive activities. Specific examples of IDO antagonists or inhibitors include indoximod (NLG-8189), 1-methyl-tryptophan (1MT), β-Carboline (norharmane; 9H-pyrido[3,4-b]indole), rosmarinic acid, and epacadostat (see, e.g., Sheridan, Nature Biotechnology. 33:321-322, 2015). Specific examples of TDO antagonists or inhibitors include 680C91 and LM10 (see, e.g., Pilotte et al., PNAS USA. 109:2497-2502, 2012).

In some embodiments, the agent is a TIM-3 antagonist or inhibitor. T-cell Immunoglobulin domain and Mucin domain 3 (TIM-3) is expressed on activated human CD4+ T-cells and regulates Th1 and Th17 cytokines. TIM-3 also acts as a negative regulator of Th1/Tc1 function by triggering cell death upon interaction with its ligand, galectin-9. TIM-3 contributes to the suppressive tumor microenvironment and its overexpression is associated with poor prognosis in a variety of cancers (see, e.g., Li et al., Acta Oncol. 54:1706-13, 2015). General examples of TIM-3 antagonists or inhibitors include an antibody or antigen-binding fragment or small molecule that specifically binds to TIM-3 and reduces or inhibits one or more of its immune-suppressive activities.

In some embodiments, the agent is a LAG-3 antagonist or inhibitor. Lymphocyte Activation Gene-3 (LAG-3) is expressed on activated T-cells, natural killer cells, B-cells and plasmacytoid dendritic cells. It negatively regulates cellular proliferation, activation, and homeostasis of T-cells, in a similar fashion to CTLA-4 and PD-1 (see, e.g., Workman and Vignali. European Journal of Immun. 33:970-9, 2003; and Workman et al., Journal of Immun. 172:5450-5, 2004), and has been reported to play a role in Treg suppressive function (see, e.g., Huang et al., Immunity. 21:503-13, 2004). LAG3 also maintains CD8+ T-cells in a tolerogenic state and combines with PD-1 to maintain CD8 T-cell exhaustion. General examples of LAG-3 antagonists or inhibitors include an antibody or antigen-binding fragment or small molecule that specifically binds to LAG-3 and inhibits one or more of its immune-suppressive activities. Specific examples include the antibody BMS-986016, and antigen-binding fragments thereof.

In some embodiments, the agent is a BTLA antagonist or inhibitor. B- and T-lymphocyte attenuator (BTLA; CD272) expression is induced during activation of T-cells, and it inhibits T-cells via interaction with tumor necrosis family receptors (TNF-R) and B7 family of cell surface receptors. BTLA is a ligand for tumor necrosis factor (receptor) superfamily, member 14 (TNFRSF14), also known as herpes virus entry mediator (HVEM). BTLA-HVEM complexes negatively regulate T-cell immune responses, for example, by inhibiting the function of human CD8+ cancer-specific T-cells (see, e.g., Derré et al., J Clin Invest 120:157-67, 2009). General examples of BTLA antagonists or inhibitors include an antibody or antigen-binding fragment or small molecule that specifically binds to BTLA-4 and reduce one or more of its immune-suppressive activities.

In some embodiments, the agent is an HVEM antagonist or inhibitor, for example, an antagonist or inhibitor that specifically binds to HVEM and interferes with its interaction with BTLA or CD160. General examples of HVEM antagonists or inhibitors include an antibody or antigen-binding fragment or small molecule that specifically binds to HVEM, optionally reduces the HVEM/BTLA and/or HVEM/CD160 interaction, and thereby reduces one or more of the immune-suppressive activities of HVEM.

In some embodiments, the agent is a CD160 antagonist or inhibitor, for example, an antagonist or inhibitor that specifically binds to CD160 and interferes with its interaction with HVEM. General examples of CD160 antagonists or inhibitors include an antibody or antigen-binding fragment or small molecule that specifically binds to CD160, optionally reduces the CD160/HVEM interaction, and thereby reduces or inhibits one or more of its immune-suppressive activities.

In some embodiments, the agent is a TIGIT antagonist or inhibitor. T cell Ig and ITIM domain (TIGIT) is a coinhibitory receptor that is found on the surface of a variety of lymphoid cells, and suppresses antitumor immunity, for example, via Tregs (Kurtulus et al., J Clin Invest. 125:4053-4062, 2015). General examples of TIGIT antagonists or inhibitors include an antibody or antigen-binding fragment or small molecule that specifically binds to TIGIT and reduce one or more of its immune-suppressive activities (see, e.g., Johnston et al., Cancer Cell. 26:923-37, 2014).

In certain embodiments, the immune checkpoint modulatory agent is an agonist of one or more stimulatory immune checkpoint molecules. Exemplary stimulatory immune checkpoint molecules include CD40, OX40, Glucocorticoid-Induced TNFR Family Related Gene (GITR), CD137 (4-1BB), CD27, CD28, CD226, and Herpes Virus Entry Mediator (HVEM).

In some embodiments, the agent is a CD40 agonist. CD40 is expressed on antigen-presenting cells (APC) and some malignancies. Its ligand is CD40L (CD154). On APC, ligation results in upregulation of costimulatory molecules, potentially bypassing the need for T-cell assistance in an antitumor immune response. CD40 agonist therapy plays an important role in APC maturation and their migration from the tumor to the lymph nodes, resulting in elevated antigen presentation and T cell activation. Anti-CD40 agonist antibodies produce substantial responses and durable anticancer immunity in animal models, an effect mediated at least in part by cytotoxic T-cells (see, e.g., Johnson et al. Clin Cancer Res. 21:1321-1328, 2015; and Vonderheide and Glennie, Clin Cancer Res. 19:1035-43, 2013). General examples of CD40 agonists include an antibody or antigen-binding fragment or small molecule or ligand that specifically binds to CD40 and increases one or more of its immunostimulatory activities. Specific examples include CP-870,893, dacetuzumab, Chi Lob 7/4, ADC-1013, CD40L, rhCD40L, and antigen-binding fragments thereof. Specific examples of CD40 agonists include, but are not limited to, APX005 (see, e.g., US 2012/0301488) and APX005M (see, e.g., US 2014/0120103).

In some embodiments, the agent is an OX40 agonist. OX40 (CD134) promotes the expansion of effector and memory T cells, and suppresses the differentiation and activity of T-regulatory cells (see, e.g., Croft et al., Immunol Rev. 229:173-91, 2009). Its ligand is OX40L (CD252). Since OX40 signaling influences both T-cell activation and survival, it plays a key role in the initiation of an anti-tumor immune response in the lymph node and in the maintenance of the anti-tumor immune response in the tumor microenvironment. General examples of OX40 agonists include an antibody or antigen-binding fragment or small molecule or ligand that specifically binds to OX40 and increases one or more of its immunostimulatory activities. Specific examples include OX86, OX-40L, Fc-OX40L, GSK3174998, MEDI0562 (a humanized OX40 agonist), MEDI6469 (murine OX4 agonist), and MEDI6383 (an OX40 agonist), and antigen-binding fragments thereof.

In some embodiments, the agent is a GITR agonist. Glucocorticoid-Induced TNFR family Related gene (GITR) increases T cell expansion, inhibits the suppressive activity of Tregs, and extends the survival of T-effector cells. GITR agonists have been shown to promote an anti-tumor response through loss of Treg lineage stability (see, e.g., Schaer et al., Cancer Immunol Res. 1:320-31, 2013). These diverse mechanisms show that GITR plays an important role in initiating the immune response in the lymph nodes and in maintaining the immune response in the tumor tissue. Its ligand is GITRL. General examples of GITR agonists include an antibody or antigen-binding fragment or small molecule or ligand that specifically binds to GITR and increases one or more of its immunostimulatory activities. Specific examples include GITRL, INCAGN01876, DTA-1, MEDI1873, and antigen-binding fragments thereof.

In some embodiments, the agent is a CD137 agonist. CD137 (4-1BB) is a member of the tumor necrosis factor (TNF) receptor family, and crosslinking of CD137 enhances T-cell proliferation, IL-2 secretion, survival, and cytolytic activity. CD137-mediated signaling also protects T-cells such as CD8+ T-cells from activation-induced cell death. General examples of CD137 agonists include an antibody or antigen-binding fragment or small molecule or ligand that specifically binds to CD137 and increases one or more of its immunostimulatory activities. Specific examples include the CD137 (or 4-1BB) ligand (see, e.g., Shao and Schwarz, J Leukoc Biol. 89:21-9, 2011) and the antibody utomilumab, including antigen-binding fragments thereof.

In some embodiments, the agent is a CD27 agonist. Stimulation of CD27 increases antigen-specific expansion of naïve T cells and contributes to T-cell memory and long-term maintenance of T-cell immunity. Its ligand is CD70. The targeting of human CD27 with an agonist antibody stimulates T-cell activation and antitumor immunity (see, e.g., Thomas et al., Oncoimmunology. 2014; 3:e27255. doi:10.4161/onci.27255; and He et al., J Immunol. 191: 4174-83, 2013). General examples of CD27 agonists include an antibody or antigen-binding fragment or small molecule or ligand that specifically binds to CD27 and increases one or more of its immunostimulatory activities. Specific examples include CD70 and the antibodies varlilumab and CDX-1127 (1F5), including antigen-binding fragments thereof.

In some embodiments, the agent is a CD28 agonist. CD28 is constitutively expressed CD4+ T cells some CD8+ T cells. Its ligands include CD80 and CD86, and its stimulation increases T-cell expansion. General examples of CD28 agonists include an antibody or antigen-binding fragment or small molecule or ligand that specifically binds to CD28 and increases one or more of its immunostimulatory activities. Specific examples include CD80, CD86, the antibody TAB08, and antigen-binding fragments thereof.

In some embodiments, the agent is CD226 agonist. CD226 is a stimulating receptor that shares ligands with TIGIT, and opposite to TIGIT, engagement of CD226 enhances T-cell activation (see, e.g., Kurtulus et al., J Clin Invest. 125:4053-4062, 2015; Bottino et al., J Exp Med. 1984:557-567, 2003; and Tahara-Hanaoka et al., Int Immunol. 16:533-538, 2004). General examples of CD226 agonists include an antibody or antigen-binding fragment or small molecule or ligand (e.g., CD112, CD155) that specifically binds to CD226 and increases one or more of its immunostimulatory activities.

In some embodiments, the agent is an HVEM agonist. Herpesvirus entry mediator (HVEM), also known as tumor necrosis factor receptor superfamily member 14 (TNFRSF14), is a human cell surface receptor of the TNF-receptor superfamily. HVEM is found on a variety of cells including T-cells, APCs, and other immune cells. Unlike other receptors, HVEM is expressed at high levels on resting T-cells and down-regulated upon activation. It has been shown that HVEM signaling plays a crucial role in the early phases of T-cell activation and during the expansion of tumor-specific lymphocyte populations in the lymph nodes. General examples of HVEM agonists include an antibody or antigen-binding fragment or small molecule or ligand that specifically binds to HVEM and increases one or more of its immunostimulatory activities.

In certain embodiments, the immunotherapy agent is a bi-specific or multi-specific antibody. For instance, certain bi-specific or multi-specific antibodies are able to (i) bind to and inhibit one or more inhibitory immune checkpoint molecules, and also (ii) bind to and agonize one or more stimulatory immune checkpoint molecules. In certain embodiments, a bi-specific or multi-specific antibody (i) binds to and inhibits one or more of PD-L1, PD-L2, PD-1, CTLA-4, IDO, TDO, TIM-3, LAG-3, BTLA, CD160, and/or TIGIT, and also (ii) binds to and agonizes one or more of CD40, OX40 Glucocorticoid-Induced TNFR Family Related Gene (GITR), CD137 (4-1BB), CD27, CD28, CD226, and/or Herpes Virus Entry Mediator (HVEM).

In some embodiments, the immunotherapy agent is a cancer vaccine. In certain embodiments, the cancer vaccine is selected from one or more of Oncophage, a human papillomavirus HPV vaccine optionally Gardasil or Cervarix, a hepatitis B vaccine optionally Engerix-B, Recombivax HB, or Twinrix, and sipuleucel-T (Provenge), or comprises a cancer antigen selected from one or more of human Her2/neu, Her1/EGF receptor (EGFR), Her3, A33 antigen, B7H3, CD5, CD19, CD20, CD22, CD23 (IgE Receptor), MAGE-3, C242 antigen, 5T4, IL-6, IL-13, vascular endothelial growth factor VEGF (e.g., VEGF-A) VEGFR-1, VEGFR-2, CD30, CD33, CD37, CD40, CD44, CD51, CD52, CD56, CD74, CD80, CD152, CD200, CD221, CCR4, HLA-DR, CTLA-4, NPC-1C, tenascin, vimentin, insulin-like growth factor 1 receptor (IGF-1R), alpha-fetoprotein, insulin-like growth factor 1 (IGF-1), carbonic anhydrase 9 (CA-IX), carcinoembryonic antigen (CEA), guanylyl cyclase C, NY-ESO-1, p53, survivin, integrin $\alpha v\beta 3$, integrin $\alpha 5\beta 1$, folate receptor 1, transmembrane glycoprotein NMB, fibroblast activation protein alpha (FAP), glycoprotein 75, TAG-72, MUC1, MUC16 (or CA-125), phosphatidylserine, prostate-specific membrane antigen (PMSA), NR-LU-13 antigen, TRAIL-R1, tumor necrosis factor receptor superfamily member 10b (TNFRSF10B or TRAIL-R2), SLAM family member 7 (SLAMF7), EGP40 pancarcinoma antigen, B-cell activating factor (BAFF), platelet-derived growth factor receptor, glycoprotein EpCAM (17-1A), Programmed Death-1, protein disulfide isomerase (PDI), Phosphatase of Regenerating Liver 3 (PRL-3), prostatic acid phosphatase, Lewis-Y antigen, GD2 (a disialoganglioside expressed on tumors of neuroectodermal origin), glypican-3 (GPC3), and mesothelin.

In some embodiments, the immunotherapy agent is an oncolytic viruses. In some embodiments, the oncolytic virus selected from one or more of talimogene laherparepvec (T-VEC), coxsackievirus A21 (CAVATAK™), Oncorine (H101), pelareorep (REOLYSIN®), Seneca Valley virus (NTX-010), Senecavirus SVV-001, ColoAd1, SEPREHVIR (HSV-1716), CGTG-102 (Ad5/3-D24-GMCSF), GL-ONC1, MV-NIS, and DNX-2401.

In certain embodiments, the cancer immunotherapy agent is a cytokine. Exemplary cytokines include interferon (IFN)-α, IL-2, IL-12, IL-7, IL-21, and Granulocyte-macrophage colony-stimulating factor (GM-CSF).

In certain embodiments, the cancer immunotherapy agent is cell-based immunotherapy, for example, a therapy that utilizes immune cells, including ex vivo-derived immune cells, such as lymphocytes, natural killer (NK) cells, macrophages, and/or dendritic cells (DCs). In some embodiments, the lymphocytes comprise T-cells, for example, cytotoxic T-lymphocytes (CTLs). See, for example, June, J Clin Invest. 117:1466-1476, 2007; Rosenberg and Restifo, Science. 348:62-68, 2015; Cooley et al., Biol. of Blood and Marrow Transplant. 13:33-42, 2007; and Li and Sun, Chin J Cancer Res. 30:173-196, 2018, for descriptions of adoptive T-cell and NK cell immunotherapies. In some embodiments, the T-cells comprise cancer antigen-specific T-cells, which are directed against at least one cancer antigen. In some embodiments, the cancer antigen-specific T-cells are selected from one or more of chimeric antigen receptor (CAR)-modified T-cells, T-cell Receptor (TCR)-modified T-cells, tumor infiltrating lymphocytes (TILs), and peptide-induced T-cells. In specific embodiments, the CAR-modified T-cell is targeted against CD-19 (see, e.g., Maude et al., Blood. 125:4017-4023, 2015). In some instances, the ex vivo-derived immune cells are autologous cells, which are obtained from the patient to be treated.

Certain combination therapies employ one or more chemotherapeutic agents, for example, small molecule chemotherapeutic agents. Non-limiting examples of chemotherapeutic agents include alkylating agents, anti-metabolites, cytotoxic antibiotics, topoisomerase inhibitors (type 1 or type II), and anti-microtubule agents, among others.

Examples of alkylating agents include nitrogen mustards (e.g., mechlorethamine, cyclophosphamide, mustine, melphalan, chlorambucil, ifosfamide, and busulfan), nitrosoureas (e.g., N-Nitroso-N-methylurea (MNU), carmustine (BCNU), lomustine (CCNU), semustine (MeCCNU), fotemustine, and streptozotocin), tetrazines (e.g., dacarbazine, mitozolomide, and temozolomide), aziridines (e.g., thiotepa, mytomycin, and diaziquone (AZQ)), cisplatins and derivatives thereof (e.g., carboplatin and oxaliplatin), and non-classical alkylating agents (optionally procarbazine and hexamethylmelamine).

Examples of anti-metabolites include anti-folates (e.g., methotrexate and pemetrexed), fluoropyrimidines (e.g., 5-fluorouracil and capecitabine), deoxynucleoside analogues (e.g., ancitabine, enocitabine, cytarabine, gemcitabine, decitabine, azacitidine, fludarabine, nelarabine, cladribine, clofarabine, fludarabine, and pentostatin), and thiopurines (e.g., thioguanine and mercaptopurine);

Examples of cytotoxic antibiotics include anthracyclines (e.g., doxorubicin, daunorubicin, epirubicin, idarubicin, pirarubicin, aclarubicin, and mitoxantrone), bleomycins, mitomycin C, mitoxantrone, and actinomycin. Examples of topoisomerase inhibitors include camptothecin, irinotecan, topotecan, etoposide, doxorubicin, mitoxantrone, teniposide, novobiocin, merbarone, and aclarubicin.

Examples of anti-microtubule agents include taxanes (e.g., paclitaxel and docetaxel) and vinca alkaloids (e.g., vinblastine, vincristine, vindesine, vinorelbine).

The various chemotherapeutic agents described herein can be combined with any one or more of the modified PPE proteins or proproteins described herein, and used according to any one or more of the methods or compositions described herein.

Certain combination therapies employ at least one hormonal therapeutic agent. General examples of hormonal therapeutic agents include hormonal agonists and hormonal antagonists. Particular examples of hormonal agonists include progestogen (progestin), corticosteroids (e.g., prednisolone, methylprednisolone, dexamethasone), insulin like growth factors, VEGF derived angiogenic and lymphangiogenic factors (e.g., VEGF-A, VEGF-A145, VEGF-A165, VEGF-C, VEGF-D, PIGF-2), fibroblast growth factor (FGF), galectin, hepatocyte growth factor (HGF), platelet derived growth factor (PDGF), transforming growth factor (TGF)-beta, androgens, estrogens, and somatostatin analogs. Examples of hormonal antagonists include hormone synthesis inhibitors such as aromatase inhibitors and gonadotropin-releasing hormone (GnRH) s agonists (e.g., leuprolide, goserelin, triptorelin, histrelin) including analogs thereof. Also included are hormone receptor antagonist such as selective estrogen receptor modulators (SERMs; e.g., tamoxifen, raloxifene, toremifene) and anti-androgens (e.g., flutamide, bicalutamide, nilutamide).

Also included are hormonal pathway inhibitors such as antibodies directed against hormonal receptors. Examples include inhibitors of the IGF receptor (e.g., IGF-IR1) such as cixutumumab, dalotuzumab, figitumumab, ganitumab, istiratumab, and robatumumab; inhibitors of the vascular endothelial growth factor receptors 1, 2 or 3 (VEGFR1, VEGFR2 or VEGFR3) such as alacizumab pegol, bevacizumab, icrucumab, ramucirumab; inhibitors of the TGF-beta receptors R1, R2, and R3 such as fresolimumab and metelimumab; inhibitors of c-Met such as naxitamab; inhibitors of the EGF receptor such as cetuximab, depatuxizumab mafodotin, futuximab, imgatuzumab, laprituximab emtansine, matuzumab, modotuximab, necitumumab, nimotuzumab, panitumumab, tomuzotuximab, and zalutumumab; inhibitors of the FGF receptor such as aprutumab ixadotin and bemarituzumab; and inhibitors of the PDGF receptor such as olaratumab and tovetumab.

The various hormonal therapeutic agents described herein can be combined with any one or more of the modified PPE proteins or proproteins described herein, and used according to any one or more of the methods or compositions described herein.

Certain combination therapies employ at least one kinase inhibitor, including tyrosine kinase inhibitors. Examples of kinase inhibitors include, without limitation, adavosertib, afanitib, aflibercept, axitinib, bevacizumab, bosutinib, cabozantinib, cetuximab, cobimetinib, crizotinib, dasatinib, entrectinib, erdafitinib, erlotinib, fostamitinib, gefitinib, ibrutinib, imatinib, lapatinib, lenvatinib, mubritinib, nilotinib, panitumumab, pazopanib, pegaptanib, ponatinib, ranibizumab, regorafenib, ruxolitinib, sorafenib, sunitinib, SU6656, tofacitinib, trastuzumab, vandetanib, and vemuafenib.

The various kinase inhibitors described herein can be combined with any one or more of the modified PPE proteins or proproteins described herein, and used according to any one or more of the methods or compositions described herein.

In some embodiments, the methods and compositions described herein increase cancer cell-killing in the subject by about or at least about 2-fold, 5-fold, 10-fold, 50-fold, 100-fold, 500-fold, or 1000-fold or more relative to a control or reference. In some embodiments, the methods and compositions described herein increase median survival time of a subject by 4 weeks, 5 weeks, 6 weeks, 7 weeks, 8 weeks, 9 weeks, 10 weeks, 15 weeks, 20 weeks, 25 weeks, 30 weeks, 40 weeks, or longer. In certain embodiments, the methods and compositions described herein increase median survival time of a subject by 1 year, 2 years, 3 years, or longer. In some embodiments, the methods and pharmaceutical compositions increase progression-free survival by 2 weeks, 3 weeks, 4 weeks, 5 weeks, 6 weeks, 7 weeks, 8 weeks, 9 weeks, 10 weeks or longer. In certain embodiments, the methods and compositions described herein increase progression-free survival by 1 year, 2 years, 3 years, or longer.

In certain embodiments, the methods and compositions described herein are sufficient to result in tumor regression, for example, as indicated by a statistically significant decrease in the amount of viable tumor, for example, at least a 10%, 20%, 30%, 40%, 50% or greater decrease in tumor mass, or by altered (e.g., decreased with statistical significance) scan dimensions. In certain embodiments, the methods and compositions described herein are sufficient to result in stable disease. In certain embodiments, the methods and compositions described herein are sufficient to result in clinically relevant reduction in symptoms of a particular disease indication known to the skilled clinician.

For in vivo use, as noted above, for the treatment of human or non-human mammalian disease or testing, the modified PPE proteins or proproteins described herein are generally incorporated into one or more therapeutic or pharmaceutical compositions prior to administration, including veterinary therapeutic compositions.

Thus, certain embodiments relate to pharmaceutical or therapeutic compositions that comprise a modified PPE protein or proprotein, as described herein. In some instances, a pharmaceutical or therapeutic composition comprises one or more of the modified PPE proteins or proproteins described herein in combination with a pharmaceutically- or physiologically-acceptable carrier or excipient. Certain pharmaceutical or therapeutic compositions further comprise at least one additional agent, for example, an immunotherapy agent, a chemotherapeutic agent, a hormonal therapeutic agent, and/or a kinase inhibitor as described herein.

Some therapeutic compositions comprise (and certain methods utilize) only one modified PPE protein or proprotein. Certain therapeutic compositions comprise (and certain methods utilize) a mixture of at least two, three, four, or five different modified PPE proteins or proproteins.

In particular embodiments, the pharmaceutical or therapeutic compositions comprising a modified PPE protein or proprotein is substantially pure on a protein basis or a weight-weight basis, for example, the composition has a purity of at least about 80%, 85%, 90%, 95%, 98%, or 99% on a protein basis or a weight-weight basis.

In some embodiments, the modified PPE proteins or proproteins described herein do not form aggregates, have a desired solubility, and/or have an immunogenicity profile that is suitable for use in humans, as known in the art. Thus, in some embodiments, the therapeutic composition comprising a modified PPE protein or proprotein is substantially aggregate-free. For example, certain compositions comprise less than about 10% (on a protein basis) high molecular weight aggregated proteins, or less than about 5% high molecular weight aggregated proteins, or less than about 4% high molecular weight aggregated proteins, or less than about 3% high molecular weight aggregated proteins, or less than about 2% high molecular weight aggregated proteins, or less than about 1% high molecular weight aggregated proteins. Some compositions comprise a modified PPE protein or proprotein that is at least about 50%, about 60%, about 70%, about 80%, about 90% or about 95% monodisperse with respect to its apparent molecular mass.

In some embodiments, the modified PPE proteins or proproteins are concentrated to about or at least about 0.1 mg/ml, 0.2 mg/ml, 0.3 mg/ml, 0.4 mg/ml, 0.5 mg/ml, 0.6, 0.7, 0.8, 0.9, 1 mg/ml, 2 mg/ml, 3 mg/ml, 4 mg/ml, 5 mg/ml, 6 mg/ml, 7 mg/ml, 8 mg/ml, 9 mg/ml, 10 mg/ml, 11, 12, 13, 14 or 15 mg/ml and are formulated for biotherapeutic uses.

To prepare a therapeutic or pharmaceutical composition, an effective or desired amount of one or more modified PPE proteins or proproteins is mixed with any pharmaceutical carrier(s) or excipient known to those skilled in the art to be suitable for the particular agent and/or mode of administration. A pharmaceutical carrier may be liquid, semi-liquid or solid. Solutions or suspensions used for parenteral, intradermal, subcutaneous or topical application may include, for example, a sterile diluent (such as water), saline solution (e.g., phosphate buffered saline; PBS), fixed oil, polyethylene glycol, glycerin, propylene glycol or other synthetic solvent; antimicrobial agents (such as benzyl alcohol and methyl parabens); antioxidants (such as ascorbic acid and sodium bisulfite) and chelating agents (such as ethylenediaminetetraacetic acid (EDTA)); buffers (such as acetates, citrates and phosphates). If administered intravenously (e.g., by IV infusion), suitable carriers include physiological saline or phosphate buffered saline (PBS), and solutions containing thickening and solubilizing agents, such as glucose, polyethylene glycol, polypropylene glycol and mixtures thereof.

Administration of modified PPE proteins or proprotein described herein, in pure form or in an appropriate therapeutic or pharmaceutical composition, can be carried out via any of the accepted modes of administration of agents for serving similar utilities. The therapeutic or pharmaceutical compositions can be prepared by combining a composition with an appropriate physiologically acceptable carrier, diluent or excipient, and may be formulated into preparations in solid, semi-solid, liquid or gaseous forms, such as tablets, capsules, powders, granules, ointments, solutions, suppositories, injections, inhalants, gels, microspheres, and aerosols. In addition, other pharmaceutically active ingredients (including other small molecules as described elsewhere herein) and/or suitable excipients such as salts, buffers and stabilizers may, but need not, be present within the composition.

Administration may be achieved by a variety of different routes, including oral, parenteral, nasal, intravenous, intradermal, intramuscular, subcutaneous, or topical. Preferred modes of administration depend upon the nature of the condition to be treated or prevented. Particular embodiments include administration by IV infusion.

Carriers can include, for example, pharmaceutically- or physiologically-acceptable carriers, excipients, or stabilizers that are non-toxic to the cell or mammal being exposed thereto at the dosages and concentrations employed. Often the physiologically-acceptable carrier is an aqueous pH buffered solution. Examples of physiologically acceptable carriers include buffers such as phosphate, citrate, and other organic acids; antioxidants including ascorbic acid; low molecular weight (less than about 10 residues) polypeptide; proteins, such as serum albumin, gelatin, or immunoglobulins; hydrophilic polymers such as polyvinylpyrrolidone; amino acids such as glycine, glutamine, asparagine, arginine or lysine; monosaccharides, disaccharides, and other carbohydrates including glucose, mannose, or dextrins; chelating agents such as EDTA; sugar alcohols such as mannitol or sorbitol; salt-forming counterions such as sodium; and/or nonionic surfactants such as polysorbate 20 (TWEEN™) polyethylene glycol (PEG), and poloxamers (PLURONICS™), and the like.

In some embodiments, one or more agents can be entrapped in microcapsules prepared, for example, by coacervation techniques or by interfacial polymerization (for example, hydroxymethylcellulose or gelatin-microcapsules and poly-(methylmethacylate) microcapsules, respectively), in colloidal drug delivery systems (for example, liposomes, albumin microspheres, microemulsions, nanoparticles and nanocapsules), or in macroemulsions. Such techniques are disclosed in Remington's Pharmaceutical Sciences, 16th edition, Oslo, A., Ed., (1980). The particle(s) or liposomes may further comprise other therapeutic or diagnostic agents.

The precise dosage and duration of treatment is a function of the disease being treated and may be determined empirically using known testing protocols or by testing the compositions in model systems known in the art and extrapolating therefrom. Controlled clinical trials may also be performed. Dosages may also vary with the severity of the condition to be alleviated. A pharmaceutical composition is generally formulated and administered to exert a therapeutically useful effect while minimizing undesirable side effects. The composition may be administered one time, or may be divided into a number of smaller doses to be administered at intervals of time. For any particular subject, specific dosage regimens may be adjusted over time according to the individual need.

Typical routes of administering these and related therapeutic or pharmaceutical compositions thus include, without limitation, oral, topical, transdermal, inhalation, parenteral, sublingual, buccal, rectal, vaginal, and intranasal. The term parenteral as used herein includes subcutaneous injections, intravenous, intramuscular, intrasternal injection or infusion techniques. Therapeutic or pharmaceutical compositions according to certain embodiments of the present disclosure are formulated so as to allow the active ingredients contained therein to be bioavailable upon administration of the composition to a subject or patient. Compositions that will be administered to a subject or patient may take the form of one or more dosage units, where for example, a tablet may be a single dosage unit, and a container of a herein described agent in aerosol form may hold a plurality of dosage units. Actual methods of preparing such dosage forms are known, or will be apparent, to those skilled in this art; for example, see Remington: The Science and Practice of Pharmacy, 20th Edition (Philadelphia College of Pharmacy and Science, 2000). The composition to be administered will typically contain a therapeutically effective amount of an agent described herein, for treatment of a disease or condition of interest.

A therapeutic or pharmaceutical composition may be in the form of a solid or liquid. In some embodiments, the carrier(s) are particulate, so that the compositions are, for example, in tablet or powder form. The carrier(s) may be liquid, with the compositions being, for example, an oral oil, injectable liquid or an aerosol, which is useful in, for example, inhalatory administration. When intended for oral administration, the pharmaceutical composition is preferably in either solid or liquid form, where semi-solid, semi-liquid, suspension and gel forms are included within the forms considered herein as either solid or liquid. Certain embodiments include sterile, injectable solutions.

As a solid composition for oral administration, the pharmaceutical composition may be formulated into a powder, granule, compressed tablet, pill, capsule, chewing gum, wafer or the like. Such a solid composition will typically contain one or more inert diluents or edible carriers. In addition, one or more of the following may be present: binders such as carboxymethylcellulose, ethyl cellulose, microcrystalline cellulose, gum tragacanth or gelatin; excipients such as starch, lactose or dextrins, disintegrating agents such as alginic acid, sodium alginate, Primogel, corn starch and the like; lubricants such as magnesium stearate or Sterotex; glidants such as colloidal silicon dioxide; sweetening agents such as sucrose or saccharin; a flavoring agent such as peppermint, methyl salicylate or orange flavoring; and a coloring agent. When the pharmaceutical composition is in the form of a capsule, for example, a gelatin capsule, it may contain, in addition to materials of the above type, a liquid carrier such as polyethylene glycol or oil.

The therapeutic or pharmaceutical composition may be in the form of a liquid, for example, an elixir, syrup, solution, emulsion or suspension. The liquid may be for oral administration or for delivery by injection, as two examples. When intended for oral administration, preferred composition contain, in addition to the present compounds, one or more of a sweetening agent, preservatives, dye/colorant and flavor enhancer. In a composition intended to be administered by injection, one or more of a surfactant, preservative, wetting agent, dispersing agent, suspending agent, buffer, stabilizer and isotonic agent may be included.

The liquid therapeutic or pharmaceutical compositions, whether they be solutions, suspensions or other like form, may include one or more of the following adjuvants: sterile diluents such as water for injection, saline solution, preferably physiological saline, Ringer's solution, isotonic sodium chloride, fixed oils such as synthetic mono or diglycerides which may serve as the solvent or suspending medium, polyethylene glycols, glycerin, propylene glycol or other solvents; antibacterial agents such as benzyl alcohol or methyl paraben; antioxidants such as ascorbic acid or sodium bisulfite; chelating agents such as ethylenediaminetetraacetic acid; buffers such as acetates, citrates or phosphates and agents for the adjustment of tonicity such as sodium chloride or dextrose. The parenteral preparation can be enclosed in ampoules, disposable syringes or multiple dose vials made of glass or plastic. Physiological saline is a preferred adjuvant. An injectable pharmaceutical composition is preferably sterile.

A liquid therapeutic or pharmaceutical composition intended for either parenteral or oral administration should contain an amount of an agent such that a suitable dosage will be obtained. Typically, this amount is at least 0.01% of the agent of interest in the composition. When intended for oral administration, this amount may be varied to be between 0.1 and about 70% of the weight of the composition. Certain oral therapeutic or pharmaceutical compositions contain between about 4% and about 75% of the agent of interest. In certain embodiments, therapeutic or pharmaceutical compositions and preparations are prepared so that a parenteral dosage unit contains between 0.01 to 10% by weight of the agent of interest prior to dilution.

The therapeutic or pharmaceutical compositions may be intended for topical administration, in which case the carrier may suitably comprise a solution, emulsion, ointment or gel base. The base, for example, may comprise one or more of the following: petrolatum, lanolin, polyethylene glycols, bee wax, mineral oil, diluents such as water and alcohol, and emulsifiers and stabilizers. Thickening agents may be present in a therapeutic or pharmaceutical composition for topical administration. If intended for transdermal administration, the composition may include a transdermal patch or iontophoresis device.

The therapeutic or pharmaceutical compositions may be intended for rectal administration, in the form, for example, of a suppository, which will melt in the rectum and release the drug. The composition for rectal administration may contain an oleaginous base as a suitable nonirritating excipient. Such bases include, without limitation, lanolin, cocoa butter, and polyethylene glycol.

The therapeutic or pharmaceutical composition may include various materials, which modify the physical form of a solid or liquid dosage unit. For example, the composition may include materials that form a coating shell around the active ingredients. The materials that form the coating shell are typically inert, and may be selected from, for example, sugar, shellac, and other enteric coating agents. Alternatively, the active ingredients may be encased in a gelatin capsule. The therapeutic or pharmaceutical compositions in solid or liquid form may include a component that binds to agent and thereby assists in the delivery of the compound. Suitable components that may act in this capacity include monoclonal or polyclonal antibodies, one or more proteins or a liposome.

The therapeutic or pharmaceutical composition may consist essentially of dosage units that can be administered as an aerosol. The term aerosol is used to denote a variety of systems ranging from those of colloidal nature to systems consisting of pressurized packages. Delivery may be by a liquefied or compressed gas or by a suitable pump system that dispenses the active ingredients. Aerosols may be delivered in single phase, bi-phasic, or tri-phasic systems in order to deliver the active ingredient(s). Delivery of the aerosol includes the necessary container, activators, valves, subcontainers, and the like, which together may form a kit. One of ordinary skill in the art, without undue experimentation may determine preferred aerosols.

The compositions described herein may be prepared with carriers that protect the agents against rapid elimination from the body, such as time release formulations or coatings. Such carriers include controlled release formulations, such as, but not limited to, implants and microencapsulated delivery systems, and biodegradable, biocompatible polymers, such as ethylene vinyl acetate, polyanhydrides, polyglycolic acid, polyorthoesters, polylactic acid and others known to those of ordinary skill in the art.

The therapeutic or pharmaceutical compositions may be prepared by methodology well known in the pharmaceutical art. For example, a therapeutic or pharmaceutical composition intended to be administered by injection may comprise one or more of salts, buffers and/or stabilizers, with sterile, distilled water so as to form a solution. A surfactant may be added to facilitate the formation of a homogeneous solution or suspension. Surfactants are compounds that non-covalently interact with the agent so as to facilitate dissolution or homogeneous suspension of the agent in the aqueous delivery system.

The therapeutic or pharmaceutical compositions may be administered in a therapeutically effective amount, which will vary depending upon a variety of factors including the activity of the specific compound employed; the metabolic stability and length of action of the compound; the age, body weight, general health, sex, and diet of the subject; the mode and time of administration; the rate of excretion; the drug combination; the severity of the particular disorder or condition; and the subject undergoing therapy. In some instances, a therapeutically effective daily dose is (for a 70 kg mammal) from about 0.001 mg/kg (i.e., ~0.07 mg) to about 100 mg/kg (i.e., ~7.0 g); preferably a therapeutically effective dose is (for a 70 kg mammal) from about 0.01 mg/kg (i.e., ~0.7 mg) to about 50 mg/kg (i.e., ~3.5 g); more preferably a therapeutically effective dose is (for a 70 kg mammal) from about 1 mg/kg (i.e., ~70 mg) to about 25 mg/kg (i.e., ~1.75 g). In some embodiments, the therapeutically effective dose is administered on a weekly, bi-weekly, or monthly basis. In specific embodiments, the therapeutically effective dose is administered on a weekly, bi-weekly, or monthly basis, for example, at a dose of about 1-10 or 1-5 mg/kg, or about 1, 2, 3, 4, 5, 6, 7, 8, 9, or 10 mg/kg.

The combination therapies described herein may include administration of a single pharmaceutical dosage formulation, which contains a modified PPE protein or proprotein and an additional therapeutic agent (e.g., immunotherapy agent, chemotherapeutic agent, hormonal therapeutic agent, kinase inhibitor), as well as administration of compositions comprising a modified PPE protein or proprotein and an additional therapeutic agent in its own separate pharmaceutical dosage formulation. For example, a modified PPE protein or proprotein and an additional therapeutic agent can be administered to the subject together in a single parenteral dosage composition such as in a saline solution or other physiologically acceptable solution, or each agent administered in separate parenteral dosage formulations. Where separate dosage formulations are used, the compositions can be administered at essentially the same time, i.e., concurrently, or at separately staggered times, i.e., sequentially and in any order; combination therapy is understood to include all these regimens.

Also included are patient care kits, comprising (a) at least one modified PPE protein or proprotein, as described herein; and optionally (b) at least one additional therapeutic agent (e.g., immunotherapy agent, chemotherapeutic agent, hormonal therapeutic agent, kinase inhibitor). In certain kits, (a) and (b) are in separate therapeutic compositions. In some kits, (a) and (b) are in the same therapeutic composition.

The kits herein may also include a one or more additional therapeutic agents or other components suitable or desired for the indication being treated, or for the desired diagnostic application. The kits herein can also include one or more syringes or other components necessary or desired to facilitate an intended mode of delivery (e.g., stents, implantable depots, etc.).

In some embodiments, a patient care kit contains separate containers, dividers, or compartments for the composition(s) and informational material(s). For example, the composition(s) can be contained in a bottle, vial, or syringe, and the informational material(s) can be contained in association with the container. In some embodiments, the separate elements of the kit are contained within a single, undivided container. For example, the composition is contained in a bottle, vial or syringe that has attached thereto the informational material in the form of a label. In some embodiments, the kit includes a plurality (e.g., a pack) of individual containers, each containing one or more unit dosage forms (e.g., a dosage form described herein) of a modified PPE protein or proprotein and optionally at least one additional therapeutic agent. For example, the kit includes a plurality of syringes, ampules, foil packets, or blister packs, each containing a single unit dose of a modified PPE protein or proprotein and optionally at least one additional therapeutic agent. The containers of the kits can be air tight, waterproof (e.g., impermeable to changes in moisture or evaporation), and/or light-tight.

The patient care kit optionally includes a device suitable for administration of the composition, e.g., a syringe, inhalant, dropper (e.g., eye dropper), swab (e.g., a cotton swab or wooden swab), or any such delivery device. In some embodiments, the device is an implantable device that dispenses metered doses of the agent(s). Also included are methods of providing a kit, e.g., by combining the components described herein.

Expression and Purification Systems

Certain embodiments include methods and related compositions for expressing and purifying a modified PPE protein or proprotein described herein. Such recombinant modified PPE proteins or proproteins can be conveniently prepared using standard protocols as described for example in Sambrook, et al., (1989, supra), in particular Sections 16 and 17; Ausubel et al., (1994, supra), in particular Chapters 10 and 16; and Coligan et al., Current Protocols in Protein Science (John Wiley & Sons, Inc. 1995-1997), in particular Chapters 1, 5 and 6. As one general example, a modified PPE protein or proprotein may be prepared by a procedure including one or more of the steps of: (a) preparing a vector or construct comprising a polynucleotide sequence that encodes a modified PPE protein or proprotein described herein (see, e.g., Table S2), which is operably linked to one or more regulatory elements; (b) introducing the vector or construct into a host cell; (c) culturing the host cell to express the modified PPE protein or proprotein; and (d) isolating the modified PPE protein or proprotein from the host cell.

To express a desired polypeptide, a nucleotide sequence encoding a modified PPE protein or proprotein may be inserted into appropriate expression vector(s), i.e., vector(s) which contain the necessary elements for the transcription and translation of the inserted coding sequence. Methods which are well known to those skilled in the art may be used to construct expression vectors containing sequences encoding a polypeptide of interest and appropriate transcriptional and translational control elements. These methods include in vitro recombinant DNA techniques, synthetic techniques, and in vivo genetic recombination. Such techniques are described in Sambrook et al., Molecular Cloning, A Laboratory Manual (1989), and Ausubel et al., Current Protocols in Molecular Biology (1989).

A variety of expression vector/host systems are known and may be utilized to contain and express polynucleotide sequences. These include, but are not limited to, microorganisms such as bacteria transformed with recombinant bacteriophage, plasmid, or cosmid DNA expression vectors; yeast transformed with yeast expression vectors; insect cell systems infected with virus expression vectors (e.g., baculovirus); plant cell systems transformed with virus expression vectors (e.g., cauliflower mosaic virus, CaMV; tobacco mosaic virus, TMV) or with bacterial expression vectors (e.g., Ti or pBR322 plasmids); or animal cell systems, including mammalian cell and more specifically human cell systems.

The "control elements" or "regulatory sequences" present in an expression vector are those non-translated regions of the vector—enhancers, promoters, 5' and 3' untranslated regions—which interact with host cellular proteins to carry out transcription and translation. Such elements may vary in their strength and specificity. Depending on the vector system and host utilized, any number of suitable transcription and translation elements, including constitutive and inducible promoters, may be used. For example, when cloning in bacterial systems, inducible promoters such as the hybrid lacZ promoter of the PBLUESCRIPT phagemid (Stratagene, La Jolla, Calif.) or PSPORT1 plasmid (Gibco BRL, Gaithersburg, Md.) and the like may be used. In mammalian cell systems, promoters from mammalian genes or from mammalian viruses are generally preferred. If it is necessary to generate a cell line that contains multiple copies of the sequence encoding a polypeptide, vectors based on SV40 or EBV may be advantageously used with an appropriate selectable marker.

In bacterial systems, a number of expression vectors may be selected depending upon the use intended for the expressed polypeptide. For example, when large quantities are needed, vectors which direct high level expression of fusion proteins that are readily purified may be used. Such vectors include, but are not limited to, the multifunctional *E. coli* cloning and expression vectors such as BLUESCRIPT (Stratagene), in which the sequence encoding the polypeptide of interest may be ligated into the vector in frame with sequences for the amino-terminal Met and the subsequent 7 residues of β-galactosidase so that a hybrid protein is produced; pIN vectors (Van Heeke & Schuster, J. Biol. Chem. 264:5503 5509 (1989)); and the like. pGEX Vectors (Promega, Madison, Wis.) may also be used to express foreign polypeptides as fusion proteins with glutathione S-transferase (GST). In general, such fusion proteins are soluble and can easily be purified from lysed cells by adsorption to glutathione-agarose beads followed by elution in the presence of free glutathione. Proteins made in such systems may be designed to include heparin, thrombin, or factor XA protease cleavage sites so that the cloned polypeptide of interest can be released from the GST moiety at will.

Certain embodiments employ *E. coli*-based expression systems (see, e.g., Structural Genomics Consortium et al., Nature Methods. 5:135-146, 2008). These and related embodiments may rely partially or totally on ligation-independent cloning (LIC) to produce a suitable expression vector. In specific embodiments, protein expression may be controlled by a T7 RNA polymerase (e.g., pET vector series). These and related embodiments may utilize the expression host strain BL21 (DE3), a λDE3 lysogen of BL21 that supports T7-mediated expression and is deficient in lon and ompT proteases for improved target protein stability. Also included are expression host strains carrying plasmids encoding tRNAs rarely used in *E. coli*, such as ROSETTA™ (DE3) and Rosetta 2 (DE3) strains. Cell lysis and sample handling may also be improved using reagents sold under the trademarks BENZONASE® nuclease and BUGBUSTER® Protein Extraction Reagent. For cell culture, auto-inducing media can improve the efficiency of many expression systems, including high-throughput expression systems. Media of this type (e.g., OVERNIGHT EXPRESS™ Autoinduction System) gradually elicit protein expression through metabolic shift without the addition of artificial inducing agents such as IPTG. Particular embodiments employ hexahistidine tags (such as those sold under the trademark HIS•TAG® fusions), followed by immobilized metal affinity chromatography (IMAC) purification, or related techniques. In certain aspects, however, clinical grade proteins can be isolated from *E. coli* inclusion bodies, without or without the use of affinity tags (see, e.g., Shimp et al., Protein Expr Purif. 50:58-67, 2006). As a further example, certain embodiments may employ a cold-shock induced *E. coli* high-yield production system, because overexpression of proteins in *Escherichia coli* at low temperature improves their solubility and stability (see, e.g., Qing et al., Nature Biotechnology. 22:877-882, 2004).

Also included are high-density bacterial fermentation systems. For example, high cell density cultivation of *Ralstonia eutropha* allows protein production at cell densities of over 150 g/L, and the expression of recombinant proteins at titers exceeding 10 g/L.

In the yeast *Saccharomyces cerevisiae*, a number of vectors containing constitutive or inducible promoters such as alpha factor, alcohol oxidase, and PGH may be used. For reviews, see Ausubel et al. (supra) and Grant et al., Methods Enzymol. 153:516-544 (1987). Also included are *Pichia pandoris* expression systems (see, e.g., Li et al., Nature Biotechnology. 24, 210-215, 2006; and Hamilton et al., Science, 301:1244, 2003). Certain embodiments include yeast systems that are engineered to selectively glycosylate proteins, including yeast that have humanized N-glycosylation pathways, among others (see, e.g., Hamilton et al., Science. 313:1441-1443, 2006; Wildt et al., Nature Reviews Microbiol. 3:119-28, 2005; and Gerngross et al., Nature-Biotechnology. 22:1409-1414, 2004; U.S. Pat. Nos. 7,629, 163; 7,326,681; and 7,029,872). Merely by way of example, recombinant yeast cultures can be grown in Fernbach Flasks or 15L, 50L, 100L, and 200L fermentors, among others.

In cases where plant expression vectors are used, the expression of sequences encoding polypeptides may be driven by any of a number of promoters. For example, viral promoters such as the 35S and 19S promoters of CaMV may be used alone or in combination with the omega leader sequence from TMV (Takamatsu, EMBO J. 6:307-311 (1987)). Alternatively, plant promoters such as the small subunit of RUBISCO or heat shock promoters may be used (Coruzzi et al., EMBO J. 3:1671-1680 (1984); Broglie et al., Science 224:838-843 (1984); and Winter et al., Results Probl. Cell Differ. 17:85-105 (1991)). These constructs can be introduced into plant cells by direct DNA transformation or pathogen-mediated transfection. Such techniques are described in a number of generally available reviews (see, e.g., Hobbs in McGraw Hill, Yearbook of Science and Technology, pp. 191-196 (1992)).

An insect system may also be used to express a polypeptide of interest. For example, in one such system, *Autographa californica* nuclear polyhedrosis virus (AcNPV) is used as a vector to express foreign genes in *Spodoptera frugiperda* cells or in *Trichoplusia* cells. The sequences encoding the polypeptide may be cloned into a non-essential region of the virus, such as the polyhedrin gene, and placed under control of the polyhedrin promoter. Successful insertion of the polypeptide-encoding sequence will render the polyhedrin gene inactive and produce recombinant virus lacking coat protein. The recombinant viruses may then be used to infect, for example, *S. frugiperda* cells or *Trichoplusia* cells in which the polypeptide of interest may be expressed (Engelhard et al., Proc. Natl. Acad. Sci. U.S.A. 91:3224-3227 (1994)). Also included are baculovirus expression systems, including those that utilize SF9, SF21, and *T. ni* cells (see, e.g., Murphy and Piwnica-Worms, Curr Protoc Protein Sci. Chapter 5: Unit 5.4, 2001). Insect systems can provide post-translation modifications that are similar to mammalian systems.

In mammalian host cells, a number of viral-based expression systems are generally available. For example, in cases where an adenovirus is used as an expression vector, sequences encoding a polypeptide of interest may be ligated into an adenovirus transcription/translation complex consisting of the late promoter and tripartite leader sequence. Insertion in a non-essential E1 or E3 region of the viral genome may be used to obtain a viable virus which is capable of expressing the polypeptide in infected host cells (Logan & Shenk, Proc. Natl. Acad. Sci. U.S.A. 81:3655-3659 (1984)). In addition, transcription enhancers, such as the Rous sarcoma virus (RSV) enhancer, may be used to increase expression in mammalian host cells.

Examples of useful mammalian host cell lines include monkey kidney CV1 line transformed by SV40 (COS-7, ATCC CRL 1651); human embryonic kidney line (293 or 293 cells sub-cloned for growth in suspension culture, Graham et al., J. Gen Virol. 36:59 (1977)); baby hamster kidney cells (BHK, ATCC CCL 10); mouse sertoli cells (TM4, Mather, Biol. Reprod. 23:243-251 (1980)); monkey kidney cells (CV1 ATCC CCL 70); African green monkey kidney cells (VERO-76, ATCC CRL-1587); human cervical carcinoma cells (HELA, ATCC CCL 2); canine kidney cells (MDCK, ATCC CCL 34); buffalo rat liver cells (BRL 3A, ATCC CRL 1442); human lung cells (W138, ATCC CCL 75); human liver cells (Hep G2, HB 8065); mouse mammary tumor (MMT 060562, ATCC CCL51); TRI cells (Mather et al., Annals N.Y. Acad. Sci. 383:44-68 (1982)); MRC 5 cells; FS4 cells; and a human hepatoma line (Hep G2). Other useful mammalian host cell lines include Chinese hamster ovary (CHO) cells, including DHFR-CHO cells (Urlaub et al., PNAS USA 77:4216 (1980)); and myeloma cell lines such as NS0 and Sp2/0. For a review of certain mammalian host cell lines suitable for protein production, see, e.g., Yazaki and Wu, Methods in Molecular Biology, Vol. 248 (B. K. C Lo, ed., Humana Press, Totowa, N.J., 2003), pp. 255-268. Certain preferred mammalian cell expression systems include CHO and HEK293-cell based expression systems. Mammalian expression systems can utilize attached cell lines, for example, in T-flasks, roller bottles, or cell factories, or suspension cultures, for example, in 1L and 5L spinners, 5L, 14L, 40L, 100L and 200L stir tank bioreactors, or 20/50L and 100/200L WAVE bioreactors, among others known in the art.

Also included is the cell-free expression of proteins. These and related embodiments typically utilize purified RNA polymerase, ribosomes, tRNA and ribonucleotides; these reagents may be produced by extraction from cells or from a cell-based expression system.

Specific initiation signals may also be used to achieve more efficient translation of sequences encoding a polypeptide of interest. Such signals include the ATG initiation codon and adjacent sequences. In cases where sequences encoding the polypeptide, its initiation codon, and upstream sequences are inserted into the appropriate expression vector, no additional transcriptional or translational control signals may be needed. However, in cases where only coding sequence, or a portion thereof, is inserted, exogenous translational control signals including the ATG initiation codon should be provided. Furthermore, the initiation codon should be in the correct reading frame to ensure translation of the entire insert. Exogenous translational elements and initiation codons may be of various origins, both natural and synthetic. The efficiency of expression may be enhanced by the inclusion of enhancers which are appropriate for the particular cell system which is used, such as those described in the literature (Scharf. et al., Results Probl. Cell Differ. 20:125-162 (1994)).

In addition, a host cell strain may be chosen for its ability to modulate the expression of the inserted sequences or to process the expressed protein in the desired fashion. Such modifications of the polypeptide include, but are not limited to, post-translational modifications such as acetylation, carboxylation, glycosylation, phosphorylation, lipidation, and acylation. Post-translational processing which cleaves a "prepro" form of the protein may also be used to facilitate correct insertion, folding and/or function. Different host cells such as yeast, CHO, HeLa, MDCK, HEK293, and W138, in addition to bacterial cells, which have or even lack specific cellular machinery and characteristic mechanisms for such post-translational activities, may be chosen to ensure the correct modification and processing of the foreign protein.

For long-term, high-yield production of recombinant proteins, stable expression is generally preferred. For example, cell lines which stably express a polynucleotide of interest may be transformed using expression vectors which may contain viral origins of replication and/or endogenous expression elements and a selectable marker gene on the same or on a separate vector. Following the introduction of the vector, cells may be allowed to grow for about 1-2 days in an enriched media before they are switched to selective media. The purpose of the selectable marker is to confer resistance to selection, and its presence allows growth and recovery of cells which successfully express the introduced sequences. Resistant clones of stably transformed cells may be proliferated using tissue culture techniques appropriate to the cell type. Transient production, such as by transient transfection or infection, can also be employed. Exemplary mammalian expression systems that are suitable for transient production include HEK293 and CHO-based systems.

Any number of selection systems may be used to recover transformed or transduced cell lines. These include, but are not limited to, the herpes simplex virus thymidine kinase (Wigler et al., Cell 11:223-232 (1977)) and adenine phosphoribosyltransferase (Lowy et al., Cell 22:817-823 (1990)) genes which can be employed in tk- or aprt-cells, respectively. Also, antimetabolite, antibiotic or herbicide resistance can be used as the basis for selection; for example, dhfr which confers resistance to methotrexate (Wigler et al., Proc. Natl. Acad. Sci. U.S.A. 77:3567-70 (1980)); npt, which confers resistance to the aminoglycosides, neomycin and G-418 (Colbere-Garapin et al., J. Mol. Biol. 150:1-14 (1981)); and als or pat, which confer resistance to chlorsulfuron and phosphinotricin acetyltransferase, respectively (Murry, supra). Additional selectable genes have been described, for example, trpB, which allows cells to utilize indole in place of tryptophan, or hisD, which allows cells to utilize histinol in place of histidine (Hartman & Mulligan, Proc. Natl. Acad. Sci. U.S.A. 85:8047-51 (1988)). The use of visible markers has gained popularity with such markers as green fluorescent protein (GFP) and other fluorescent proteins (e.g., RFP, YFP), anthocyanins, β-glucuronidase and its substrate GUS, and luciferase and its substrate luciferin, being widely used not only to identify transformants, but also to quantify the amount of transient or stable protein expression attributable to a specific vector system (see, e.g., Rhodes et al., Methods Mol. Biol. 55:121-131 (1995)).

Also included are high-throughput protein production systems, or micro-production systems. Certain aspects may utilize, for example, hexa-histidine fusion tags for protein expression and purification on metal chelate-modified slide surfaces or MagneHis Ni-Particles (see, e.g., Kwon et al., BMC Biotechnol. 9:72, 2009; and Lin et al., Methods Mol Biol. 498:129-41, 2009)). Also included are high-throughput cell-free protein expression systems (see, e.g., Sitaraman et al., Methods Mol Biol. 498:229-44, 2009).

A variety of protocols for detecting and measuring the expression of polynucleotide-encoded products, using binding agents or antibodies such as polyclonal or monoclonal antibodies specific for the product, are known in the art. Examples include enzyme-linked immunosorbent assay (ELISA), western immunoblots, radioimmunoassays (RIA), and fluorescence activated cell sorting (FACS). These and other assays are described, among other places, in Hampton et al., Serological Methods, a Laboratory Manual (1990) and Maddox et al., J. Exp. Med. 158:1211-1216 (1983).

A wide variety of labels and conjugation techniques are known by those skilled in the art and may be used in various nucleic acid and amino acid assays. Means for producing labeled hybridization or PCR probes for detecting sequences related to polynucleotides include oligolabeling, nick translation, end-labeling or PCR amplification using a labeled nucleotide. Alternatively, the sequences, or any portions thereof may be cloned into a vector for the production of an mRNA probe. Such vectors are known in the art, are commercially available, and may be used to synthesize RNA probes in vitro by addition of an appropriate RNA polymerase such as T7, T3, or SP6 and labeled nucleotides. These procedures may be conducted using a variety of commercially available kits. Suitable reporter molecules or labels, which may be used include radionuclides, enzymes, fluorescent, chemiluminescent, or chromogenic agents as well as substrates, cofactors, inhibitors, magnetic particles, and the like.

Host cells transformed with one or more polynucleotide sequences of interest may be cultured under conditions suitable for the expression and recovery of the protein from cell culture. Certain specific embodiments utilize serum free cell expression systems. Examples include HEK293 cells and CHO cells that can be grown in serum free medium (see, e.g., Rosser et al., Protein Expr. Purif. 40:237-43, 2005; and U.S. Pat. No. 6,210,922).

A modified PPE protein or proprotein produced by a recombinant cell may be secreted or contained intracellularly depending on the sequence and/or the vector used. As will be understood by those of skill in the art, expression vectors containing polynucleotides may be designed to contain signal sequences which direct secretion of the encoded polypeptide through a prokaryotic or eukaryotic cell membrane. Other recombinant constructions may be used to join sequences encoding a polypeptide of interest to nucleotide sequence encoding a polypeptide domain which will facilitate purification and/or detection of soluble proteins. Examples of such domains include cleavable and non-cleavable affinity purification and epitope tags such as avidin, FLAG tags, poly-histidine tags (e.g., 6×His), cMyc tags, V5-tags, glutathione S-transferase (GST) tags, and others.

The protein produced by a recombinant cell can be purified and characterized according to a variety of techniques known in the art. Exemplary systems for performing protein purification and analyzing protein purity include fast protein liquid chromatography (FPLC) (e.g., AKTA and Bio-Rad FPLC systems), high-performance liquid chromatography (HPLC) (e.g., Beckman and Waters HPLC). Exemplary chemistries for purification include ion exchange chromatography (e.g., Q, S), size exclusion chromatography, salt gradients, affinity purification (e.g., Ni, Co, FLAG, maltose, glutathione, protein A/G), gel filtration, reverse-phase, ceramic HYPERD® ion exchange chromatography, and hydrophobic interaction columns (HIC), among others known in the art. Also included are analytical methods such as SDS-PAGE (e.g., coomassie, silver stain), immunoblot, Bradford, and ELISA, which may be utilized during any step of the production or purification process, typically to measure the purity of the protein composition.

Also included are methods of concentrating a modified PPE protein or proprotein, and compositions comprising concentrated soluble a modified PPE protein or proprotein. In some aspects, such concentrated solutions of a modified PPE protein or proprotein comprises proteins at a concentration of about or at least about 5 mg/mL, 8 mg/mL, 10 mg/mL, 15 mg/mL, 20 mg/mL, or more.

In some aspects, such compositions may be substantially monodisperse, meaning that a modified PPE protein or proprotein exists primarily (i.e., at least about 90%, or greater) in one apparent molecular weight form when assessed for example, by size exclusion chromatography, dynamic light scattering, or analytical ultracentrifugation.

In some aspects, such compositions have a purity (on a protein basis) of at least about 90%, or in some aspects at least about 95% purity, or in some embodiments, at least 98% purity. Purity may be determined via any routine analytical method as known in the art.

In some aspects, such compositions have a high molecular weight aggregate content of less than about 10%, compared to the total amount of protein present, or in some embodiments such compositions have a high molecular weight aggregate content of less than about 5%, or in some aspects such compositions have a high molecular weight aggregate content of less than about 3%, or in some embodiments a high molecular weight aggregate content of less than about 1%. High molecular weight aggregate content may be determined via a variety of analytical techniques including for example, by size exclusion chromatography, dynamic light scattering, or analytical ultracentrifugation.

Examples of concentration approaches contemplated herein include lyophilization, which is typically employed when the solution contains few soluble components other than the protein of interest. Lyophilization is often performed after HPLC, and can remove most or all volatile components from the mixture. Also included are ultrafiltration techniques, which typically employ one or more selective permeable membranes to concentrate a protein solution. The membrane allows water and small molecules to pass through and retains the protein; the solution can be forced against the membrane by mechanical pump, gas pressure, or centrifugation, among other techniques.

In certain embodiments, a modified PPE protein or proprotein in a composition has a purity of at least about 90%, as measured according to routine techniques in the art. In certain embodiments, such as diagnostic compositions or certain pharmaceutical or therapeutic compositions, a modified PPE protein or proprotein in a composition has a purity of at least about 95%, or at least about 97% or 98% or 99%. In some embodiments, such as when being used as reference or research reagents, a modified PPE protein or proprotein can be of lesser purity, and may have a purity of at least about 50%, 60%, 70%, or 80%. Purity can be measured overall or in relation to selected components, such as other proteins, e.g., purity on a protein basis.

Purified proteins can also be characterized according to their biological characteristics. Binding affinity and binding kinetics can be measured according to a variety of techniques known in the art, such as Biacore® and related technologies that utilize surface plasmon resonance (SPR), an optical phenomenon that enables detection of unlabeled interactants in real time. SPR-based biosensors can be used in determination of active concentration, screening and characterization in terms of both affinity and kinetics. The presence or levels of one or more biological activities can be measured according to in vitro or cell-based assays, which are optionally functionally coupled to a readout or indicator, such as a fluorescent or luminescent indicator of biological activity, as described herein.

In certain embodiments, as noted above, a composition is substantially endotoxin free, including, for example, about 95% endotoxin free, preferably about 99% endotoxin free, and more preferably about 99.99% endotoxin free. The presence of endotoxins can be detected according to routine techniques in the art, as described herein. In specific embodiments, a modified PPE protein or proprotein is made from a eukaryotic cell such as a mammalian or human cell in substantially serum free media. In certain embodiments, as noted herein, a composition has an endotoxin content of less than about 10 EU/mg of protein, or less than about 5 EU/mg of protein, less than about 3 EU/mg of protein, or less than about 1 EU/mg of protein.

In certain embodiments, a composition comprises less than about 10% wt/wt high molecular weight aggregates, or less than about 5% wt/wt high molecular weight aggregates, or less than about 2% wt/wt high molecular weight aggregates, or less than about or less than about 1% wt/wt high molecular weight aggregates.

Also included are protein-based analytical assays and methods, which can be used to assess, for example, protein purity, size, solubility, and degree of aggregation, among other characteristics. Protein purity can be assessed a number of ways. For instance, purity can be assessed based on primary structure, higher order structure, size, charge, hydrophobicity, and glycosylation. Examples of methods for assessing primary structure include N- and C-terminal sequencing and peptide-mapping (see, e.g., Allen et al., Biologicals. 24:255-275, 1996)). Examples of methods for assessing higher order structure include circular dichroism (see, e.g., Kelly et al., Biochim Biophys Acta. 1751:119-139, 2005), fluorescent spectroscopy (see, e.g., Meagher et al., J. Biol. Chem. 273:23283-89, 1998), FT-IR, amide hydrogen-deuterium exchange kinetics, differential scanning calorimetry, NMR spectroscopy, immunoreactivity with conformationally sensitive antibodies. Higher order structure can also be assessed as a function of a variety of parameters such as pH, temperature, or added salts. Examples of methods for assessing protein characteristics such as size include analytical ultracentrifugation and size exclusion HPLC (SEC-HPLC), and exemplary methods for measuring charge include ion-exchange chromatography and isoelectric focusing. Hydrophobicity can be assessed, for example, by reverse-phase HPLC and hydrophobic interaction chromatography HPLC. Glycosylation can affect pharmacokinetics (e.g., clearance), conformation or stability, receptor binding, and protein function, and can be assessed, for example, by mass spectrometry and nuclear magnetic resonance (NMR) spectroscopy.

As noted above, certain embodiments include the use of SEC-HPLC to assess protein characteristics such as purity, size (e.g., size homogeneity) or degree of aggregation, and/or to purify proteins, among other uses. SEC, also including gel-filtration chromatography (GFC) and gel-permeation chromatography (GPC), refers to a chromatographic method in which molecules in solution are separated in a porous material based on their size, or more specifically their hydrodynamic volume, diffusion coefficient, and/or surface properties. The process is generally used to separate biological molecules, and to determine molecular weights and molecular weight distributions of polymers. Typically, a biological or protein sample (such as a protein extract produced according to the protein expression methods provided herein and known in the art) is loaded into a selected size-exclusion column with a defined stationary phase (the porous material), preferably a phase that does not interact with the proteins in the sample. In certain aspects, the stationary phase is composed of inert particles packed into a dense three-dimensional matrix within a glass or steel column. The mobile phase can be pure water, an aqueous buffer, an organic solvent, or a mixture thereof. The stationary-phase particles typically have small pores and/or channels which only allow molecules below a certain size to enter. Large particles are therefore excluded from these pores and channels, and their limited interaction with the stationary phase leads them to elute as a "totally-excluded" peak at the beginning of the experiment. Smaller molecules, which can fit into the pores, are removed from the flowing mobile phase, and the time they spend immobilized in the stationary-phase pores depends, in part, on how far into the pores they penetrate. Their removal from the mobile phase flow causes them to take longer to elute from the column and results in a separation between the particles based on differences in their size. A given size exclusion column has a range of molecular weights that can be separated. Overall, molecules larger than the upper limit will not be trapped by the stationary phase, molecules smaller than the lower limit will completely enter the solid phase and elute as a single band, and molecules within the range will elute at different rates, defined by their properties such as hydrodynamic volume. For examples of these methods in practice with pharmaceutical proteins, see Bruner et al., Journal of Pharmaceutical and Biomedical Analysis. 15:1929-1935, 1997.

Protein purity for clinical applications is also discussed, for example, by Anicetti et al. (Trends in Biotechnology.

7:342-349, 1989). More recent techniques for analyzing protein purity include, without limitation, the LabChip GXII, an automated platform for rapid analysis of proteins and nucleic acids, which provides high throughput analysis of titer, sizing, and purity analysis of proteins. In certain non-limiting embodiments, clinical grade proteins can be obtained by utilizing a combination of chromatographic materials in at least two orthogonal steps, among other methods (see, e.g., Therapeutic Proteins: Methods and Protocols. Vol. 308, Eds., Smales and James, Humana Press Inc., 2005). Typically, protein agents are substantially endotoxin-free, as measured according to techniques known in the art and described herein.

Protein solubility assays are also included. Such assays can be utilized, for example, to determine optimal growth and purification conditions for recombinant production, to optimize the choice of buffer(s), and to optimize the choice of a modified PPE protein or proprotein and variants thereof. Solubility or aggregation can be evaluated according to a variety of parameters, including temperature, pH, salts, and the presence or absence of other additives. Examples of solubility screening assays include, without limitation, microplate-based methods of measuring protein solubility using turbidity or other measure as an end point, high-throughput assays for analysis of the solubility of purified recombinant proteins (see, e.g., Stenvall et al., Biochim Biophys Acta. 1752:6-10, 2005), assays that use structural complementation of a genetic marker protein to monitor and measure protein folding and solubility in vivo (see, e.g., Wigley et al., Nature Biotechnology. 19:131-136, 2001), and electrochemical screening of recombinant protein solubility in *Escherichia coli* using scanning electrochemical microscopy (SECM) (see, e.g., Nagamine et al., Biotechnology and Bioengineering. 96:1008-1013, 2006), among others. A modified PPE protein or proprotein with increased solubility (or reduced aggregation) can be identified or selected for according to routine techniques in the art, including simple in vivo assays for protein solubility (see, e.g., Maxwell et al., Protein Sci. 8:1908-11, 1999).

Protein solubility and aggregation can also be measured by dynamic light scattering techniques. Aggregation is a general term that encompasses several types of interactions or characteristics, including soluble/insoluble, covalent/non-covalent, reversible/irreversible, and native/denatured interactions and characteristics. For protein therapeutics, the presence of aggregates is typically considered undesirable because of the concern that aggregates may cause an immunogenic reaction (e.g., small aggregates), or may cause adverse events on administration (e.g., particulates). Dynamic light scattering refers to a technique that can be used to determine the size distribution profile of small particles in suspension or polymers such as proteins in solution. This technique, also referred to as photon correlation spectroscopy (PCS) or quasi-elastic light scattering (QELS), uses scattered light to measure the rate of diffusion of the protein particles. Fluctuations of the scattering intensity can be observed due to the Brownian motion of the molecules and particles in solution. This motion data can be conventionally processed to derive a size distribution for the sample, wherein the size is given by the Stokes radius or hydrodynamic radius of the protein particle. The hydrodynamic size depends on both mass and shape (conformation). Dynamic scattering can detect the presence of very small amounts of aggregated protein (<0.01% by weight), even in samples that contain a large range of masses. It can also be used to compare the stability of different formulations, including, for example, applications that rely on real-time monitoring of changes at elevated temperatures. Accordingly, certain embodiments include the use of dynamic light scattering to analyze the solubility and/or presence of aggregates in a sample that contains a modified PPE protein or proprotein of the present disclosure.

Although the foregoing embodiments have been described in some detail by way of illustration and example for purposes of clarity of understanding, it will be readily apparent to one of ordinary skill in the art in light of the teachings of this disclosure that certain changes and modifications may be made thereto without departing from the spirit or scope of the appended claims. The following examples are provided by way of illustration only and not by way of limitation. Those of skill in the art will readily recognize a variety of noncritical parameters that could be changed or modified to yield essentially similar results.

EXAMPLES

Example 1

Activity of PPE Mutants

Ten mutants of porcine pancreatic elastase (PPE) proteins were prepared and tested. The mutants were prepared as enzymatically-inactive PPE proproteins, comprising an N-terminal modified signal peptide (SEQ ID NO: 2) and trypsin-cleavable activation peptide (SEQ ID NO: 3), a mutated PPE peptidase domain, and a C-terminal 6×His tag. The mutant designations are provided in Table E1 below, the residue numbering being defined relative to SEQ ID NO: 1.

TABLE E1

| PPE Mutants | |
| --- | --- |
| Mutant Designation | Mutation (a.a. position) |
| Mutant A | N241A |
| Mutant B | N241Y |
| Mutant C | R75A |
| Mutant D | R75E |
| Mutant E | Q211A |
| Mutant F | Q211F |
| Mutant G | R237A |
| Mutant H | T55A |
| Mutant I | S214A |
| Mutant J | D74A |

To test the activation of the modified PPE proproteins, native PPE (wild-type, active PPE peptidase domain), wild-type PPE proprotein (also pro-PPE), and modified PPE proproteins (Mutants A-J) were incubated with trypsin (trypsin: PPE at a ratio of 1:20 w/w) for variable time points (0-24 hours). Cleavage was monitored by SDS-PAGE and Coomassie blue staining. As shown in FIGS. 1A-1D, trypsin cleaved wild-type and modified PPE proproteins to generate a band of the same size as the native PPE, and the cleavage reaction was completed by 2 hours of incubation. The results further show that extended incubation with trypsin does not result in further cleavage, suggesting that trypsin does not further cleave the pro-PPE forms following initial conversion to active PPE. Indeed, incubating native PPE (active PPE peptidase domain) with trypsin did not result in the appearance of lower molecular weight bands (see FIG. 1A).

Figure 2A:
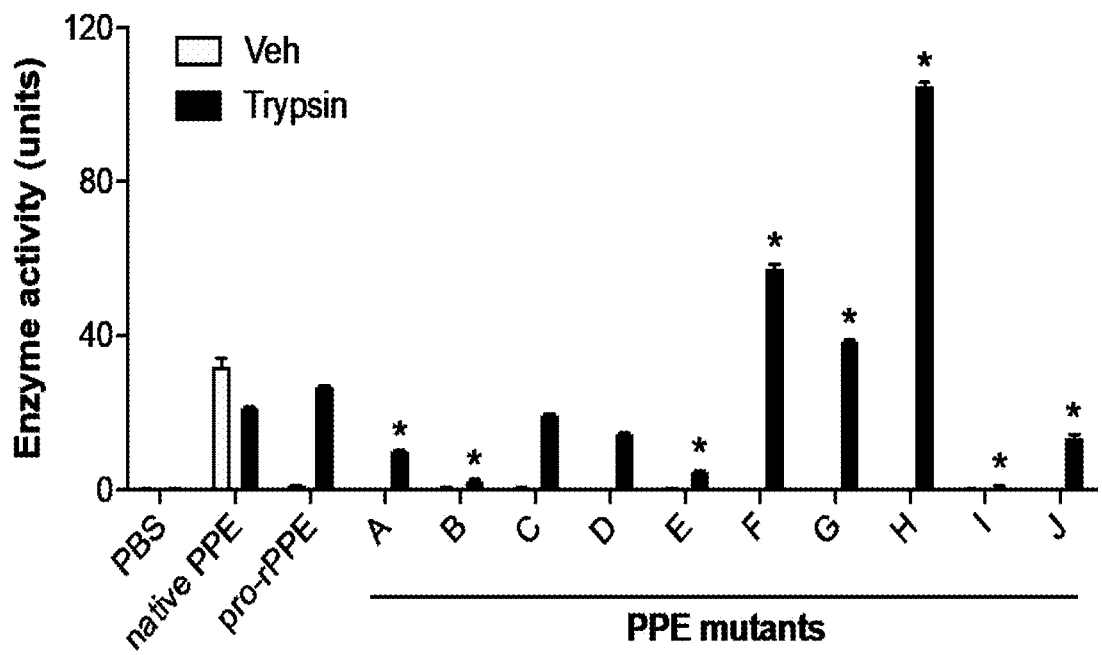
FIGS. 2A-2B show increased enzymatic activity of wild-type and modified PPE proproteins after trypsin cleavage and conversion to active PPE (Vehicle (Veh); *, p<0.05, Student's t-test).

To test the enzymatic activity of trypsin-activated proproteins, wild-type PPE protein and modified PPE proproteins (Mutants A-J) were incubated with vehicle (Veh) or with trypsin (trypsin: PPE at a ratio of 1:20 w/w) for 6 hours at 37° C. (n=4/condition). Catalytic activity was monitored using a colorimetric substrate activity assay (N-Methoxysuccinyl-Ala-Ala-Pro-Val p-nitroanilide; Sigma). The results in FIG. 2A show increased enzymatic activity of modified PPEs after trypsin cleavage.

To test the enzymatic activity of trypsin-activated proproteins in the presence of serine protease inhibitor, wild-type human neutrophil elastase (ELANE), (activated) wild-type PPE protein (also native PPE), wild-type PPE proprotein (also WT rPPE), and (activated) modified PPE proteins were incubated with various doses of human alpha-1-anti-trypsin (A1AT; 0-20 nM) for 30 minutes at room temperature and catalytic activity was quantified. Sensitivity to A1AT was assessed by linear regression analysis of the decrease in enzyme activity versus A1AT concentration (see Table E2 below; P-value=significance of linear regression fit).

TABLE E2

| Enzyme | Slope | p-value |
| --- | --- | --- |
| ELANE | −3.76 | <0.001 |
| WT PPE protein | −2.06 | <0.001 |
| WT PPE proprotein | −2.68 | <0.001 |
| Mutant A | −3.64 | <0.001 |
| Mutant C | −2.86 | <0.001 |
| Mutant D | −3.94 | <0.001 |
| Mutant F | −3.37 | <0.001 |
| Mutant G | −2.00 | <0.001 |
| Mutant H | −0.80 | <0.001 |
| Mutant J | −4.98 | <0.001 |

Figure 2B:
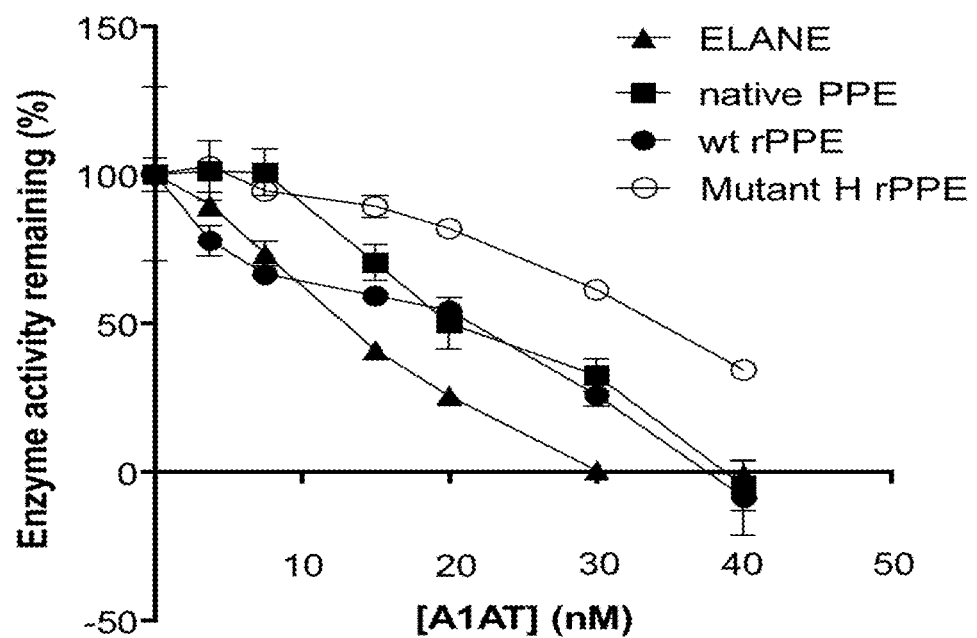

FIG. 2B shows a full inhibition curve comparing native ELANE, WT PPE protein (native PPE), wild-type PPE proprotein (wt rPPE), and mutant H PPE. *, p<0.05, Student's t-test and Table E2.

Figure 3A:
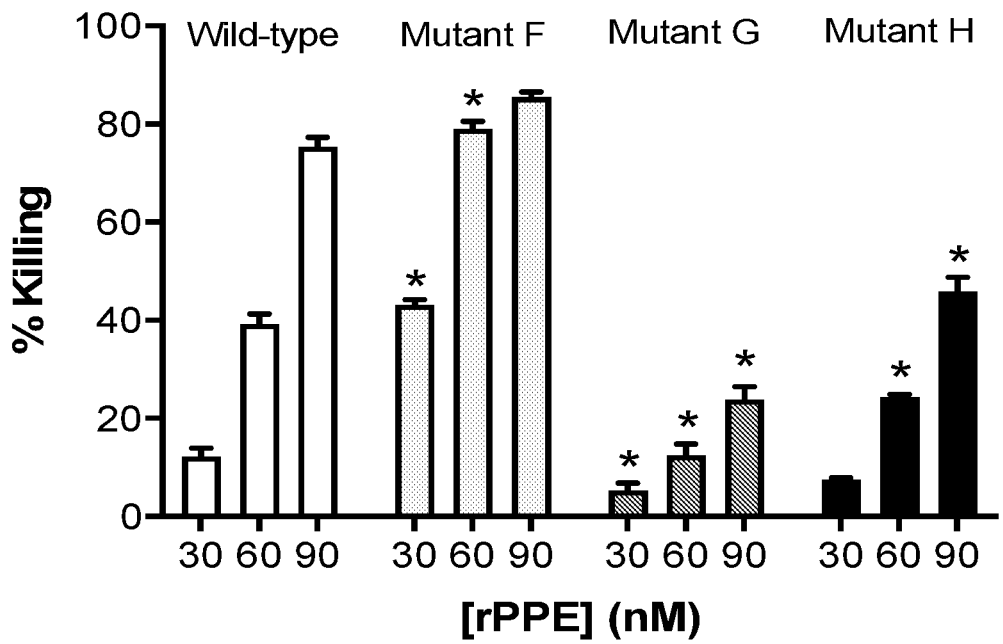
FIGS. 3A-3B shows cancer cell-activity of active forms of wild-type and modified PPE proteins.
Figure 3B:
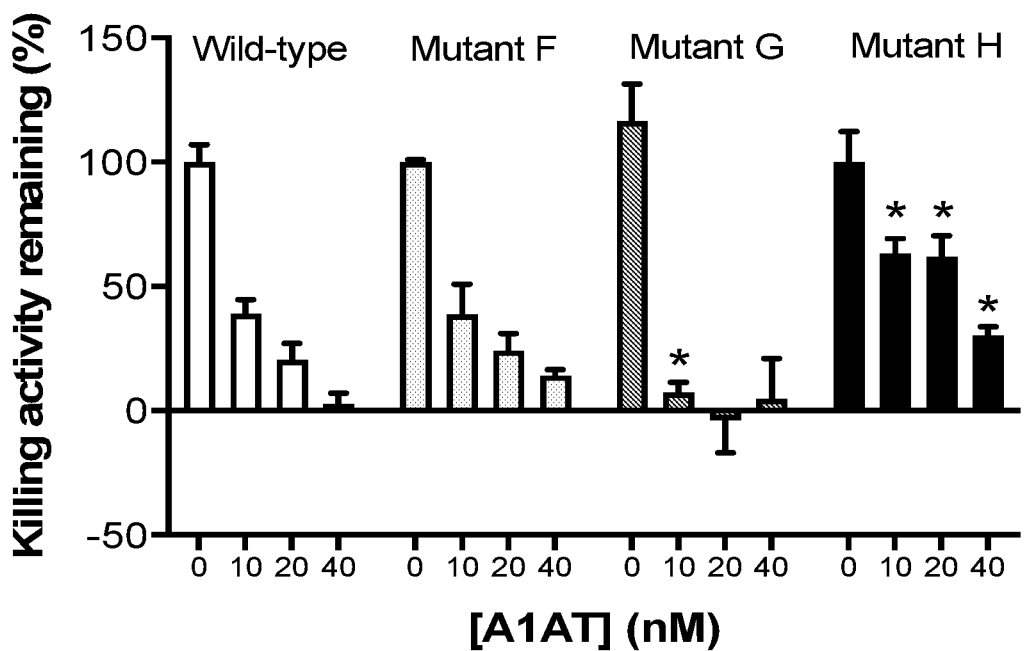

To test cancer cell-killing activity, MDA-MB-231 human cancer cells (triple negative breast cancer) were incubated with wild-type and modified PPE proteins in serum-free media for 7 hours, in the presence or absence of A1AT (0-40 nM). Cancer cell-killing activity was assessed by calcein-AM (n=6/condition). FIG. 3A shows activity of increasing doses of test proteins, and FIG. 3B shows the activity of test proteins in the absence or presence of increasing amounts of A1AT (cancer cell-killing efficacy in the absence of A1AT was set to 100%. *, p<0.05, Student's t-test; relative to wild-type PPE). For instance, Mutant F (Q211F) showed significantly increased cancer cell-killing activity relative to wild-type PPE at comparable doses (3A), and Mutant H (T55A) showed significantly increased cancer cell-killing activity relative to wild-type in the presence of increasing amounts of A1AT (3B).

The invention claimed is:

1. A modified porcine pancreatic elastase (PPE) protein, comprising an amino acid sequence that is at least 95% identical to SEQ ID NO: 5, and which retains the Q211F amino acid substitution of SEQ ID NO: 5, the residue numbering being defined by SEQ ID NO: 1.

2. The modified PPE protein of claim 1, comprising an amino acid sequence that is at least 9598% identical to SEQ ID NO: 5, and which retains the Q211F amino acid substitution of SEQ ID NO: 5.

3. The modified PPE protein of claim 2, comprising the amino acid sequence of SEQ ID NOs: 5.

4. The modified PPE protein of claim 1, which has increased cancer cell-killing activity relative to that of the wild-type PPE protein.

5. A recombinant nucleic acid molecule encoding the modified PPE protein of claim 1, a vector comprising the recombinant nucleic acid molecule, or a host cell comprising the recombinant nucleic acid molecule or the vector.

6. A method of producing a modified PPE protein, comprising culturing the host cell of claim 5 under culture conditions suitable for the expression of the modified PPE protein, and isolating the modified PPE protein from the culture.

7. A pharmaceutical composition, comprising the modified PPE protein of claim 1, or an expressible polynucleotide encoding the modified PPE protein, and a pharmaceutically acceptable carrier.

8. A method of treating, ameliorating the symptoms of, and/or reducing the progression of, a cancer in a subject in need thereof, comprising administering the pharmaceutical composition of claim 7 to the subject.

9. The method of claim 8, wherein the cancer is a primary cancer or a metastatic cancer, and is selected from one or more of melanoma, breast cancer, kidney cancer, pancreatic cancer, bone cancer, prostate cancer, small cell lung cancer, non-small cell lung cancer (NSCLC), mesothelioma, leukemia, multiple myeloma, lymphoma, hepatocellular carcinoma, sarcoma, B-cell malignancy, ovarian cancer, colorectal cancer, glioma, glioblastoma multiforme, meningioma, pituitary adenoma, vestibular schwannoma, primary CNS lymphoma, medulloblastoma, bladder cancer, uterine cancer, esophageal cancer, brain cancer, head and neck cancers, cervical cancer, testicular cancer, thyroid cancer, and stomach cancer.

10. The method of claim 8, comprising administering the pharmaceutical composition to the subject by parenteral administration or by intra-tumoral administration.

11. The method of claim 10, wherein the parenteral administration is intravenous administration.

12. The method of claim 9, wherein the melanoma is metastatic melanoma; the breast cancer is triple-negative breast cancer (TNBC); the kidney cancer is renal cell carcinoma; or the leukemia is lymphocytic leukemia, chronic myelogenous leukemia, acute myeloid leukemia, or relapsed acute myeloid leukemia.

* * * * *

SEQUENCE LISTING

<160> NUMBER OF SEQ ID NOS: 23

<210> SEQ ID NO 1
<211> LENGTH: 266
<212> TYPE: PRT
<213> ORGANISM: Sus scrofa

<400> SEQUENCE: 1

Met Leu Arg Leu Leu Val Val Ala Ser Leu Val Leu Tyr Gly His Ser
1               5                   10                  15

Thr Gln Asp Phe Pro Glu Thr Asn Ala Arg Val Val Gly Gly Thr Glu
            20                  25                  30

Ala Gln Arg Asn Ser Trp Pro Ser Gln Ile Ser Leu Gln Tyr Arg Ser
        35                  40                  45

Gly Ser Ser Trp Ala His Thr Cys Gly Gly Thr Leu Ile Arg Gln Asn
    50                  55                  60

Trp Val Met Thr Ala Ala His Cys Val Asp Arg Glu Leu Thr Phe Arg
65                  70                  75                  80

Val Val Val Gly Glu His Asn Leu Asn Gln Asn Asp Gly Thr Glu Gln
                85                  90                  95

Tyr Val Gly Val Gln Lys Ile Val Val His Pro Tyr Trp Asn Thr Asp
            100                 105                 110

Asp Val Ala Ala Gly Tyr Asp Ile Ala Leu Leu Arg Leu Ala Gln Ser
        115                 120                 125

Val Thr Leu Asn Ser Tyr Val Gln Leu Gly Val Leu Pro Arg Ala Gly
    130                 135                 140

Thr Ile Leu Ala Asn Asn Ser Pro Cys Tyr Ile Thr Gly Trp Gly Leu
145                 150                 155                 160

Thr Arg Thr Asn Gly Gln Leu Ala Gln Thr Leu Gln Gln Ala Tyr Leu
                165                 170                 175

Pro Thr Val Asp Tyr Ala Ile Cys Ser Ser Ser Tyr Trp Gly Ser
            180                 185                 190

```
Thr Val Lys Asn Ser Met Val Cys Ala Gly Asp Gly Val Arg Ser
        195                 200                 205

Gly Cys Gln Gly Asp Ser Gly Pro Leu His Cys Leu Val Asn Gly
    210                 215                 220

Gln Tyr Ala Val His Gly Val Thr Ser Phe Val Ser Arg Leu Gly Cys
225                 230                 235                 240

Asn Val Thr Arg Lys Pro Thr Val Phe Thr Arg Val Ser Ala Tyr Ile
                245                 250                 255

Ser Trp Ile Asn Asn Val Ile Ala Ser Asn
            260                 265

<210> SEQ ID NO 2
<211> LENGTH: 16
<212> TYPE: PRT
<213> ORGANISM: Sus scrofa

<400> SEQUENCE: 2

Met Leu Arg Leu Leu Val Val Ala Ser Leu Val Leu Tyr Gly His Ser
1               5                   10                  15

<210> SEQ ID NO 3
<211> LENGTH: 14
<212> TYPE: PRT
<213> ORGANISM: Sus scrofa

<400> SEQUENCE: 3

Thr Gln Asp Phe Pro Glu Thr Asn Ala Arg Val Val Gly Gly
1               5                   10

<210> SEQ ID NO 4
<211> LENGTH: 240
<212> TYPE: PRT
<213> ORGANISM: Sus scrofa

<400> SEQUENCE: 4

Val Val Gly Gly Thr Glu Ala Gln Arg Asn Ser Trp Pro Ser Gln Ile
1               5                   10                  15

Ser Leu Gln Tyr Arg Ser Gly Ser Ser Trp Ala His Thr Cys Gly Gly
            20                  25                  30

Thr Leu Ile Arg Gln Asn Trp Val Met Thr Ala Ala His Cys Val Asp
        35                  40                  45

Arg Glu Leu Thr Phe Arg Val Val Gly Glu His Asn Leu Asn Gln
    50                  55                  60

Asn Asp Gly Thr Glu Gln Tyr Val Gly Val Gln Lys Ile Val Val His
65                  70                  75                  80

Pro Tyr Trp Asn Thr Asp Asp Val Ala Ala Gly Tyr Asp Ile Ala Leu
                85                  90                  95

Leu Arg Leu Ala Gln Ser Val Thr Leu Asn Ser Tyr Val Gln Leu Gly
            100                 105                 110

Val Leu Pro Arg Ala Gly Thr Ile Leu Ala Asn Asn Ser Pro Cys Tyr
        115                 120                 125

Ile Thr Gly Trp Gly Leu Thr Arg Thr Asn Gly Gln Leu Ala Gln Thr
    130                 135                 140

Leu Gln Gln Ala Tyr Leu Pro Thr Val Asp Tyr Ala Ile Cys Ser Ser
145                 150                 155                 160

Ser Ser Tyr Trp Gly Ser Thr Val Lys Asn Ser Met Val Cys Ala Gly
                165                 170                 175
```

```
Gly Asp Gly Val Arg Ser Gly Cys Gln Gly Asp Ser Gly Gly Pro Leu
            180                 185                 190

His Cys Leu Val Asn Gly Gln Tyr Ala Val His Gly Val Thr Ser Phe
        195                 200                 205

Val Ser Arg Leu Gly Cys Asn Val Thr Arg Lys Pro Thr Val Phe Thr
    210                 215                 220

Arg Val Ser Ala Tyr Ile Ser Trp Ile Asn Asn Val Ile Ala Ser Asn
225                 230                 235                 240

<210> SEQ ID NO 5
<211> LENGTH: 240
<212> TYPE: PRT
<213> ORGANISM: Artificial Sequence
<220> FEATURE:
<223> OTHER INFORMATION: Made in Lab - Modified PPE protein Q211F

<400> SEQUENCE: 5

Val Val Gly Gly Thr Glu Ala Gln Arg Asn Ser Trp Pro Ser Gln Ile
1               5                   10                  15

Ser Leu Gln Tyr Arg Ser Gly Ser Ser Trp Ala His Thr Cys Gly Gly
            20                  25                  30

Thr Leu Ile Arg Gln Asn Trp Val Met Thr Ala Ala His Cys Val Asp
        35                  40                  45

Arg Glu Leu Thr Phe Arg Val Val Val Gly Glu His Asn Leu Asn Gln
    50                  55                  60

Asn Asp Gly Thr Glu Gln Tyr Val Gly Val Gln Lys Ile Val Val His
65                  70                  75                  80

Pro Tyr Trp Asn Thr Asp Asp Val Ala Ala Gly Tyr Asp Ile Ala Leu
                85                  90                  95

Leu Arg Leu Ala Gln Ser Val Thr Leu Asn Ser Tyr Val Gln Leu Gly
            100                 105                 110

Val Leu Pro Arg Ala Gly Thr Ile Leu Ala Asn Asn Ser Pro Cys Tyr
        115                 120                 125

Ile Thr Gly Trp Gly Leu Thr Arg Thr Asn Gly Gln Leu Ala Gln Thr
130                 135                 140

Leu Gln Gln Ala Tyr Leu Pro Thr Val Asp Tyr Ala Ile Cys Ser Ser
145                 150                 155                 160

Ser Ser Tyr Trp Gly Ser Thr Val Lys Asn Ser Met Val Cys Ala Gly
                165                 170                 175

Gly Asp Gly Val Arg Ser Gly Cys Phe Gly Asp Ser Gly Gly Pro Leu
            180                 185                 190

His Cys Leu Val Asn Gly Gln Tyr Ala Val His Gly Val Thr Ser Phe
        195                 200                 205

Val Ser Arg Leu Gly Cys Asn Val Thr Arg Lys Pro Thr Val Phe Thr
    210                 215                 220

Arg Val Ser Ala Tyr Ile Ser Trp Ile Asn Asn Val Ile Ala Ser Asn
225                 230                 235                 240

<210> SEQ ID NO 6
<211> LENGTH: 240
<212> TYPE: PRT
<213> ORGANISM: Artificial Sequence
<220> FEATURE:
<223> OTHER INFORMATION: Made in Lab - Modified PPE protein T55A

<400> SEQUENCE: 6

Val Val Gly Gly Thr Glu Ala Gln Arg Asn Ser Trp Pro Ser Gln Ile
1               5                   10                  15
```

Ser Leu Gln Tyr Arg Ser Gly Ser Ser Trp Ala His Ala Cys Gly Gly
            20                  25                  30

Thr Leu Ile Arg Gln Asn Trp Val Met Thr Ala Ala His Cys Val Asp
            35                  40                  45

Arg Glu Leu Thr Phe Arg Val Val Val Gly Glu His Asn Leu Asn Gln
50                  55                  60

Asn Asp Gly Thr Glu Gln Tyr Val Gly Val Gln Lys Ile Val Val His
65                  70                  75                  80

Pro Tyr Trp Asn Thr Asp Asp Val Ala Ala Gly Tyr Asp Ile Ala Leu
                85                  90                  95

Leu Arg Leu Ala Gln Ser Val Thr Leu Asn Ser Tyr Val Gln Leu Gly
                100                 105                 110

Val Leu Pro Arg Ala Gly Thr Ile Leu Ala Asn Asn Ser Pro Cys Tyr
            115                 120                 125

Ile Thr Gly Trp Gly Leu Thr Arg Thr Asn Gly Gln Leu Ala Gln Thr
130                 135                 140

Leu Gln Gln Ala Tyr Leu Pro Thr Val Asp Tyr Ala Ile Cys Ser Ser
145                 150                 155                 160

Ser Ser Tyr Trp Gly Ser Thr Val Lys Asn Ser Met Val Cys Ala Gly
                165                 170                 175

Gly Asp Gly Val Arg Ser Gly Cys Gln Gly Asp Ser Gly Gly Pro Leu
                180                 185                 190

His Cys Leu Val Asn Gly Gln Tyr Ala Val His Gly Val Thr Ser Phe
            195                 200                 205

Val Ser Arg Leu Gly Cys Asn Val Thr Arg Lys Pro Thr Val Phe Thr
            210                 215                 220

Arg Val Ser Ala Tyr Ile Ser Trp Ile Asn Asn Val Ile Ala Ser Asn
225                 230                 235                 240

<210> SEQ ID NO 7
<211> LENGTH: 240
<212> TYPE: PRT
<213> ORGANISM: Artificial Sequence
<220> FEATURE:
<223> OTHER INFORMATION: Made in Lab - Modified PPE protein N241A

<400> SEQUENCE: 7

Val Val Gly Gly Thr Glu Ala Gln Arg Asn Ser Trp Pro Ser Gln Ile
1               5                   10                  15

Ser Leu Gln Tyr Arg Ser Gly Ser Ser Trp Ala His Thr Cys Gly Gly
            20                  25                  30

Thr Leu Ile Arg Gln Asn Trp Val Met Thr Ala Ala His Cys Val Asp
            35                  40                  45

Arg Glu Leu Thr Phe Arg Val Val Val Gly Glu His Asn Leu Asn Gln
            50                  55                  60

Asn Asp Gly Thr Glu Gln Tyr Val Gly Val Gln Lys Ile Val Val His
65                  70                  75                  80

Pro Tyr Trp Asn Thr Asp Asp Val Ala Ala Gly Tyr Asp Ile Ala Leu
                85                  90                  95

Leu Arg Leu Ala Gln Ser Val Thr Leu Asn Ser Tyr Val Gln Leu Gly
                100                 105                 110

Val Leu Pro Arg Ala Gly Thr Ile Leu Ala Asn Asn Ser Pro Cys Tyr
            115                 120                 125

Ile Thr Gly Trp Gly Leu Thr Arg Thr Asn Gly Gln Leu Ala Gln Thr
130                 135                 140

Leu Gln Gln Ala Tyr Leu Pro Thr Val Asp Tyr Ala Ile Cys Ser Ser
145                 150                 155                 160

Ser Ser Tyr Trp Gly Ser Thr Val Lys Asn Ser Met Val Cys Ala Gly
            165                 170                 175

Gly Asp Gly Val Arg Ser Gly Cys Gln Gly Asp Ser Gly Gly Pro Leu
            180                 185                 190

His Cys Leu Val Asn Gly Gln Tyr Ala Val His Gly Val Thr Ser Phe
            195                 200                 205

Val Ser Arg Leu Gly Cys Ala Val Thr Arg Lys Pro Thr Val Phe Thr
            210                 215                 220

Arg Val Ser Ala Tyr Ile Ser Trp Ile Asn Asn Val Ile Ala Ser Asn
225                 230                 235                 240

<210> SEQ ID NO 8
<211> LENGTH: 240
<212> TYPE: PRT
<213> ORGANISM: Artificial Sequence
<220> FEATURE:
<223> OTHER INFORMATION: Made in Lab - Modified PPE protein N241Y

<400> SEQUENCE

<220> FEATURE:
<223> OTHER INFORMATION: Made in Lab - Modified PPE protein R75A

<400> SEQUENCE: 9

```
Val Val Gly Gly Thr Glu Ala Gln Arg Asn Ser Trp Pro Ser Gln Ile
1               5                   10                  15

Ser Leu Gln Tyr Arg Ser Gly Ser Ser Trp Ala His Thr Cys Gly Gly
            20                  25                  30

Thr Leu Ile Arg Gln Asn Trp Val Met Thr Ala Ala His Cys Val Asp
        35                  40                  45

Ala Glu Leu Thr Phe Arg Val Val Gly Glu His Asn Leu Asn Gln
    50                  55                  60

Asn Asp Gly Thr Glu Gln Tyr Val Gly Val Gln Lys Ile Val Val His
65                  70                  75                  80

Pro Tyr Trp Asn Thr Asp Asp Val Ala Ala Gly Tyr Asp Ile Ala Leu
                85                  90                  95

Leu Arg Leu Ala Gln Ser Val Thr Leu Asn Ser Tyr Val Gln Leu Gly
            100                 105                 110

Val Leu Pro Arg Ala Gly Thr Ile Leu Ala Asn Asn Ser Pro Cys Tyr
        115                 120                 125

Ile Thr Gly Trp Gly Leu Thr Arg Thr Asn Gly Gln Leu Ala Gln Thr
    130                 135                 140

Leu Gln Gln Ala Tyr Leu Pro Thr Val Asp Tyr Ala Ile Cys Ser Ser
145                 150                 155                 160

Ser Ser Tyr Trp Gly Ser Thr Val Lys Asn Ser Met Val Cys Ala Gly
                165                 170                 175

Gly Asp Gly Val Arg Ser Gly Cys Gln Gly Asp Ser Gly Gly Pro Leu
            180                 185                 190

His Cys Leu Val Asn Gly Gln Tyr Ala Val His Gly Val Thr Ser Phe
        195                 200                 205

Val Ser Arg Leu Gly Cys Asn Val Thr Arg Lys Pro Thr Val Phe Thr
    210                 215                 220

Arg Val Ser Ala Tyr Ile Ser Trp Ile Asn Asn Val Ile Ala Ser Asn
225                 230                 235                 240
```

<210> SEQ ID NO 10
<211> LENGTH: 240
<212> TYPE: PRT
<213> ORGANISM: Artificial Sequence
<220> FEATURE:
<223> OTHER INFORMATION: Made in Lab - Modified PPE protein R75E

<400> SEQUENCE: 10

```
Val Val Gly Gly Thr Glu Ala Gln Arg Asn Ser Trp Pro Ser Gln Ile
1               5                   10                  15

Ser Leu Gln Tyr Arg Ser Gly Ser Ser Trp Ala His Thr Cys Gly Gly
            20                  25                  30

Thr Leu Ile Arg Gln Asn Trp Val Met Thr Ala Ala His Cys Val Asp
        35                  40                  45

Glu Glu Leu Thr Phe Arg Val Val Gly Glu His Asn Leu Asn Gln
    50                  55                  60

Asn Asp Gly Thr Glu Gln Tyr Val Gly Val Gln Lys Ile Val Val His
65                  70                  75                  80

Pro Tyr Trp Asn Thr Asp Asp Val Ala Ala Gly Tyr Asp Ile Ala Leu
                85                  90                  95

Leu Arg Leu Ala Gln Ser Val Thr Leu Asn Ser Tyr Val Gln Leu Gly
```

```
                100                 105                 110
Val Leu Pro Arg Ala Gly Thr Ile Leu Ala Asn Asn Ser Pro Cys Tyr
            115                 120                 125

Ile Thr Gly Trp Gly Leu Thr Arg Thr Asn Gly Gln Leu Ala Gln Thr
        130                 135                 140

Leu Gln Gln Ala Tyr Leu Pro Thr Val Asp Tyr Ala Ile Cys Ser Ser
145                 150                 155                 160

Ser Ser Tyr Trp Gly Ser Thr Val Lys Asn Ser Met Val Cys Ala Gly
                165                 170                 175

Gly Asp Gly Val Arg Ser Gly Cys Gln Gly Asp Ser Gly Gly Pro Leu
            180                 185                 190

His Cys Leu Val Asn Gly Gln Tyr Ala Val His Gly Val Thr Ser Phe
        195                 200                 205

Val Ser Arg Leu Gly Cys Asn Val Thr Arg Lys Pro Thr Val Phe Thr
    210                 215                 220

Arg Val Ser Ala Tyr Ile Ser Trp Ile Asn Asn Val Ile Ala Ser Asn
225                 230                 235                 240

<210> SEQ ID NO 11
<211> LENGTH: 240
<212> TYPE: PRT
<213> ORGANISM: Artificial Sequence
<220> FEATURE:
<223> OTHER INFORMATION: Made in Lab - Modified PPE protein Q211A

<400> SEQUENCE: 11

Val Val Gly Gly Thr Glu Ala Gln Arg Asn Ser Trp Pro Ser Gln Ile
1               5                   10                  15

Ser Leu Gln Tyr Arg Ser Gly Ser Ser Trp Ala His Thr Cys Gly Gly
            20                  25                  30

Thr Leu Ile Arg Gln Asn Trp Val Met Thr Ala Ala His Cys Val Asp
        35                  40                  45

Arg Glu Leu Thr Phe Arg Val Val Val Gly Glu His Asn Leu Asn Gln
    50                  55                  60

Asn Asp Gly Thr Glu Gln Tyr Val Gly Val Gln Lys Ile Val Val His
65                  70                  75                  80

Pro Tyr Trp Asn Thr Asp Asp Val Ala Ala Gly Tyr Asp Ile Ala Leu
                85                  90                  95

Leu Arg Leu Ala Gln Ser Val Thr Leu Asn Ser Tyr Val Gln Leu Gly
            100                 105                 110

Val Leu Pro Arg Ala Gly Thr Ile Leu Ala Asn Asn Ser Pro Cys Tyr
        115                 120                 125

Ile Thr Gly Trp Gly Leu Thr Arg Thr Asn Gly Gln Leu Ala Gln Thr
    130                 135                 140

Leu Gln Gln Ala Tyr Leu Pro Thr Val Asp Tyr Ala Ile Cys Ser Ser
145                 150                 155                 160

Ser Ser Tyr Trp Gly Ser Thr Val Lys Asn Ser Met Val Cys Ala Gly
                165                 170                 175

Gly Asp Gly Val Arg Ser Gly Cys Ala Gly Asp Ser Gly Gly Pro Leu
            180                 185                 190

His Cys Leu Val Asn Gly Gln Tyr Ala Val His Gly Val Thr Ser Phe
        195                 200                 205

Val Ser Arg Leu Gly Cys Asn Val Thr Arg Lys Pro Thr Val Phe Thr
    210                 215                 220

Arg Val Ser Ala Tyr Ile Ser Trp Ile Asn Asn Val Ile Ala Ser Asn
```

```
225                 230                 235                 240

<210> SEQ ID NO 12
<211> LENGTH: 240
<212> TYPE: PRT
<213> ORGANISM: Artificial Sequence
<220> FEATURE:
<223> OTHER INFORMATION: Made in Lab - Modified PPE protein R237A

<400> SEQUENCE: 12

Val Val Gly Gly Thr Glu Ala Gln Arg Asn Ser Trp Pro Ser Gln Ile
1               5                   10                  15

Ser Leu Gln Tyr Arg Ser Gly Ser Ser Trp Ala His Thr Cys G

```
Asn Asp Gly Thr Glu Gln Tyr Val Gly Val Gln Lys Ile Val Val His
 65                  70                  75                  80

Pro Tyr Trp Asn Thr Asp Asp Val Ala Ala Gly Tyr Asp Ile Ala Leu
                 85                  90                  95

Leu Arg Leu Ala Gln Ser Val Thr Leu Asn Ser Tyr Val Gln Leu Gly
                100                 105                 110

Val Leu Pro Arg Ala Gly Thr Ile Leu Ala Asn Asn Ser Pro Cys Tyr
            115                 120                 125

Ile Thr Gly Trp Gly Leu Thr Arg Thr Asn Gly Gln Leu Ala Gln Thr
            130                 135                 140

Leu Gln Gln Ala Tyr Leu Pro Thr Val Asp Tyr Ala Ile Cys Ser Ser
145                 150                 155                 160

Ser Ser Tyr Trp Gly Ser Thr Val Lys Asn Ser Met Val Cys Ala Gly
                165                 170                 175

Gly Asp Gly Val Arg Ser Gly Cys Gln Gly Asp Ala Gly Gly Pro Leu
            180                 185                 190

His Cys Leu Val Asn Gly Gln Tyr Ala Val His Gly Val Thr Ser Phe
            195                 200                 205

Val Ser Arg Leu Gly Cys Asn Val Thr Arg Lys Pro Thr Val Phe Thr
210                 215                 220

Arg Val Ser Ala Tyr Ile Ser Trp Ile Asn Asn Val Ile Ala Ser Asn
225                 230                 235                 240

<210> SEQ ID NO 14
<211> LENGTH: 240
<212> TYPE: PRT
<213> ORGANISM: Artificial Sequene
<220> FEATURE:
<223> OTHER INFORMATION: Made in Lab - Modified PPE protein D74A

<400> SEQUENCE: 14

Val Val Gly Gly Thr Glu Ala Gln Arg Asn Ser Trp Pro Ser Gln Ile
  1               5                  10                  15

Ser Leu Gln Tyr Arg Ser Gly Ser Ser Trp Ala His Thr Cys Gly Gly
                 20                  25                  30

Thr Leu Ile Arg Gln Asn Trp Val Met Thr Ala Ala His Cys Val Ala
             35                  40                  45

Arg Glu Leu Thr Phe Arg Val Val Val Gly Glu His Asn Leu Asn Gln
 50                  55                  60

Asn Asp Gly Thr Glu Gln Tyr Val Gly Val Gln Lys Ile Val Val His
 65                  70                  75                  80

Pro Tyr Trp Asn Thr Asp Asp Val Ala Ala Gly Tyr Asp Ile Ala Leu
                 85                  90                  95

Leu Arg Leu Ala Gln Ser Val Thr Leu Asn Ser Tyr Val Gln Leu Gly
                100                 105                 110

Val Leu Pro Arg Ala Gly Thr Ile Leu Ala Asn Asn Ser Pro Cys Tyr
            115                 120                 125

Ile Thr Gly Trp Gly Leu Thr Arg Thr Asn Gly Gln Leu Ala Gln Thr
            130                 135                 140

Leu Gln Gln Ala Tyr Leu Pro Thr Val Asp Tyr Ala Ile Cys Ser Ser
145                 150                 155                 160

Ser Ser Tyr Trp Gly Ser Thr Val Lys Asn Ser Met Val Cys Ala Gly
                165                 170                 175

Gly Asp Gly Val Arg Ser Gly Cys Gln Gly Asp Ser Gly Gly Pro Leu
            180                 185                 190
```

His Cys Leu Val Asn Gly Gln Tyr Ala Val His Gly Val Thr Ser Phe
            195                 200                 205

Val Ser Arg Leu Gly Cys Asn Val Thr Arg Lys Pro Thr Val Phe Thr
    210                 215                 220

Arg Val Ser Ala Tyr Ile Ser Trp Ile Asn Asn Val Ile Ala Ser Asn
225                 230                 235                 240

<210> SEQ ID NO 15
<211> LENGTH: 8
<212> TYPE: PRT
<213> ORGANISM: Artificial Sequence
<220> FEATURE:
<223> OTHER INFORMATION: Synthesized: optimized cleavage site

<400> SEQUENCE: 15

Gly Ala Ala Gly Leu Gly Gly Ala
1               5

<210> SEQ ID NO 16
<211> LENGTH: 8
<212> TYPE: PRT
<213> ORGANISM: Artificial Sequence
<220> FEATURE:
<223> OTHER INFORMATION: Synthesized: optimized cleavage site

<400> SEQUENCE: 16

Gly Ala Ala Gly Val Val Gly Gly
1               5

<210> SEQ ID NO 17
<211> LENGTH: 8
<212> TYPE: PRT
<213> ORGANISM: Artificial Sequence
<220> FEATURE:
<223> OTHER INFORMATION: Synthesized: optimized cleavage site

<400> SEQUENCE: 17

Gly Ala Ala Gly Leu Val Gly Gly
1               5

<210> SEQ ID NO 18
<211> LENGTH: 8
<212> TYPE: PRT
<213> ORGANISM: Artificial Sequence
<220> FEATURE:
<223> OTHER INFORMATION: Synthesized: optimized cleavage site

<400> SEQUENCE: 18

Leu Leu Val Leu Val Val Leu Gly
1               5

<210> SEQ ID NO 19
<211> LENGTH: 8
<212> TYPE: PRT
<213> ORGANISM: Artificial Sequence
<220> FEATURE:
<223> OTHER INFORMATION: Synthesized: optimized cleavage site

<400> SEQUENCE: 19

Leu Leu Val Leu Val Val Gly Gly
1               5

<210> SEQ ID NO 20
<211> LENGTH: 8
<212> TYPE: PRT
<213> ORGANISM: Artificial Sequence

```
<220> FEATURE:
<223> OTHER INFORMATION: Synthesized: optimized cleavage site

<400> SEQUENCE: 20

Ala Ser Glu Ile Val Gly Gly Arg
1               5

<210> SEQ ID NO 21
<211> LENGTH: 8
<212> TYPE: PRT
<213> ORGANISM: Artificial Sequence
<220> FEATURE:
<223> OTHER INFORMATION: Synthesized: optimized cleavage site

<400> SEQUENCE: 21

Ala Leu Leu Gly Ala Ala Gly Gly
1               5

<210> SEQ ID NO 22
<211> LENGTH: 8
<212> TYPE: PRT
<213> ORGANISM: Artificial Sequence
<220> FEATURE:
<223> OTHER INFORMATION: Synthesized: optimized cleavage site

<400> SEQUENCE: 22

Ala Leu Leu Gly Val Val Gly Gly
1               5

<210> SEQ ID NO 23
<211> LENGTH: 8
<212> TYPE: PRT
<213> ORGANISM: Artificial Sequence
<220> FEATURE:
<223> OTHER INFORMATION: Synthesized: optimized cleavage site

<400> SEQUENCE: 23

Ala Leu Leu Gly Ala Val Gly Gly
1               5
```